US012686510B2

(12) United States Patent
Troy et al.

(10) Patent No.: US 12,686,510 B2
(45) Date of Patent: Jul. 21, 2026

(54) REPAIR OF STRUCTURES USING UNMANNED AERIAL VEHICLES

(71) Applicant: The Boeing Company, Arlington, VA (US)

(72) Inventors: James J. Troy, Issaquah, WA (US); Gary E. Georgeson, Tacoma, WA (US); Joseph L. Hafenrichter, Seattle, WA (US); Gregory J. Sweers, Renton, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/389,374

(22) Filed: Nov. 14, 2023

(65) Prior Publication Data

US 2024/0083577 A1     Mar. 14, 2024

Related U.S. Application Data

(62) Division of application No. 16/782,944, filed on Feb. 5, 2020, now Pat. No. 11,891,174.

(51) Int. Cl.
B64U 10/13       (2023.01)
B05B 1/28       (2006.01)
B05B 14/30       (2018.01)
B05D 5/00       (2006.01)
(Continued)

(52) U.S. Cl.
CPC ................ B64U 10/13 (2023.01); B05B 1/28 (2013.01); B05B 14/30 (2018.02); B05D 5/005 (2013.01);
(Continued)

(58) Field of Classification Search
CPC ... B64F 5/40; B05B 14/30; B05B 1/28; B05B 5/005; B64U 10/13; B64U 10/14;
(Continued)

(56) References Cited

U.S. PATENT DOCUMENTS 10,186,348 B2    1/2019  Davis
11,498,090 B2 *  11/2022  Thompson ........... G05D 1/2235
(Continued)

FOREIGN PATENT DOCUMENTS

CN       110743737       2/2020
EP        0365707       5/1990
(Continued)

OTHER PUBLICATIONS

Machine translation of JP 2019-136651.
Machine translation of JP 664760881.

*Primary Examiner* — Benjamin P Lee
(74) *Attorney, Agent, or Firm* — Joseph M. Butscher; Carroll, Hoette & Butscher, LLC

(57)       ABSTRACT

Methods and apparatus for performing repair operations using an unmanned aerial vehicle. The methods are enabled by equipping the UAV with tools for rapidly repairing a large structure or object (e.g., an aircraft or a wind turbine blade) that is not easily accessible to maintenance personnel. In accordance with various embodiments disclosed below, the unmanned aerial vehicle may be equipped with an easily attachable/removable module that includes an additive repair tool. The additive repair tool is configured to add material to a body of material. For example, the additive repair tool may be configured to apply a sealant or other coating material in liquid form to a damage site on a surface of a structure or object (e.g., by spraying liquid or launching liquid-filled capsules onto the surface). In alternative embodiments, the additive repair tool is configured to adhere a tape to the damage site.

20 Claims, 32 Drawing Sheets

(51) Int. Cl.

| | |
|---|---|
| *B64D 1/18* | (2006.01) |
| *B64F 5/40* | (2017.01) |
| *B64U 30/29* | (2023.01) |
| *B64U 50/19* | (2023.01) |
| *B05D 1/02* | (2006.01) |
| *B05D 3/02* | (2006.01) |
| *B05D 3/04* | (2006.01) |
| *B05D 3/06* | (2006.01) |
| *B64U 20/87* | (2023.01) |
| *B64U 101/30* | (2023.01) |

(52) U.S. Cl.
CPC .................. *B64D 1/18* (2013.01); *B64F 5/40* (2017.01); *B64U 30/29* (2023.01); *B64U 50/19* (2023.01); *B05D 1/02* (2013.01); *B05D 3/0254* (2013.01); *B05D 3/0493* (2013.01); *B05D 3/067* (2013.01); *B64U 20/87* (2023.01); *B64U 2101/30* (2023.01)

(58) Field of Classification Search
CPC .......... B64U 50/19; B64U 20/87; B64D 1/18; B64D 1/02; B05D 3/0254
See application file for complete search history.

(56) References Cited

U.S. PATENT DOCUMENTS

| | | | | |
|---|---|---|---|---|
| 11,891,174 | B2 * | 2/2024 | Georgeson | ................ B05B 1/28 |
| 12,012,208 | B2 * | 6/2024 | Litton | ................... B64U 10/13 |
| 12,239,863 | B2 * | 3/2025 | Suefuku | ................. B08B 3/024 |
| 12,269,623 | B2 * | 4/2025 | Rodrigues | ................ B05C 5/02 |
| 2018/0361571 | A1 | 12/2018 | Georgeson | |
| 2019/0093373 | A1 | 3/2019 | Telleria | |
| 2019/0247877 | A1 * | 8/2019 | Fideler | ..................... B64D 1/18 |
| 2020/0002000 | A1 * | 1/2020 | Dahlstrom | ........... E04G 23/002 |
| 2020/0166938 | A1 * | 5/2020 | Hafenrichter | ........ G05D 1/0202 |
| 2021/0071996 | A1 * | 3/2021 | Bijou | ...................... B64D 1/02 |
| 2021/0078028 | A1 * | 3/2021 | Woll | ..................... B64D 37/16 |
| 2021/0261252 | A1 * | 8/2021 | Dayan | ................... B64U 10/13 |

FOREIGN PATENT DOCUMENTS

| | | |
|---|---|---|
| EP | 3434594 | 1/2019 |
| JP | 2019-136651 | 8/2019 |
| JP | 6647608 | 1/2020 |
| WO | WO 2020/217607 | 10/2020 |

* cited by examiner

REPAIR OF STRUCTURES USING UNMANNED AERIAL VEHICLES

RELATED PATENT APPLICATION

This application is a divisional of and claims priority from U.S. patent application Ser. No. 16/782,944 filed on Feb. 5, 2020, now U.S. Pat. No. 11,891,174.

BACKGROUND

This disclosure generally relates to inspection and repair of structures. In particular, this disclosure relates to the use of unmanned aerial vehicles (UAVs) for in-service repair of inaccessible or limited-access structures.

In-service human-based repair of large structures and various types of large objects can be time consuming, expensive and difficult for an individual to perform. Examples of large structures that pose significant repair challenges include wind turbine blades, aircraft fuselages and wings, rockets and satellites, storage tanks, bridges, dams, levees, power plants, power lines or electrical power grids, water treatment facilities; oil refineries, chemical processing plants, high-rise buildings, and infrastructure associated with electric trains and monorail support structures.

More specifically, materials and structures employed in the aerospace industry and elsewhere may periodically require repair for in-service damage. Rapid inspection and repair of aircraft are important for military and commercial applications in order to decrease down time. For example, the use of composite structures is increasingly common on commercial aircraft. Composites may be damaged in the course of service. Examples of such in-service damage include lightning strike, impact damage due to hail, runway debris (object damage), or collisions with ground support vehicles.

In instances in which the inspection of a structure determines that the structure should undergo repair, such as to address a structural anomaly identified during the inspection, the repair should be performed in a timely manner so that the structure may be returned to service promptly. For example, damage may be discovered at the airport loading gate just prior to a departure. A repair may be provided that would be temporary or permanent depending on the extent of the damage. These may be non-structural (such as sealing the surface so moisture does not get in) or structural (restoring some level of strength to the area). The current approach for repair of impacts, delaminations, scratches, cracks, burns, or tears on most in-service aircraft (composite or metal) is to use manual labor, with lifts or stands, safety harnesses, etc. For minor or temporary repairs, this causes unnecessary operational delays, exposure to potential safety conditions and costs to return the aircraft to flight. The cost of access, labor, and related time to conduct the repair and loss of revenue during the interruption may be excessive. If repair equipment is not available or if the repair may be extensive, the flight might be cancelled. The aircraft may be grounded and taken out of service to be ferried or towed to a maintenance base, with consequent significant economic impact to the aircraft operator.

There is a need for automated apparatus for rapid repair and return to service of large composite structures (e.g., aircraft and wind turbine blades) after a planned structural maintenance check or after an event that may have created damage (e.g., lightning strike, physical impact, bird strike).

SUMMARY

The subject matter disclosed in some detail below is directed to methods and apparatus for performing repair operations using an unmanned aerial vehicle (UAV). The methods are enabled by equipping a UAV with tools for rapidly repairing a large structure or object (e.g., an aircraft or a wind turbine blade) that is not easily accessible to maintenance personnel. In accordance with various embodiments disclosed below, a UAV may be equipped with an easily attachable/removable module that includes an additive repair tool. As used herein, the term "additive repair tool" means a tool that is configured to add material to a body of material. For example, the additive repair tool may be configured to apply a sealant or other coating material in liquid form to a damage site on a surface of a structure or object (e.g., by spraying liquid or launching liquid-filled capsules onto the surface). In alternative embodiments, the additive repair tool is configured to adhere a tape to the damage site.

Although various embodiments of methods and apparatus for repairing a structure or object using a tool-equipped UAV are described in some detail later herein, one or more of those embodiments may be characterized by one or more of the following aspects.

One aspect of the subject matter disclosed in detail below is an apparatus comprising an unmanned aerial vehicle and a spray-on repair module coupled to the unmanned aerial vehicle. The unmanned aerial vehicle comprises a body frame, a plurality of rotor motors mounted to the body frame, and a plurality of rotors operatively coupled to respective rotor motors of the plurality of rotor motors. The spray-on repair module comprises: a hood coupled to the frame of the unmanned aerial vehicle; a pressurized storage canister containing a sealant or coating material in a liquid state; a valve in fluid communication with the pressurized storage canister; and a spray nozzle in fluid communication with the valve. The spray nozzle is configured and located to distribute the sealant or coating material over an area on a surface of a structure which is covered by the hood.

Another aspect of the subject matter disclosed in detail below is a method for sealing or coating a surface, the method comprising: (a) coupling a spray-on repair module comprising a hood and a sprayer to an unmanned aerial vehicle; (b) flying the unmanned aerial vehicle to a location where the hood covers an area on a surface of a structure; and (c) using the sprayer to spray sealing or coating material on at least a portion of the area covered by the hood. In accordance with one embodiment, the method further comprises: (d) sealing the hood to the surface of the structure subsequent to step (b) and prior to (c); and (e) partially evacuating a volume of space under the hood subsequent to step (d) and prior to step (c).

A further aspect of the subject matter disclosed in detail below is an apparatus comprising an unmanned aerial vehicle and an applicator head coupled to the unmanned aerial vehicle. The unmanned aerial vehicle comprises: a body frame; a plurality of rotor motors mounted to the body frame; and a plurality of rotors operatively coupled to respective rotor motors of the plurality of rotor motors. The applicator head comprises: a housing; a supply spool rotatably coupled to the housing and having a first portion of a tape having pressure-sensitive adhesive on one side and a first portion of a release liner wrapped around the supply spool; an applicator roller rotatably coupled to the housing and having a compliant and air-permeable outer surface in contact with a second portion of the tape; and a take-up spool rotatably coupled to the housing and having a second portion of the release liner wrapped around the take-up spool. The applicator roller and take-up spool form a nip where the second portions of the tape and release liner are in contact.

Yet another aspect of the subject matter disclosed in detail below is a method for repairing a surface area of a structure using an unmanned aerial vehicle, the method comprising: (a) coupling an applicator head comprising an applicator roller to an unmanned aerial vehicle; (b) adhering a portion of a tape having pressure-sensitive adhesive on one side to an outer surface of the applicator roller; (c) flying the unmanned aerial vehicle to a location where the pressure-sensitive adhesive on the portion of tape adhered to the outer surface of the applicator roller contacts a surface of a structure; and (d) moving the applicator head so that the applicator roller rolls and presses incremental portions of the tape against the surface of the structure with sufficient pressure to cause the pressure-sensitive adhesive on the incremental portions of tape to adhere to the surface.

A further aspect of the subject matter disclosed in detail below is an apparatus comprising an unmanned aerial vehicle and a launcher module coupled to the unmanned aerial vehicle. The unmanned aerial vehicle comprises: a body frame; a plurality of rotor motors mounted to the body frame; and a plurality of rotors operatively coupled to respective rotor motors of the plurality of rotor motors. The launcher module comprises: an inner ring mounted to the frame of the unmanned aerial vehicle; and a rotatable launcher subassembly comprising an outer ring that is rotatably coupled to the inner ring and a launcher that is mounted to the outer ring. The launcher comprises a launcher barrel and a launching mechanism positioned and configured to impel a liquid- or gel-filled capsule (hereinafter "liquid-filled capsule") through the launcher barrel.

In accordance with one embodiment of the apparatus described in the immediately preceding paragraph, the launcher module further comprises: a launcher pitch control motor fixedly coupled to the outer ring; and means for mechanically coupling the outer ring to the launcher pitch control motor to enable the launcher pitch control motor to drive rotation of the outer ring relative to the inner ring. The launcher and the launcher pitch control motor are disposed at diametrically opposed angular positions on the outer ring. In accordance with one proposed implementation, the rotatable launcher subassembly further comprises a recoil compensation subsystem fixedly coupled to the outer ring and operatively coupled to the launcher barrel.

Yet another aspect of the subject matter disclosed in detail below is a method for sealing or coating a surface area of a structure using an unmanned aerial vehicle, the method comprising: (a) coupling a launcher module to an unmanned aerial vehicle, wherein the launcher module is configured to launch liquid-filled capsules; (b) flying the unmanned aerial vehicle to a vicinity of a surface of a structure; and (c) launching a liquid-filled capsule which impinges on the surface of the structure.

Other aspects of methods and apparatus for repairing a structure or object using a tool-equipped UAV are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1A:
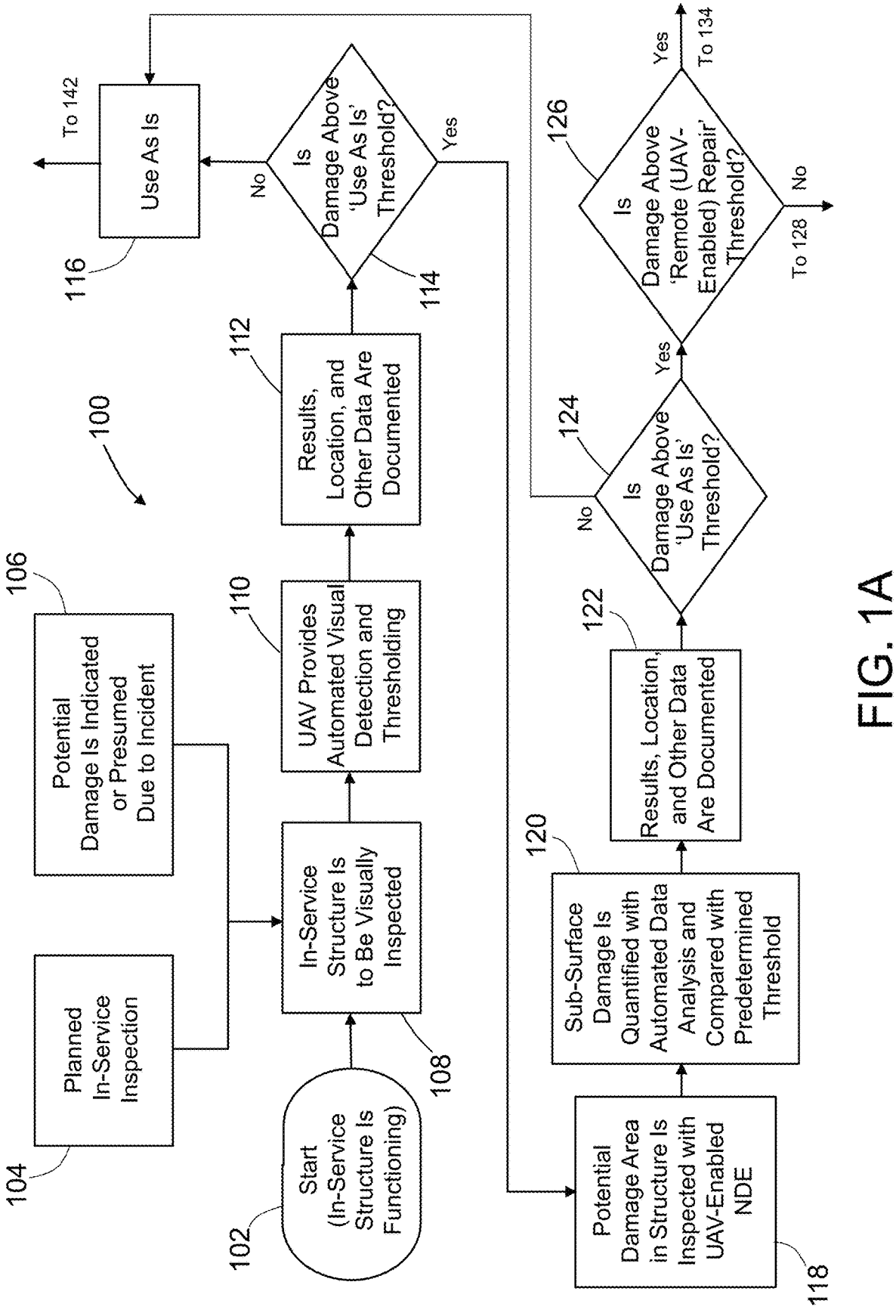
FIGS. 1A and 1B form a flowchart identifying steps of a method for inspecting and repairing a damaged portion of a large structure or object using one or more UAVs in accordance with some embodiments.

For the purpose of illustration, methods and apparatus for inspecting and repairing a structure or object using a tool-equipped UAV will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The term "structure" as used herein is not limited to aircraft and wind turbines. This disclosure relates to systems and methods that can be used to inspect and repair any number of parts or structures of different shapes and sizes, such as machined forgings, castings, pipes, or composite panels or parts. In addition, an inspected and repaired structure can include various components, such as a sub-structure for providing additional support to the structure. Further, an inspected and repaired structure may be made of any one of a number of materials. For example, an inspected and repaired structure may include a metallic material, such as aluminum, or a composite material, such as graphite-epoxy. In particular, an inspected and repaired structure can be an aircraft component made of composite material.

In accordance with the embodiments disclosed in some detail below, the UAV takes the form of a rotorcraft having multiple rotors. In accordance with the implementation disclosed herein, each rotor has two mutually diametrically opposed rotor blades. However, in alternative implementations, UAVs having rotors with more than two rotor blades may be used. As used herein, the term "rotor" refers to a rotating device that includes a rotor mast, a rotor hub mounted to one end of the rotor mast, and two or more rotor blades extending radially outward from the rotor hub. In the embodiments disclosed herein, the rotor mast is mechanically coupled to an output shaft of a drive motor, referred to hereinafter as a "rotor motor". The rotor motor drives rotation of the rotor. As used herein, the term "rotor system" means a combination of components, including at least a plurality of rotors and a controller configured to control rotor rotation rate to generate sufficient aerodynamic lift force to support the weight of the UAV and sufficient thrust to counteract aerodynamic drag in forward flight. The UAVs disclosed herein include a controller which preferably takes the form of a plurality of rotor motor controllers that communicate with an on-board computer configured to coordinate the respective rotations of the rotors. The controller is configured (e.g., programmed) to control the rotors to cause the UAV to fly along a flight path to a location where the UAV is in proximity to or in contact with an area on the surface of a structure to be inspected and repaired. (As used herein, the term "location" comprises position in a three-dimensional coordinate system and orientation relative to that coordinate system.)

In accordance with various embodiments of the process proposed herein, a UAV is configured to perform a repair operation in a manner that enables a large structure, such as an aircraft or a wind turbine, to be returned to service quickly after an impact incident or discovery of potential damage. In accordance with some embodiments, the UAV is equipped with means for collecting information (e.g. image, scans, and three-dimensional (3-D) location data) which may indicate the presence of anomalies.

Figure 1B:
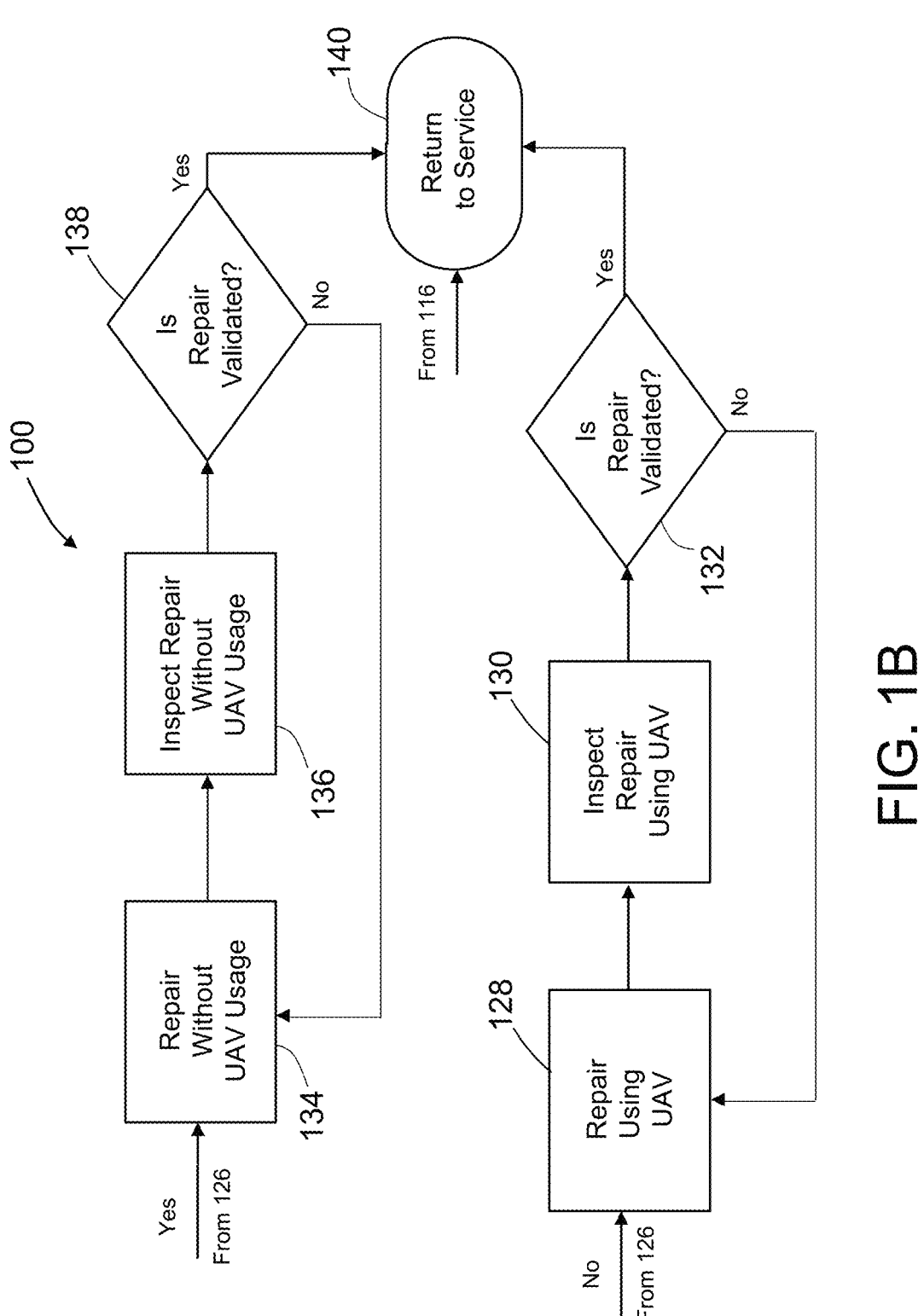

FIGS. 1A and 1B form a flowchart identifying steps of a method 100 for inspecting and repairing a damaged portion of a large structure or object that is in service using one or more UAVs. As will be explained in more detail below, a computer on-board the UAV may be configured to determine whether acquired data indicates damage greater (above) or less (below) than a particular threshold value. As used herein, a "use as is" threshold means a threshold which has been specified to demarcate between structure that does not require a repair (e.g., if the indicated damage is less than or below the "use as is" threshold) and structure that potentially requires repair (e.g., if the indicated damage is greater than or above the "use as is" threshold). As used herein, a "remote repair" threshold means a threshold which has been specified to demarcate between structure that requires a repair that could be performed by a UAV (e.g., if the indicated damage is less than or below the "remote repair" threshold) and structure that requires a repair not performed by a UAV (e.g., if the indicated damage is greater than or above the "remote repair" threshold).

Referring to FIG. 1A, at the start 102 of the method 100, the in-service structure is functioning, but either the scheduled time for a planned in-service inspection has arrived (step 104) or potential damage to the in-service structure is indicated or presumed due to an incident (step 106). For example, an object impact event has been detected or suspected.

The overall inspection and repair process is initiated when a maintenance operations center dispatches a UAV equipped with a camera to perform a visual inspection of the in-service structure (step 108). The dispatched UAV flies to the vicinity of the possible impact area (hereinafter "area of interest"), uses the camera to acquire images of the area of interest, and then compares the acquired image data to a first "use as is" threshold (step 110). The results of the visual inspection and thresholding, the location of the imaged area and other data are then recorded in a non-transitory tangible computer-readable storage medium on-board the camera-equipped UAV (step 112). A computer on-board the camera-equipped UAV then makes a determination whether the damage indicated by the image data is above the first "use as is" threshold or not (step 114). In the alternative, if the camera-equipped UAV is not also equipped with an NDI sensor unit, then the camera-equipped UAV wirelessly transmits data representing the results of the visual inspection and thresholding, data representing the location of the imaged area and other data to the maintenance operations center for evaluation.

On the one hand, if a determination is made in step 114 that the damage indicated by the image data is not above the first "use as is" threshold, then the structure is used as is (step 116) and returned to service (step 140 in FIG. 1B). On the other hand, if a determination is made in step 114 that the damage indicated by the image data is above the first "use as is" threshold, then a UAV equipped with an NDI sensor unit (which may be the same UAV as the camera-equipped UAV or a separate UAV) is flown to a location where the NDI sensor unit is within an measurement range of the potentially damaged area (hereinafter "potential damaged area") on the surface of the structure. For example, the NDI sensor-equipped UAV may land on the surface of the structure and then use the NDI sensor unit to acquire NDI sensor data in the potential damaged area (step 118). The computer on-board the NDI sensor-equipped UAV then performs an analysis of the NDI sensor data that quantifies the subsurface damage and compares the resulting quantitative data to various predetermined thresholds (step 120). The results of the analysis and thresholding, the location of the sensed area and other data are then recorded in a non-transitory tangible computer-readable storage medium on-board the NDI sensor-equipped UAV (step 122). A computer on-board the NDI sensor-equipped UAV then makes a determination whether the damage indicated by the NDI sensor data is above a second "use as is" threshold or not (step 124). In the alternative, if the NDI sensor-equipped UAV is not also equipped with a repair tool, then the NDI sensor-equipped UAV wirelessly transmits data representing the results of the analysis and thresholding, data representing the location of the sensed area and other data to the maintenance operations center for evaluation.

On the one hand, if a determination is made in step 124 that the damage indicated by the NDI sensor data is not above the second "use as is" threshold, then the structure is used as is (step 116) and returned to service (step 140 in FIG. 1B). On the other hand, if a determination is made in step 124 that the damage indicated by the NDI sensor data is above the second "use as is" threshold, then the computer on-board the NDI sensor-equipped UAV makes a determination whether the damage indicated by the NDI sensor data is below a "remote repair" threshold or not (step 126). In the alternative, if the NDI sensor-equipped UAV is not also equipped with a repair tool, then the maintenance operations center has a computer programmed to make the determination in step 126.

Depending on the outcome of step 122 (shown in FIG. 1A), the process may proceed in accordance with either a remote or UAV-enabled repair procedure or a manual repair procedure that requires human intervention, the steps of both of which are identified in FIG. 1B. On the one hand, if a determination is made in step 122 that the damage indicated by the NDI sensor data is not above the "remote repair" threshold, then a UAV equipped with a repair tool (which may be the same UAV as the camera-equipped UAV or a separate UAV) is flown to a location where the repair tool is placed in contact with the structure in the area to be repaired. While the repair tool-equipped UAV is stationary, the damaged area is repaired using the repair tool (step 128 in FIG. 1B). On the other hand, if a determination is made in step 122 that the damage indicated by the NDI sensor data is above the "remote repair" threshold, then the NDI sensor-equipped UAV wirelessly transmits a message notifying the maintenance operations center that the structure requires direct human access for a more in-depth or complicated repair of the damaged structure (step 134 in FIG. 1B). In the latter case, a UAV-enabled repair is not made.

Still referring to FIG. 1B, following completion of the UAV-enabled repair in step 128, a UAV equipped with either a camera or an NDI sensor unit (which may be the same UAV as the camera-equipped or NDI sensor-equipped UAV described above or a separate UAV) is used to perform an inspection to verify that the repaired structure is good for service (step 130). The results of the inspection are stored in a non-transitory tangible computer-readable storage medium on-board the inspecting UAV and the UAV wirelessly transmits a message to the maintenance operations center reporting completion of the repair. A determination is then made whether the repair is validated or not (step 132). On the one hand, if the repair is not validated, then the repair procedure returns to step 128. On the other hand, if the repair is validated, then the repaired structure is returned to service (step 140).

Conversely, following issuance of the notification indicating that a repair by means not including a UAV (e.g., a manual repair) is recommended, the maintenance operations center dispatches appropriately equipped technicians to conduct a repair of the damaged area on the structure (step 134). Following completion of the repair by means not including a UAV in step 134, a NDI or visual inspection of the repaired portion of the structure is performed, also by means not including a UAV (step 136). A determination is then made whether the repair is validated or not (step 138). On the one hand, if the repair is not validated, then the repair procedure returns to step 134. On the other hand, if the repair is validated, then the repaired structure is returned to service (step 140).

Various embodiments of apparatus for performing a repair of the damaged area on the surface of a structure (step 128)

will now be described in some detail. The tools and tool support devices carried by a UAV will be referred to herein as the "payload". Such a repair payload may be fixedly or pivotably coupled to the body frame of the UAV or may be fixedly coupled to a payload support frame which is pivotably coupled to the UAV body frame. Some of the repair payloads disclosed herein are referred to as modules. As used herein, the term "module" refers to an independently operable unit that may be attached to a UAV and comprises an assembly of electronic and mechanical components configured to perform repair functions using repair matter. For example, the repair matter may be in the form of liquid sealant or coating material (optionally encapsulated) or solid tape or appliqué for use in additive repair operations.

The UAVs disclosed herein include a controller which preferably takes the form of a plurality of rotor motor controllers that communicate with an onboard computer system configured to coordinate the respective rotations of the rotors. The controller is configured (e.g., programmed) to control the rotors in accordance with flight guidance received from a 3-D localization system that tracks the location of the UAV relative to the target environment. The target destination of the UAV is a location where a plurality of standoff contact elements of the UAV contact the surface of the structure to be repaired (hereinafter "repairable structure"). Once the standoff contact elements are in contact with the surface of the repairable structure, the controller activates surface attachment devices (e.g., vacuum adherence devices) to maintain the UAV stationary at the location with the standoff contact elements abutting the surface. Then the repair tool is activated to perform the repair operation. Upon completion of the repair procedure, the UAV releases the surface attachment devices and lifts offs from the surface, again using reorientation and speed changes on a subset of the rotors.

Figure 2:
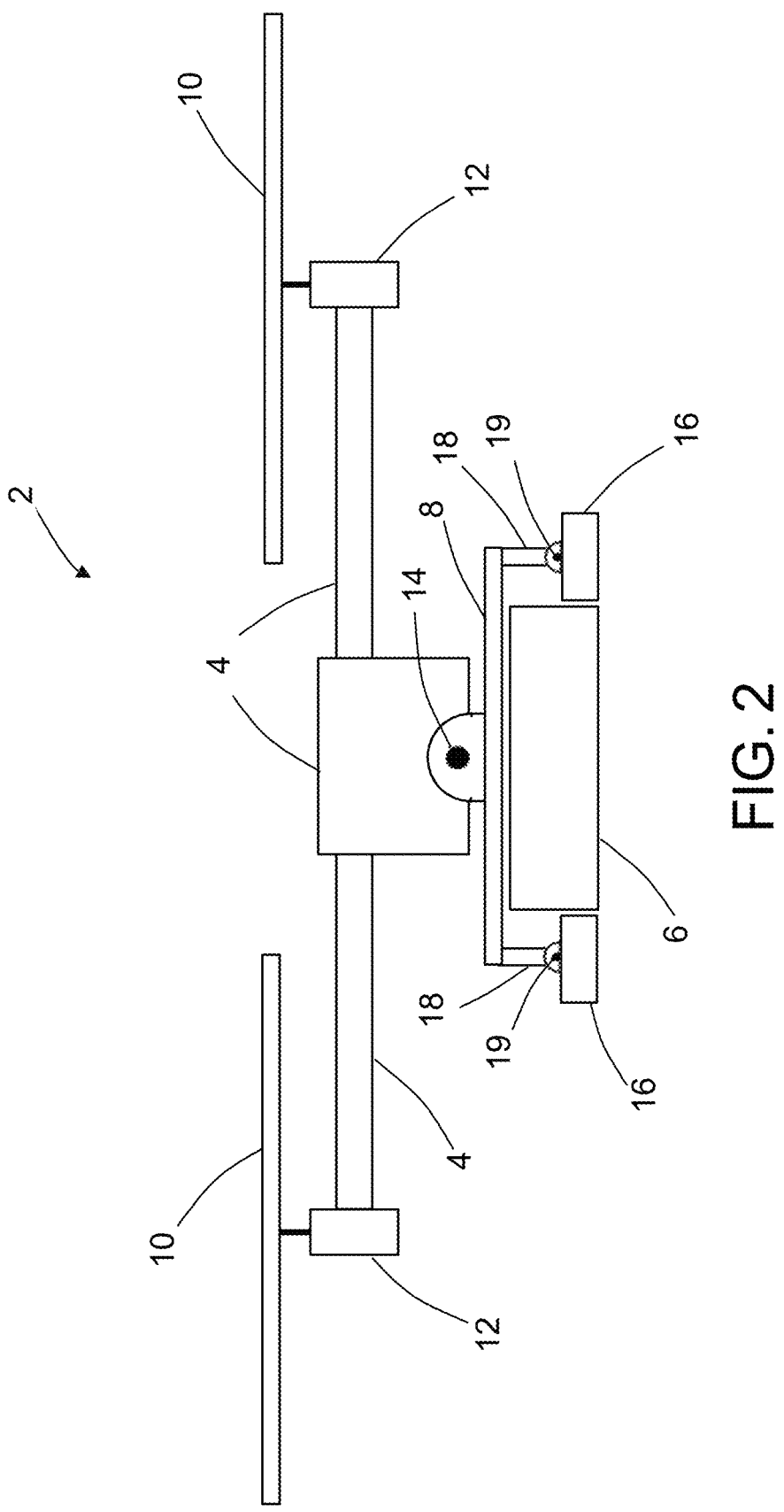
FIG. 2 is a diagram representing a side view of a payload-carrying UAV in accordance with one embodiment.

The UAV 2 depicted in FIG. 2 carries a payload 6 which includes one or more tools for performing a repair function on a surface of a remote limited-access structure. In accordance with some embodiments described in some detail below, the payload 6 is a repair module that may be uncoupled from the UAV 2 after the UAV 2 has landed and placed the repair module on a repairable surface of a limited-access structure. The UAV 2 may then takeoff, leaving the repair module on the surface to independently execute the repair operation.

As seen in FIG. 2, the UAV 2 includes a UAV body frame 4, a plurality of rotor motors 12 mounted to the UAV body frame 4, and a plurality of rotors 10 respectively operatively coupled to the plurality of rotor motors 12. In addition, the UAV 2 includes a payload support frame 8 pivotably coupled to the UAV body frame 4 by means of a gimbal pivot 14. The payload support frame 8 includes a plurality of (at least three) standoff support members 18. A respective standoff contact foot 16 is coupled to the distal end of each standoff support member 18. In one proposed implementation, the standoff contact feet 16 are made of compliant (e.g., elastomeric) material. The standoff support members 18 and standoff contact feet 16 form a standoff system that maintains the payload 6 in a standoff position relative to the surface being repaired.

Figure 2A:
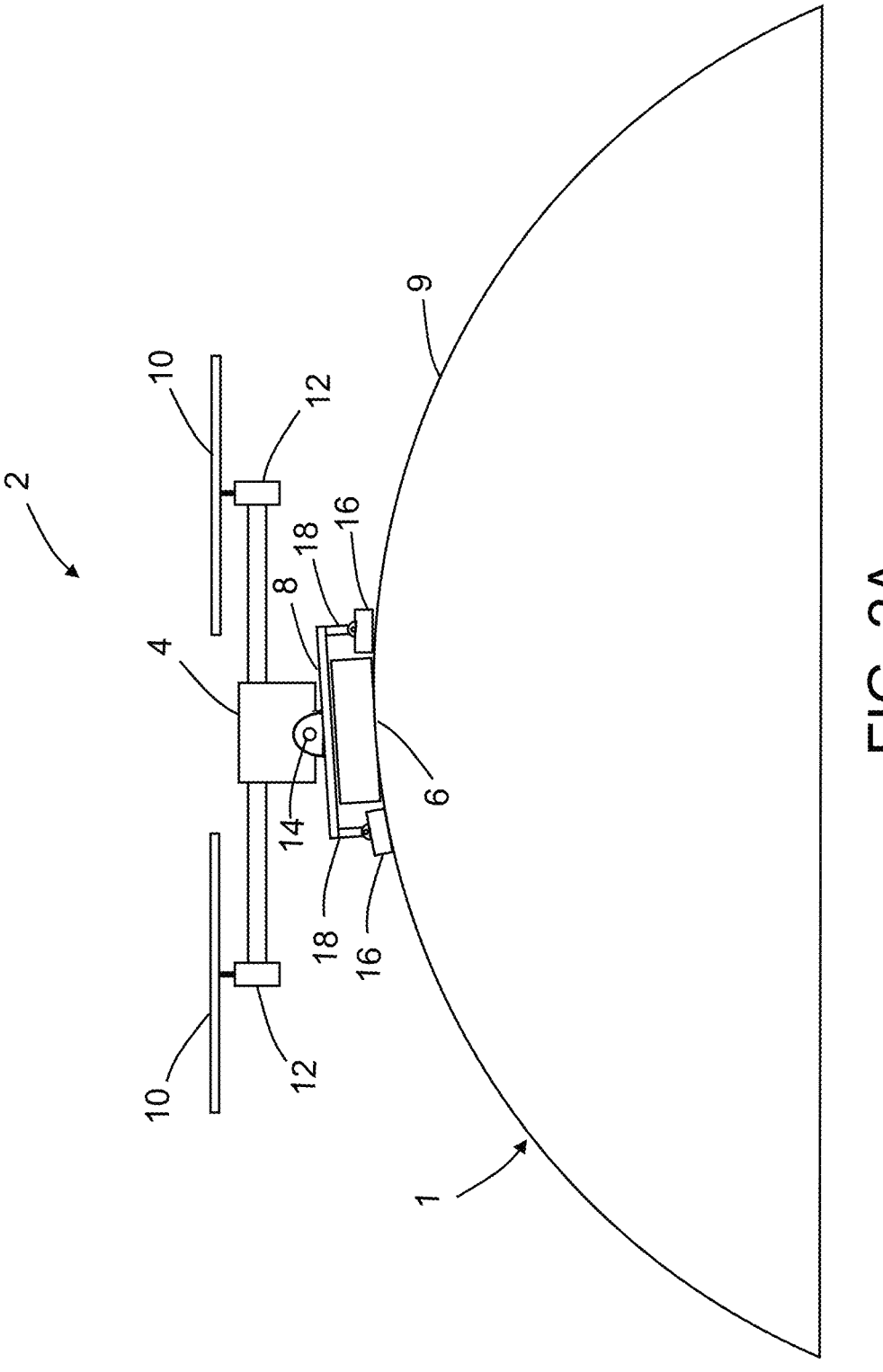
FIG. 2A is a diagram representing a side view of the payload-carrying UAV depicted in FIG. 2 after landing on a structure having a rounded surface, such as an aircraft fuselage or a storage tank.
Figure 2B:
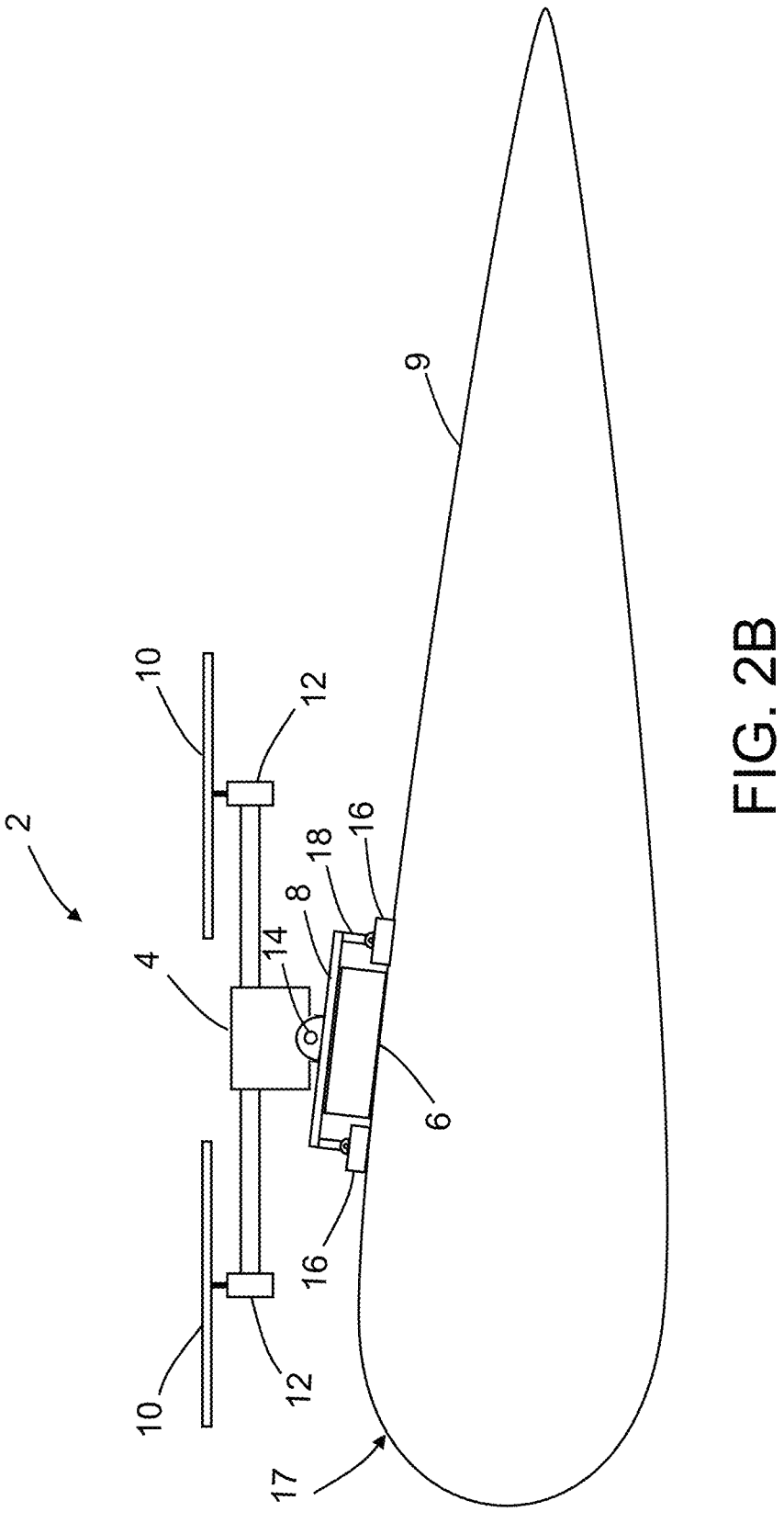
FIG. 2B is a diagram representing a side view of the payload-carrying UAV depicted in FIG. 2 after landing on an airfoil-shaped body, such as an aircraft wing or a wind turbine blade.

In accordance with the embodiment depicted in FIG. 2, the standoff contact feet 16 are pivotably coupled to the distal ends of the standoff support members 18 by means of respective pivots 19. The pivotable coupling enables the standoff contact feet 16 to adjust their orientations so that the feet lie flat on curved surfaces. FIG. 2A shows the payload-carrying UAV 2 after landing on a target object 1 having a surface 9, such as the surface an aircraft fuselage or the upper surface of a storage tank. FIG. 2B shows the same UAV 2 after landing on a surface 9 of an airfoil-shaped body 17 such as an aircraft wing or a wind turbine blade. In both scenarios, each standoff contact foot 16 is able to reorient to be parallel to a flat or tangent to a surface 9 in the area of abutment.

FIGS. 3A through 3D are diagrams representing respective three-dimensional views of a UAV 2 having a pivotable arm 3 (hereinafter "arm 3") for carrying a payload 6 at successive stages during a process of transporting and placing the payload 6 on a surface 9 of a repairable structure. The arm 3 is pivotably coupled to the frame 4 of the UAV 2 by means of a pivot 5 which is supported by a pivot support frame 4a. The support frame 4a is attached to or integrally formed with frame 4. The payload 6 is coupled to one end of arm 3 by a coupling mechanism 15 (visible in FIG. 3D). A counterweight 7 is coupled to the other end of arm 3. The payload 6 and counterweight 7 have respective known weights. Controlling the arm 3 to align the payload 6 with a portion of the surface 9 involves controlling the arm 3 taking one or more parameters into account. Specifically, controlling the angular position of arm 3 may be based on the arm length, fulcrum point (at pivot 5), counterweight, and payload weight. Controlling the angular position of arm 3 based on these factors may prevent the UAV 2 from substantially pitching or rolling when aligning the payload 6 with a portion of the surface 9 to be contacted by the payload 6. The location (position and orientation) of the pivot 5 relative to the surface 9 may be adjusted until the payload 6 lands on surface 9 by adjusting the location of the UAV 2 as it hovers in the vicinity of surface 9. The angular position of arm 3 relative to the UAV body frame 4 of UAV 2 may also be adjusted during flight.

Figure 3A:
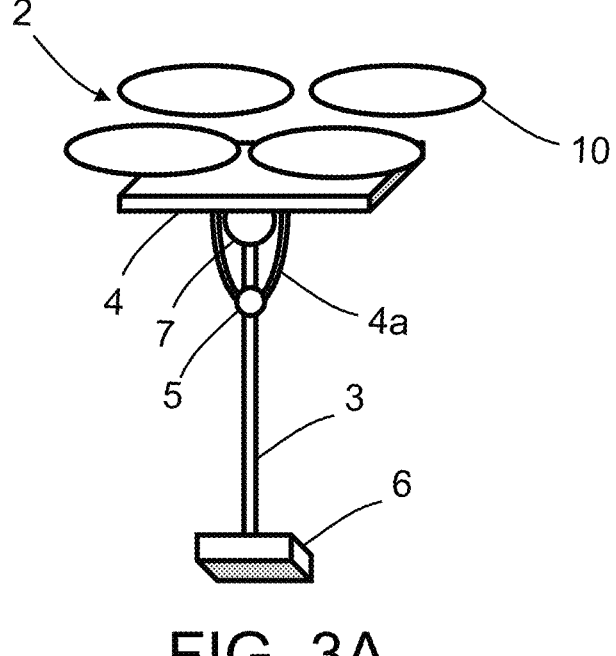
FIGS. 3A through 3D are diagrams representing respective three-dimensional views of a UAV having a pivotable arm for carrying a payload at successive stages during a process of transporting and placing the payload on a surface of a repairable structure.
Figure 3B:
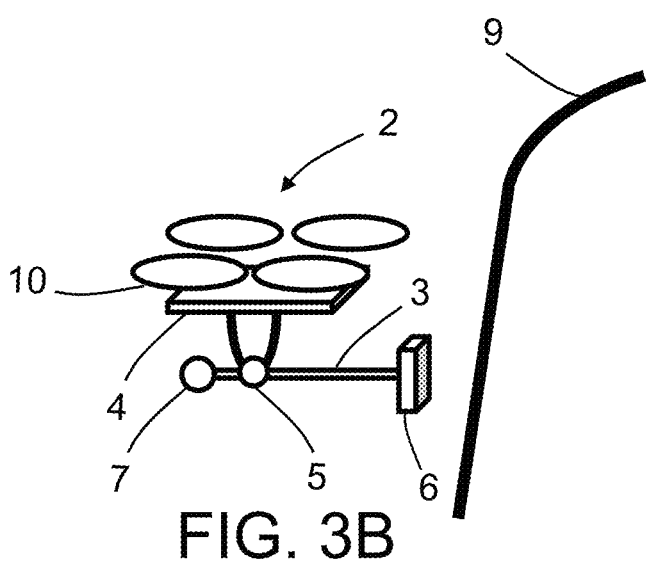
Figure 3C:
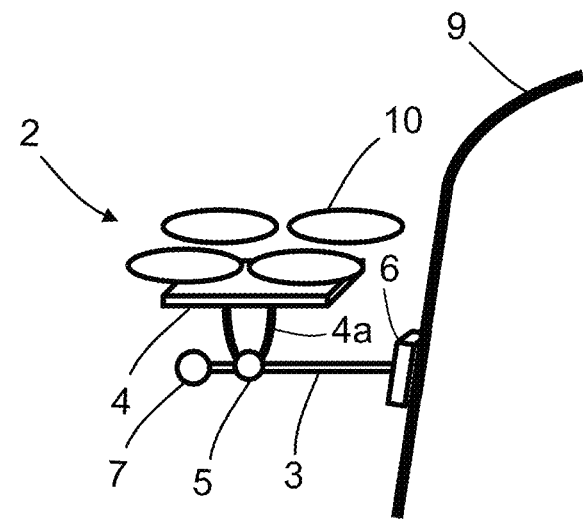
Figure 3D:
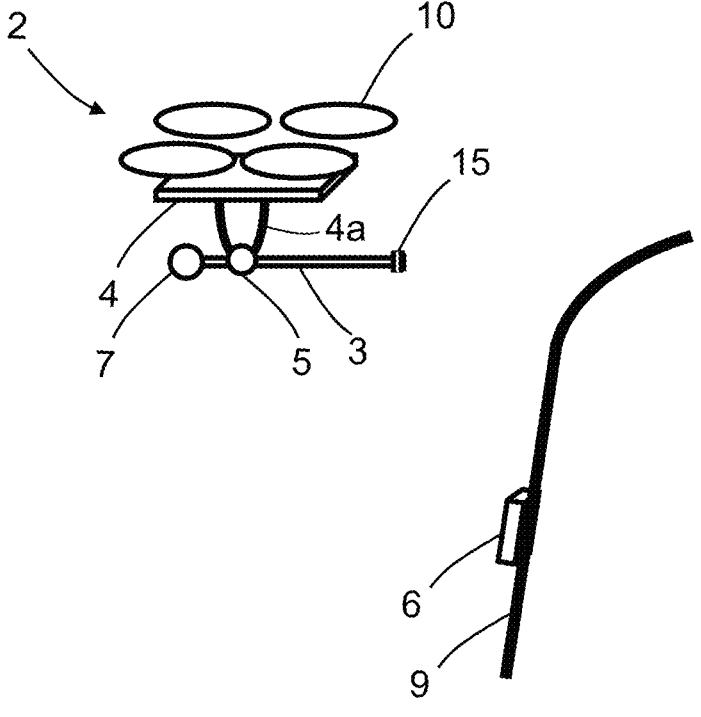

FIG. 3B depicts the UAV 2 flying toward the surface 9 while the arm 3 is oriented generally horizontal. Changing the angle of arm 3 may be accomplished using a motor (not shown in FIGS. 3A-3D) mounted to the pivot support 4a and operatively coupled to the arm 3 by a gear train (not shown in FIG. 3A-3D) or using a linear actuator (not shown in FIGS. 3A-3D) that has one end connected to the pivot support 4a and another end connected to the arm 3 at a point located at a distance from the pivot 5. FIG. 3C depicts a stage wherein the payload 6 is lying flat against the surface 9 of the repairable structure. FIG. 3D depicts a stage wherein the UAV 2 is flying away from the surface 9 after the payload 6 has been uncoupled from the arm 3 while in the state depicted in FIG. 3C. The uncoupled payload 6 may stay attached to the surface 9 due to attachment forces exerted by a plurality of surface attachment devices (not shown in FIGS. 3A-3D), such as magnetic-based devices, e.g., an electro-permanent magnet, for ferromagnetic structures, and/or vacuum-based, electrostatic-based, adhesive-based, or gripper-based devices for non-ferromagnetic structure.

In accordance with one embodiment of a method for UAV-enabled repair of a limited-access structure or target object, a tool-equipped UAV of the type shown in FIG. 2 or 3A flies toward the structure to be repaired and lands at a location such that the payload 6 (e.g., a repair module or tool) overlies or is in proximity to the damaged area on the surface of the structure or object. Then the repair module or tool is activated to perform a repair operation while the UAV 2 remains parked on the surface 9 and holds the repair module or tool in place.

In accordance with an alternative embodiment, the coupling mechanism 15 is a quick-disconnect mechanism (e.g., a quick disconnect collet) adapted to hold the payload 6 during flight. The UAV 2 may be flown to a location in proximity to the damaged area and then the payload 6 is placed on the surface of the structure or object. Surface attachment devices incorporated in the payload 6 (repair module or tool) may then be activated to temporarily but securely attach the payload 6 to the surface 9, following which the payload 6 may be uncoupled from the UAV 2. The UAV 2 is then free to take off from the surface 9, leaving the payload 6 (repair module or tool) to perform the automated repair operation.

The payload-carrying UAV 2 depicted in FIG. 2 or FIG. 3A is equally well adapted for use in repairing a wide range of structures including, but not limited to, aircraft, wind turbine blades, storage tanks, power lines, power-generating facilities, power grids, dams, levees, stadiums, large buildings, bridges, large antennas and telescopes, water treatment facilities, oil refineries, chemical processing plants, high-rise buildings, and infrastructure associated with electric trains and monorail support structures. The system is also particularly well suited for use inside large buildings such as manufacturing facilities and warehouses. Virtually any structure that would be difficult, costly, or too hazardous to be repaired by a human controlling the repair tool may potentially be repaired using the systems described herein. Various embodiments of repair payloads carried by a UAV 2 will be described in some detail below.

This disclosure proposes a method for spray-on non-structural or temporary repairs at remote or difficult-to-reach locations. A UAV equipped with canisters of sprayable media seals off penetrations, holes, cracks, pits, tears, etc. on in-service aircraft or wind turbines having composite or metal skins, and also fills in concavities and applies various coatings, as needed. The method takes advantage of the broadening use of UAVs to reduce the cost, time, and ergonomic issues related to maintenance activities in aerospace and other industries. In addition to UAVs, robotic crawlers, robotic arms, or other automated placement systems can be used to apply the spray-on repair method disclosed in some detail below.

In accordance with one embodiment, a UAV 2 carrying a spray-on repair module and a camera first acquires images of damage found on a surface. Using the acquired image data, an assessment is made whether temporary or non-structural spray-on repair can be done or not. If a spray-on repair is warranted, the UAV moves the spray-on repair module to a position overlying the damage. The spray-on repair module may remain attached to the UAV during the repair operation or may be detached from the UAV prior to the repair operation.

In accordance with various embodiments, the spray-on repair module has a hood that is held over the damage (by UAV thrust, robotic arm force, vacuum, electrostatic, magnetic, or temporary adhesive attachment). Pulses of direct air spray (from a compressed gas container) may be activated to clear away any loose material on or around the damage. If moisture ingress into the damage is suspected, an infrared thermographic (IRT) image is collected to determine whether moisture is present or not. Heat is generated on the surface of the repairable structure via a flash lamp or a warm air blower aimed at the surface. In one proposed implementation, the heat source is mounted inside the hood. The IRT image is collected using an infrared camera which is also mounted inside in the hood after the heat has been applied. If moisture is found, a small vacuum drawn under the hood over time may be applied to remove the moisture. Optionally, heat may be applied during this partial evacuation of the space under the hood. One or more follow-up IRT images can be taken to verify removal of the moisture. The spray-on repair may now be made while the hood is in place, as the hood controls the environment (temperature, moisture, and air velocity) adjacent to the area to be repaired. Before the repair begins, it may be necessary to remove material sticking up or lightly attached. Such material may be removed by a light sanding operation. If there is a hole or exposed structure that requires sealing, a spray canister containing sealant is activated to spray into and fill the hole created, or to simply seal off the interior material that is exposed to air. The curing of the sealant may be activated or accelerated using warm/hot air, radiant heating, or ultraviolet polymerization inside the hood. In addition, coatings needed for the particular structure may be sprayed onto the surface. For example, a nylon coating may be applied that provides for some impact resistance. A primer may be also be applied by spraying. A rain erosion coating, a color coating, and ultraviolet protection can also be sprayed on from within the hood, while the environment is controlled to ensure the best possible repair. The types of spray-on coating will be determined by the need of the repair. For very short-term temporary repairs, a quick sealing repair with no concern for color or its longevity may require only a single layer of coating material.

Figure 4:
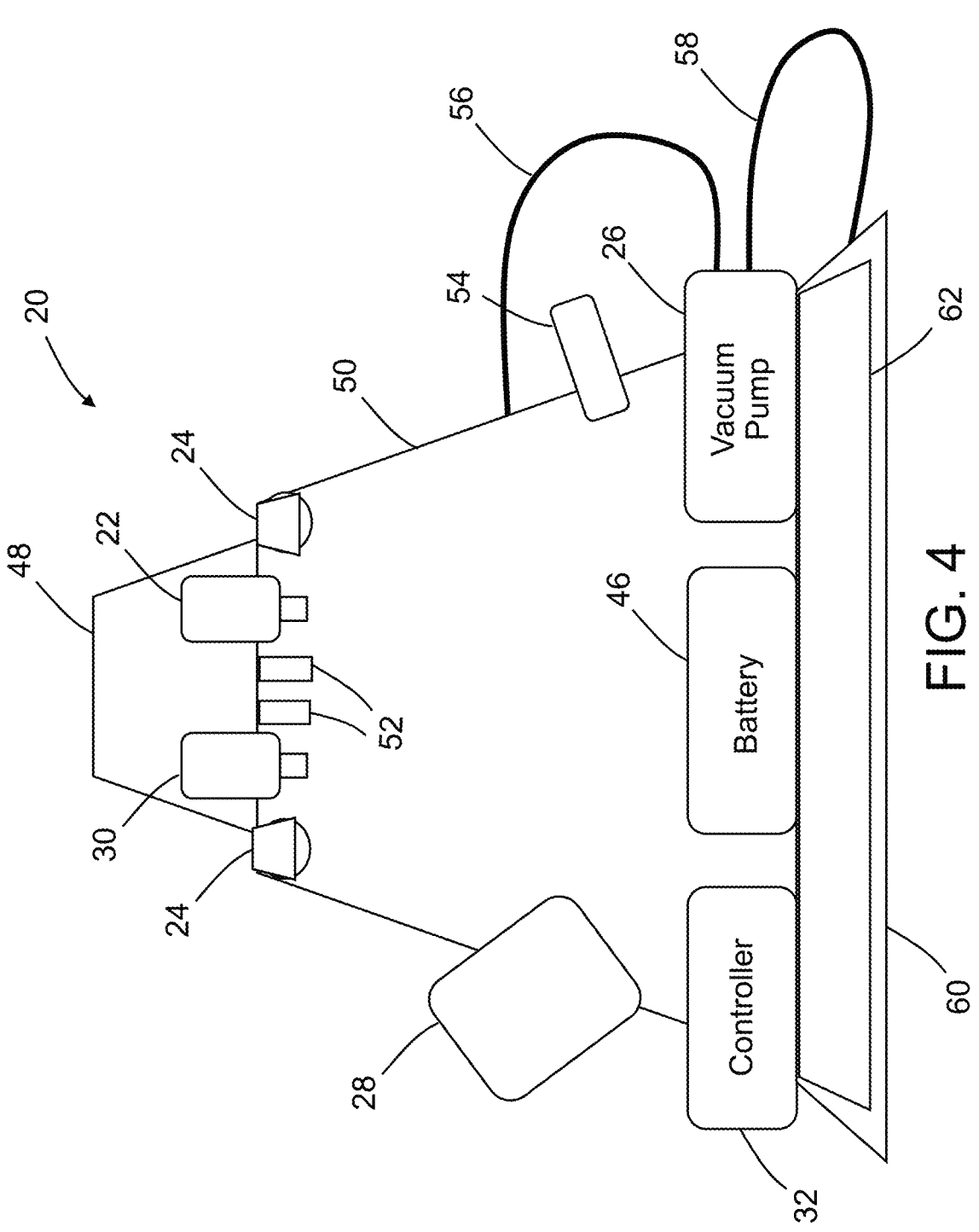
FIG. 4 is a diagram representing a side view of a spray-on repair module configured to perform a sealing or coating function in accordance with one embodiment, which spray-on repair module may be a payload carried by a UAV of one of the types depicted in FIGS. 2 and 3A or a type having a different design.

FIG. 4 is a diagram representing a side view of a spray-on repair module 20 configured to perform a sealing or coating function in accordance with one embodiment, which spray-on repair module 20 may be a payload 6 carried by a UAV 2 of one of the types depicted in FIGS. 2 and 3A or a type having a different design. The spray-on repair module 20 depicted in FIG. 4 includes a hood 50 and multiple components attached to the hood 50.

The spray-on repair module 20 further includes an attachment point 48 which may be coupled to (and uncoupled from) the payload support frame 8 of the UAV 2 depicted in FIG. 2. In alternative embodiments, the spray-on repair module 20 may be coupled to the distal end of a robotic arm or to a surface-crawling robot vehicle. The spray-on repair module 20—when coupled to a UAV 2—forms an apparatus capable of performing a repair operation on a surface of a structure which is difficult to access by maintenance personnel.

Still referring to FIG. 4, the hood 50 has an outer sealing lip 60 and an inner sealing lip 62 which facilitate vacuum adherence of the hood 50 to and removal of moisture from the surface being repaired. Sealing the hood 50 to the repairable surface means that the environment in the volume of space underneath the hood 50 may be controlled in accordance with the specifications of the planned spray-on repair operations.

As seen in the proposed implementation depicted in FIG. 4, the spray-on repair module 20 includes an infrared camera 22, two or more heat lamps 24, a video camera 30, and two or more spray nozzles 52 all mounted to an upper portion of and extending at least partially into the space inside (under) the hood 50. The video camera 30 may be controlled to capture images of a surface of interest for either inspection or navigation purposes. The infrared camera 22 may be controlled to capture images of a damaged area on the surface for the purpose of inspection or to detect moisture ingress in the area. The heat lamps 24 may be activated to heat the repairable surface for IRT imaging. The spray nozzles 52 are configured and located to distribute sealant or coating material over at least a portion of the surface area covered by hood 50.

The spray-on repair module 20 depicted in FIG. 4 further includes a thermal radiation source 28 (also mounted to hood 50) that emits radiation (e.g., light or other electromagnetic radiation) for accelerating curing of the sealant/coating material applied on the repairable surface. In addition, an air nozzle 54 is installed in an opening formed in a wall of hood 50 for clearing away surface debris from the damaged area. The spray-on repair module 20 further includes a vacuum pump 26 which is mounted to the exterior of hood 50. As will be explained in more detail below, the vacuum pump 26 is used to facilitate vacuum adherence of the hood 50 to or remove moisture from the repairable surface. All of the hood-mounted components heretofore described operate under the electronic control of a controller 32, which may be mounted to a board attached to the exterior of hood 50. Electrical power to all electrically powered components is provided by a battery 46, which may also be mounted to the exterior of hood 50.

In accordance with the embodiment depicted in FIG. 4, vacuum adherence of the hood 50 to the surface 9 may be accomplished by operation of the vacuum pump 26, which is in fluid communication with the interior volume of space of hood 50 via a hose 56 and with the volume of space between the outer sealing lip 60 and inner sealing lip 62 via a hose 58. The controller 32 is configured to control operation of the vacuum pump motor 27 so that air is removed from the interior and inter-lip volumes of space. Both lips are flexible substrates, with the outer sealing lip 60 surrounding the inner sealing lip 62 with a volume of space therebetween. However, the outer sealing lip 60 is thicker to support the bulk suction. The inner sealing lip 62 is a thinner substrate. When the bottom edges of both lips are in sealing contact with a surface, the volume of space between the lips may be partially evacuated to provide the primary suction method. Likewise the interior volume of space bounded by the inner sealing lip 62 and the remainder of hood 50 may be partially evacuated to provide a secondary suction method. The pressure in the volume of space between the lips will be lower than the pressure under the hood 50 due to pressure increase from the spraying or heating of the surface under the hood 50—both pressures being less than the ambient pressure outside the hood 50, which pressure conditions are designed to generate the required vacuum adherence forces.

Figure 4A:
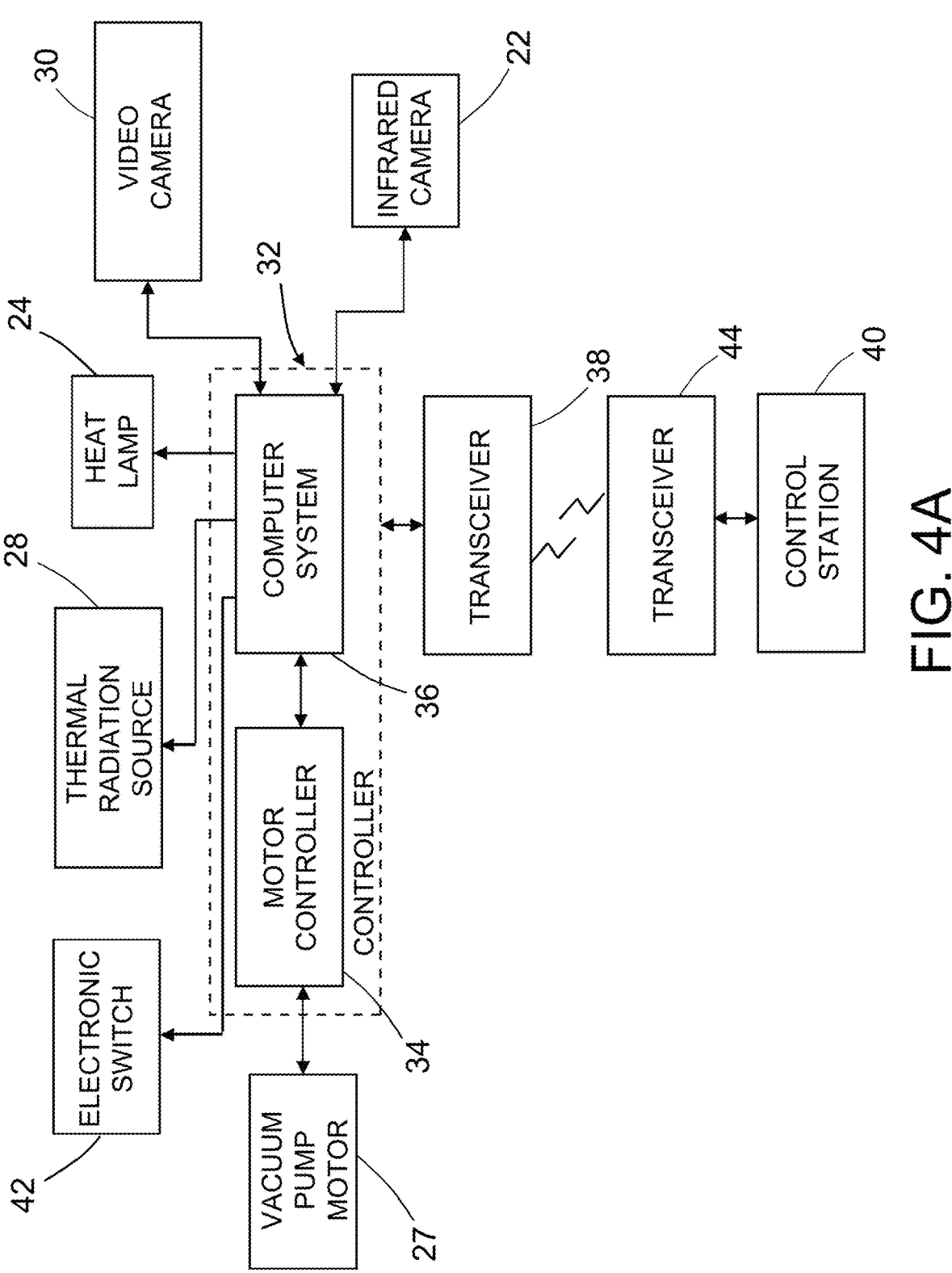
FIGS. 4A and 4B are block diagrams identifying components of the hooded system for spraying sealant or other coating material depicted in FIG. 4.
Figure 4B:
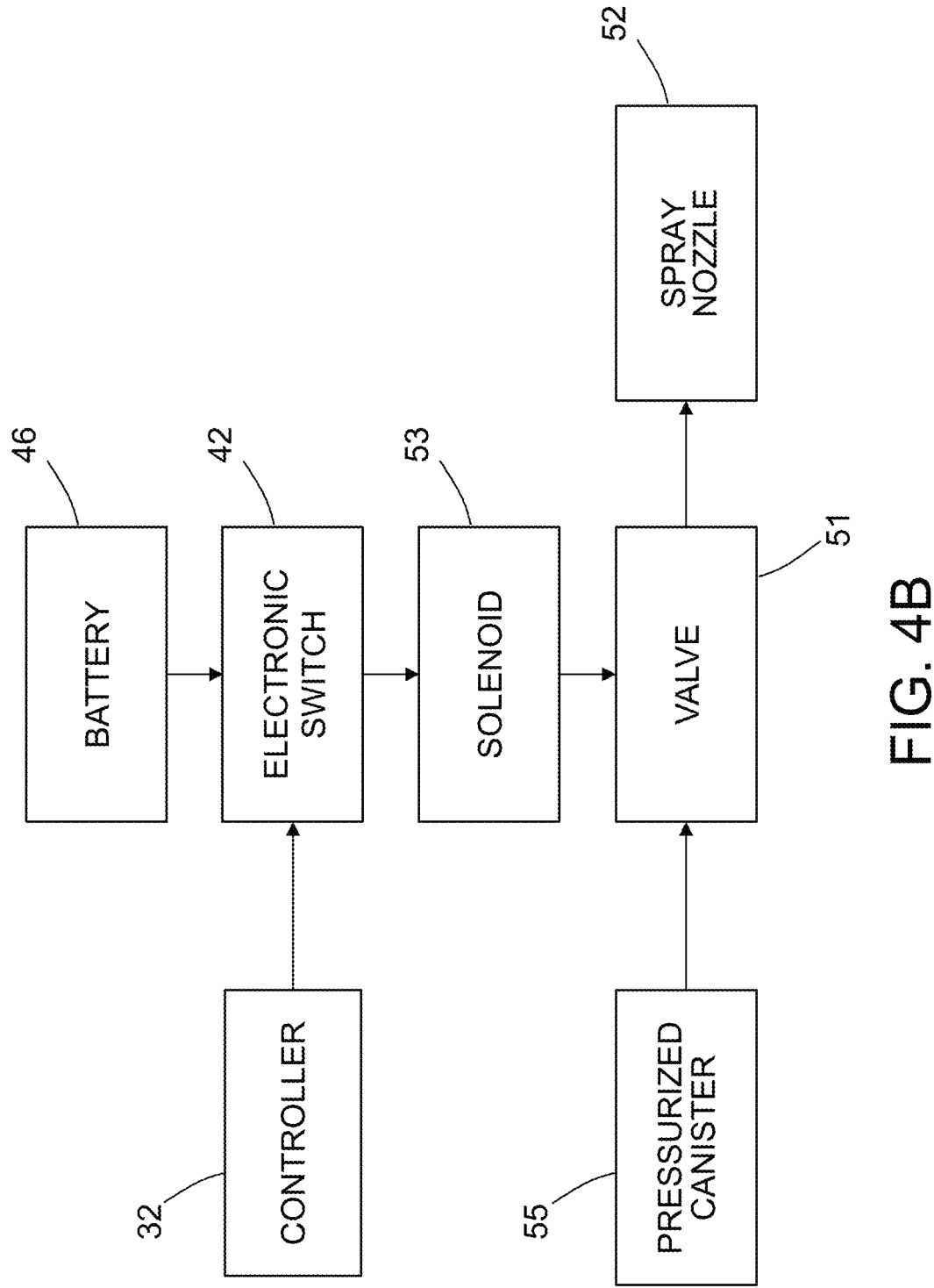

FIGS. 4A and 4B are block diagrams identifying components of the hooded system for spraying sealant or other coating material depicted in FIG. 4. As shown in FIG. 4A, the controller 32 is communicatively coupled to all electrical components of the spray-on repair module 20. The controller 32 includes a computer system 36 (e.g., one or more processors communicatively coupled by a bus) and a motor controller 34 which is communicatively coupled to the computer system 36. The motor controller 34 is configured for controlling a vacuum pump motor 27 that is part of vacuum pump 26 shown in FIG. 4. The computer system 36 also controls operation of the infrared camera 22, heat lamp 24, thermal radiation source 28, and video camera 30. Although not shown in FIG. 4A, the spray-on repair module 20 may further include relays having selectable switching states for respectively electrically coupling the heat lamp 24 and thermal radiation source 28 to the battery 46, in which case the controller 32 is further configured to control the switching states of the relays. As explained in some detail below with reference to FIG. 4B, the computer system 36 also controls the switching state of an electronic switch 42 that may be closed to provide electric power to a solenoid-actuated valve that controls the supply of sealant or coating material to the spray nozzles 52.

The hood 50 may also have surface attachment devices, such as magnetic-based devices, e.g., an electro-permanent magnet, for ferromagnetic structures, and/or vacuum-based, electrostatic-based, adhesive-based, gripper-based devices for non-ferromagnetic structure. The surface attachment devices also operate under the control of the computer system 36.

In the embodiment partly depicted in FIG. 4A, the infrared camera 22, heat lamp 24, thermal radiation source 28, and video camera 30 are controlled by the computer system 36 as a function of radiofrequency commands transmitted by a control station 40 on the ground. Those radiofrequency commands are transmitted by a transceiver 44 on the ground, received by a transceiver 38 incorporated in the spray-on repair module 20 (or on-board the UAV 2), and converted by the transceiver 38 into the proper digital format. The resulting digital commands are then forwarded to the computer system 36. The control station 40 may comprise a general-purpose computer system configured with programming for controlling operation of the UAV 2 and the spray-on repair module 20. For example, the flight of the UAV 2 can be controlled using a joystick, keyboard, mouse, touchpad, or touchscreen of a computer system at the control station 40 or other user interface hardware (e.g., a gamepad or a pendant). In addition, the computer system at the control station 40 is configured with programming for processing data received from the UAV 2 during an inspection operation. In particular, the computer system of the control station 40 may comprise a display processor configured with software for controlling a display monitor (not shown in FIG. 4A) to display images acquired by the video camera 30 or infrared camera 22.

As shown in FIG. 4B, the spray-on repair module 20 further includes a pressurized storage canister 55 (not shown in FIG. 4, but mounted to the exterior of hood 50) containing a sealant or coating material in a liquid state and a valve 51 in fluid communication with the pressurized storage canister 55. The spray nozzles 52 are in fluid communication with valve 51. Each spray nozzle 52 is configured and located to distribute the sealant or coating material over an area on a surface of a structure which is covered by the hood 50. The spray-on repair module 20 further includes an electronic switch 42. The controller 32 is configured to control a switching state of electronic switch 42 to cause valve 51 to open and distribute sealant or coating material from the pressurized storage canister 55 over the damaged area. More specifically, opening and closing of valve 51 is determined by actuation of a solenoid 53. When the controller 32 opens electronic switch 42, the solenoid 53 receives electric power from the battery 46 for actuating the valve 51 to open.

A solenoid-actuated valve of the type depicted in FIG. 4B may also be employed to connect the air nozzle 54 to a container containing compressed gas (not shown in FIG. 4B). The air nozzle 54 is configured and located to direct a jet of air toward the damaged area when the solenoid-actuated valve is open (for example, prior to spraying). An additional electronic switch is provided for controlling the state of the air nozzle valve. The controller 32 is further configured to control the switching state of the additional electronic switch to cause the air nozzle valve to open. The resulting jet of air may be used to blow debris away from the damaged area prior to the application of sealant or coating material.

Referring again to FIG. 4A, after the sealant or coating material has been deposited onto the surface by spraying, the thermal radiation source 28 may be activated by the controller 32 to emit radiation for aiding (accelerating) curing of the sealant or coating material. The controller 32 is configured to control operation of the thermal radiation source 28 in accordance with a curing protocol that is dependent on the particular curable material being used.

For sake of illustration, one example of a method for sealing or coating a surface using the spray-on repair module 20 depicted in FIG. 4 will now be described. In accordance with one embodiment, initially the spray-on repair module 20 comprising a hood 50 and a sprayer (e.g., spray nozzle 52) is coupled to a UAV 4. Then the UAV 2 is flown to a location where the hood 50 covers a damaged area on a surface 9 of a structure. The hood 50 is then sealed to the surface 9 of the structure by partially evacuating the volume of space between the outer and inner sealing lips 60 and 62 (see FIG. 4). Then debris on the area of the surface underneath the hood 50 is cleared away by emitting a jet of air from the air nozzle 54. Next the surface area covered by the hood 50 is heated by activating one or more heat lamps 24. Then the infrared camera 22 is used to capture an infrared image of the heated area. The infrared image data is wirelessly transmitted to a ground station for processing. At the ground station, the infrared image is processed to detect the presence of moisture on the covered area. The interior volume underneath the hood 50 is then partially evacuated to remove moisture. Then the sprayer is activated to spray curable sealing or coating material on at least a portion of the area covered by the hood 50. Following the spraying operation, curing of the curable sealing or coating material on the surface 9 is accelerated by emitting radiation from the thermal radiation source 28. The vacuum adherence of the hood 50 to the surface 9 is then discontinued so that the module may be removed from the surface 9 by the UAV 2.

In an alternative scenario, instead of spraying on a sealant or other coating material on a damage site, the damaged area may be temporarily repaired by applying a tape or appliqué (hereinafter "tape"). Speed tape or appliqué quick repairs are done in the military and commercial aircraft world to provide a fast, temporary sealing of surface damage. These repairs are beneficial because they eliminate the need to take the aircraft out of service immediately, and allow the aircraft to continue operation until a more convenient time. Such repairs are for relatively minor damage states where there is no chance of damage growth due to standard operations. The repairs prevent moisture from accumulating in the damage and causing greater damage. The problem is that these simple repairs require the repair technician to have direct access to the damaged area. This often takes time to get a lift (if available) and perform the repair and subjects the structure to a risk of further damage. Also the technician has to address the common safety and ergonomic issues. A UAV-enabled process would eliminate these issues and provide a rapid solution.

The solution proposed herein is an apparatus comprising a UAV and means for applying a speed tape or appliqué quick repair to the surface of a difficult-to-access structure, which tape applying means are coupled to the UAV during flight to the damage site, but which may be uncoupled from the UAV to perform the repair operation independently. Direct human interaction with the surface is not required to seal a damaged area from moisture until a later time when a more substantial repair may be performed. The method utilizes one of several embodiments that involve a roller or rocker system that applies pressure while placing the speed tape or appliqué onto the surface. Various embodiments of a module for applying a speed tape or appliqué quick repair to the surface of a difficult-to-access structure using a UAV are described below with references to FIGS. 5-8.

In accordance with one proposed methodology, the UAV is also equipped with a video camera. Before a repair operation begins, the UAV hovers in the vicinity of a surface of a limited-access structure while the video camera captures images of that surface. If the image data indicates that damage exists, then a determination is made whether tape should be applied to the damage site or not. If a quick repair by applying tape is warranted, the UAV is guided to fly along a path that brings the tape applicator carried by the UAV into contact with the surface at a start-tape-laying position.

Figure 5:
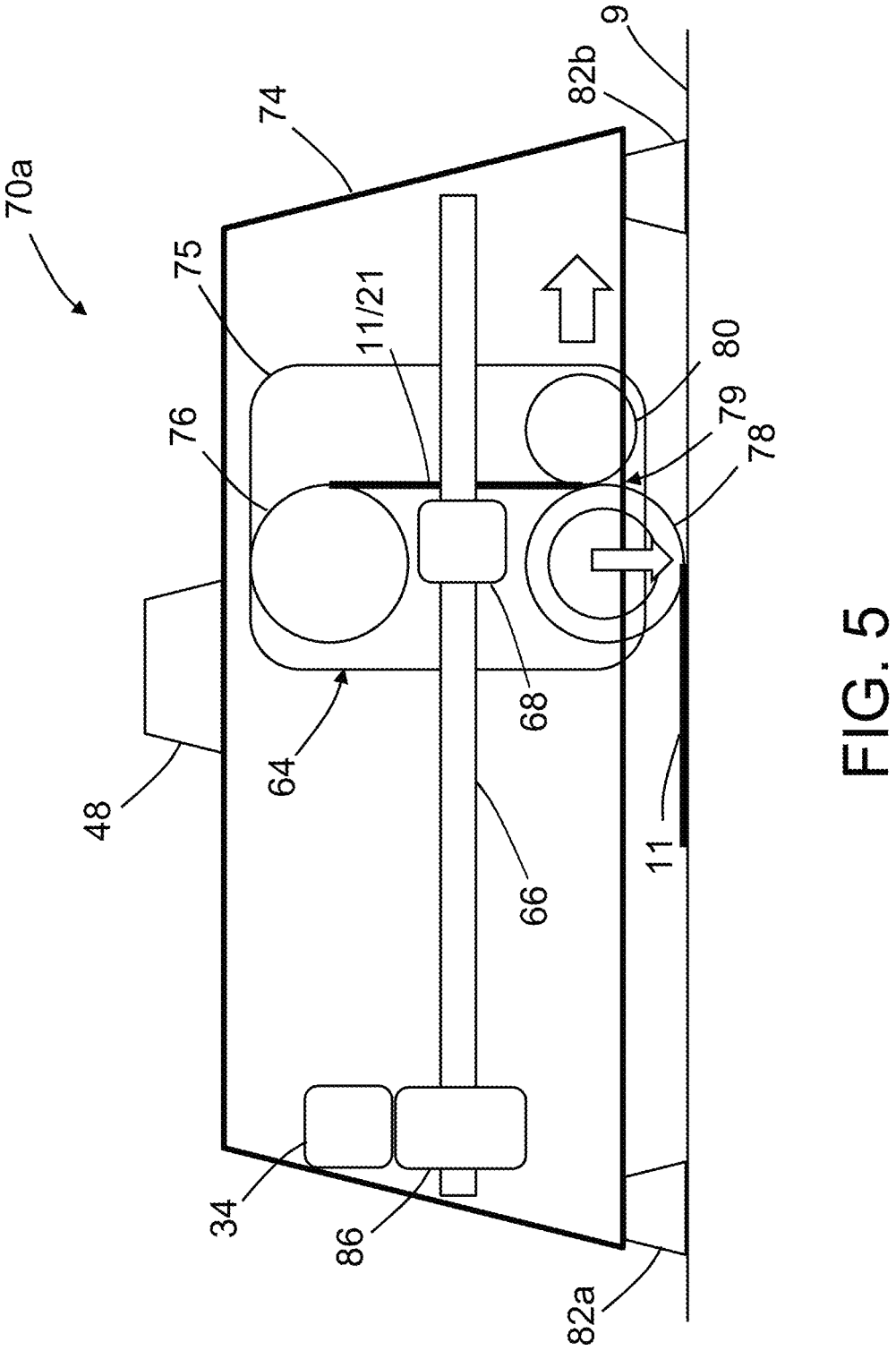
FIGS. 5, 6, and 7 are diagrams representing side views of some components of respective roller tape applicators (with a wall removed to show internal components) in accordance with first, second and third embodiments. Each roller tape applicator may be a payload carried by a UAV of one of the types depicted in FIGS. 2 and 3A or a type having a different design.

FIG. 5 shows a side view of some components of a roller tape applicator 70*a* (with a wall of a base frame 74 removed to show internal components) in accordance with a first embodiment. The roller tape applicator 70*a* may be a payload 6 carried by a UAV 2 of one of the types depicted in FIGS. 2 and 3A or a type having a different design. The roller tape applicator 70*a* includes a base frame 74 and an attachment point 48 connected to the base frame 74. The attachment point 48 may be coupled to (and uncoupled from) the payload support frame 8 of the UAV 2 depicted in FIG. 2 or may be attached to (and uncoupled from) the distal end of the arm 3 of the UAV depicted in FIG. 3A. More specifically, the attachment point 48 may be attached to a coupling mechanism 15, which may be a latch which is operable to selectively couple or de-couple the base frame 74 from the UAV 2. In addition, the base frame 74 is provided with a plurality (e.g., four) of surface attachment feet which are configured to hold the base frame 74 in contact with a surface 9 of a structure with a holding force. Only two attachment feet 82*a* and 82*b* are shown in FIG. 5. The surface attachment feet 82*a* and 82*b* may be magnetic-based devices, e.g., an electro-permanent magnet, for ferromagnetic structures, and/or vacuum-based, electrostatic-based, adhesive-based, or gripper-based devices for non-ferromagnetic structure.

The roller tape applicator 70*a* further includes a rail 66 that is supported by the base frame 74 in a position that is parallel to the surface 9, which in the example depicted in FIG. 5 is flat (planar). The roller tape applicator 70*a* further includes an applicator head 64 that translates along the rail 66 during a tape-laying operation. The translation of applicator head 64 in a horizontal direction parallel to the surface 9 during tape laying is indicated by the horizontal arrow in FIG. 5. More specifically, the applicator head 64 includes a carriage 68 which travels along the rail 66. Translation of carriage 68 along the rail 66 may be driven by a lead screw (in which case the carriage 68 includes a nut threadably coupled to the lead screw) or by a belt (in which case the carriage includes a pulley on which the belt circulates and a pinion gear which rotates with the pulley and engages a rack on the rail). These drive mechanisms (not shown in FIG. 5) are well known in the mechanical arts and are not described in further detail here. A carriage drive motor 86 is mounted inside the base frame 74 and operatively coupled to drive movement of the carriage 68 along the rail 66. A motor controller 34 is configured to generate motor control signals for controlling operation of the carriage drive motor 86 to achieve a direction of movement and a target speed of the carriage 68 during tape laying.

The applicator head 64 further includes a housing 75 that incorporates three mutually parallel axles (not shown in FIG. 5) to which respective tape-winding components are rotatably coupled. The first tape-winding component is a supply spool 76 which is coupled to one axle of the housing 75 and has a portion of a continuous tape 11 (hereinafter "tape 11") wrapped around it. More precisely, a first portion of tape 11 having pressure-sensitive adhesive on one side and a first portion of a continuous release liner 21 (hereinafter "release liner 21") in contact with the pressure-sensitive adhesive are wrapped around the supply spool 76.

The applicator head 64 depicted in FIG. 5 further includes an applicator roller 78 rotatably coupled to another axle of the housing 75. The applicator roller 78 has a compliant and air-permeable outer surface in contact with a second portion of tape 11. The compliant outer surface material may be silicone rubber or a similarly compliant material.

The applicator head 64 further includes a tensioned take-up spool 80 rotatably coupled to the third axle of the housing 75. A second portion of release liner 21 is wrapped around the take-up spool 80. The applicator roller 78 and take-up spool 80 form a nip 79 where the second portions of tape 11 and release liner 21 are still in contact. After the nip 79, the second portions of tape 11 and release liner 21 are separate, with the second portion of tape 11 being adhered to one quadrant of the compliant and air-permeable outer surface of the applicator roller 78 and the second portion of release liner 21 being wrapped around the take-up spool 80. It should be appreciated that the portions of tape 11 and release liner 21 which are in contact with the spools or rollers are not shown in FIG. 5. The only portions of the tape 11 and release liner 21 which are visible in FIG. 5 are respective third portions of tape/release liner 11/21, which have been unwound from supply spool 76 but not yet separated, and a fourth portion of tape 11 which has already been laid on the surface 9 in the scenario depicted in FIG. 5. The third portions of tape/release liner 11/21 extend from a point tangent to the outer surface of the supply spool 76 to the nip 79.

Still referring to FIG. 5, the carriage 68 of the applicator head 64 is slidably coupled to the rail 66, while the housing 75 of the applicator head 64 is coupled to and carried by the carriage 68. As the carriage 68 moves along the rail 66, the applicator roller 78 rolls and lays tape 11 on the surface 9. The roller tape applicator 70a may be designed so that the holding forces produced by the surface attachment devices cause the applicator roller 78 to apply sufficient pressure to adhere the pressure-sensitive adhesive of tape 11 to the surface 9 during rolling. In alternative embodiments, a force applicator (not shown in FIG. 5) may be installed between the carriage 68 and housing 75 to press the applicator roller 78 against the surface 9 with sufficient force to activate the pressure-sensitive adhesive. The force applicator may be a pair of springs or linear actuators that urge the housing 75 (and the axle to which the applicator roller 78 is rotatably coupled) toward the surface 9.

Figure 6:
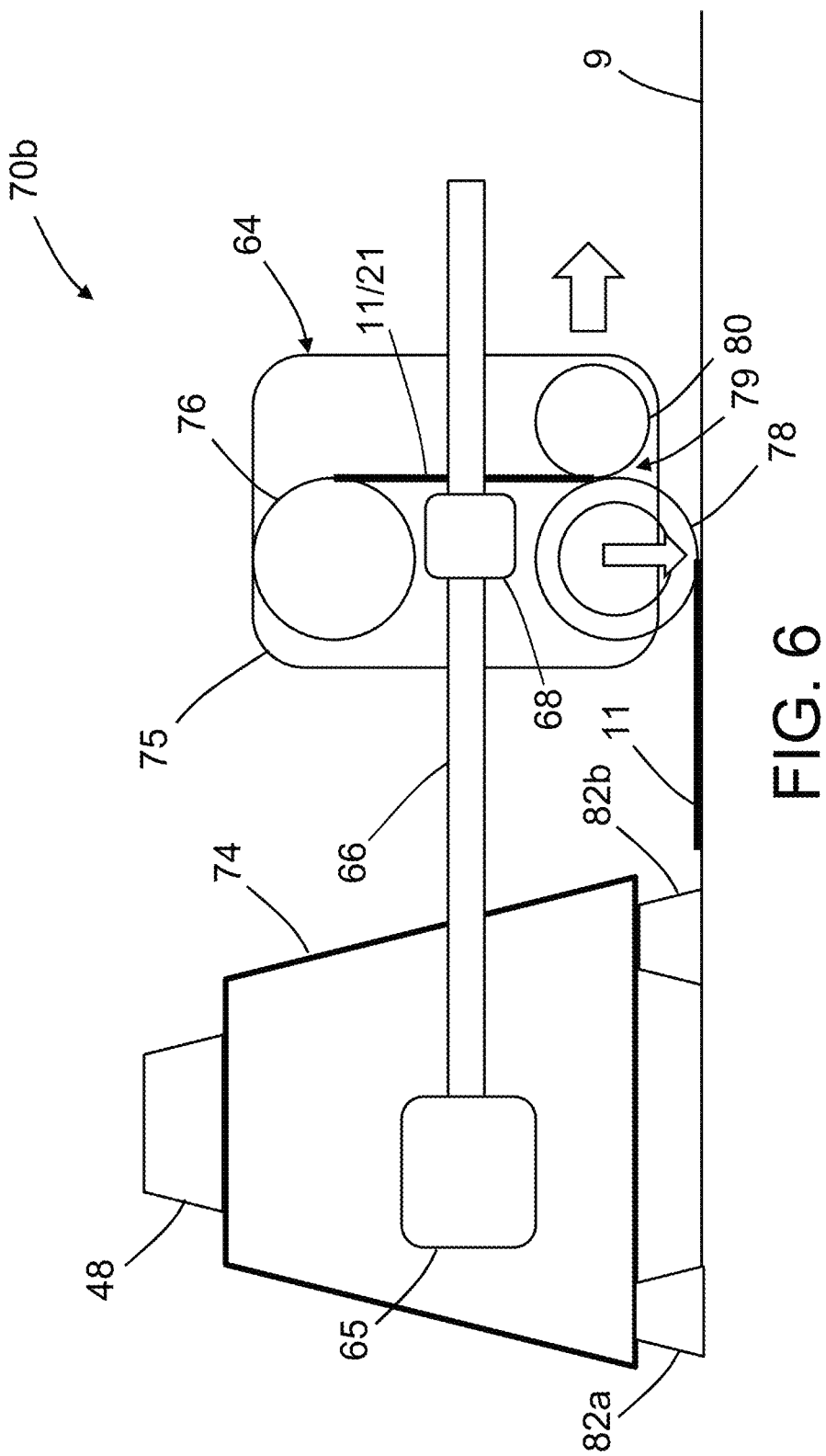

In accordance with the embodiment depicted in FIG. 5, the roller applicator head 64 is disposed inside the base frame 74. In accordance with an alternative embodiment depicted in FIG. 6, the roller applicator head 64 is disposed outside the base frame 74. FIG. 6 shows a side view of some components of a roller tape applicator 70b (with a wall of a base frame 74 removed to show internal components) in accordance with a second embodiment. The second embodiment differs from the first embodiment in that the rail 66 extends outside the base frame 74. The applicator head 64 depicted in FIG. 6 may be identical to the applicator head 64 depicted in FIG. 5. The carriage 68 is driven to travel along the rail 66 by a carriage drive motor not shown in FIG. 6. Instead FIG. 6 shows a torque applicator 65 mounted inside the base frame 74 and operative coupled to the rail 66. In the second embodiment, the rail 66 is pivotable about an axis of rotation that is displaced from a point along the rail 66 where the torque applicator 65 applies a torque that presses the applicator roller 78 against the surface 9 with sufficient force to activate the pressure-sensitive adhesive on laid tape 11.

Figure 7:
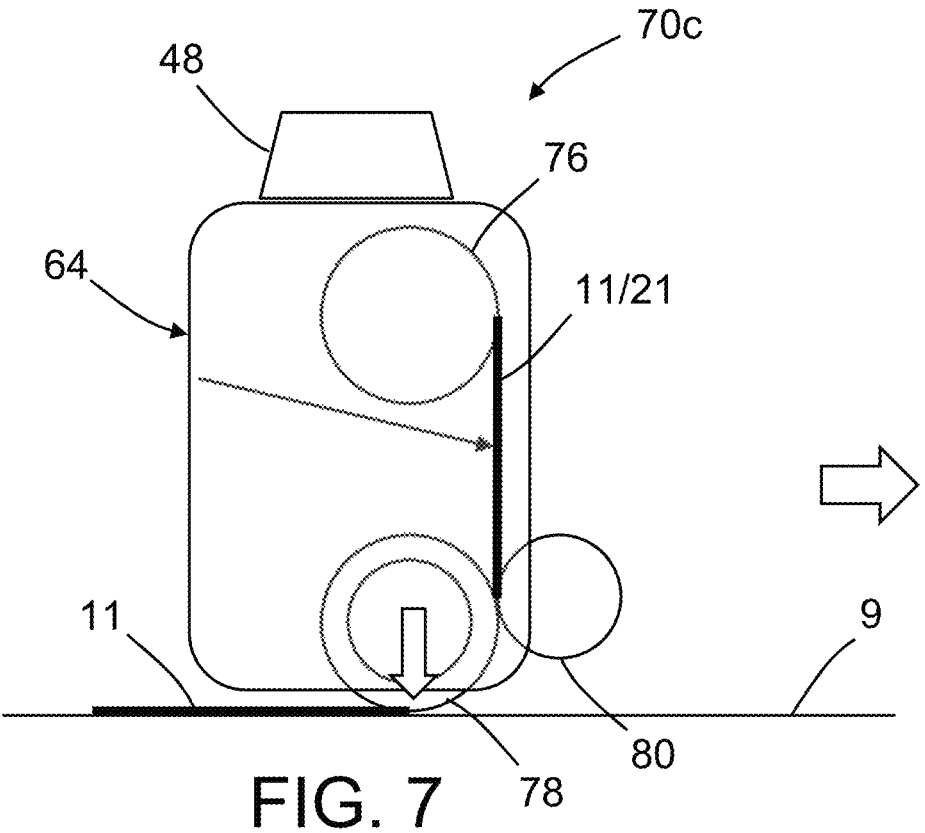

FIG. 7 shows a side view of some components of a roller tape applicator 70c in accordance with a third embodiment. The roller tape applicator 70c may be a payload 6 carried by a UAV 2 of one of the types depicted in FIGS. 2 and 3A or a type having a different design. The roller tape applicator 70c includes an applicator head 64 which is identical to the applicator head 64 depicted in FIG. 5, except that the housing 75 of the applicator head 64 is directly connected to the attachment point 48. Instead of moving the applicator head 64 along a rail 66 by means of a motorized carriage, the applicator head 64 may be moved across a surface 9 by the UAV 2 that carried the applicator head 64 to the damage site.

Figure 23:
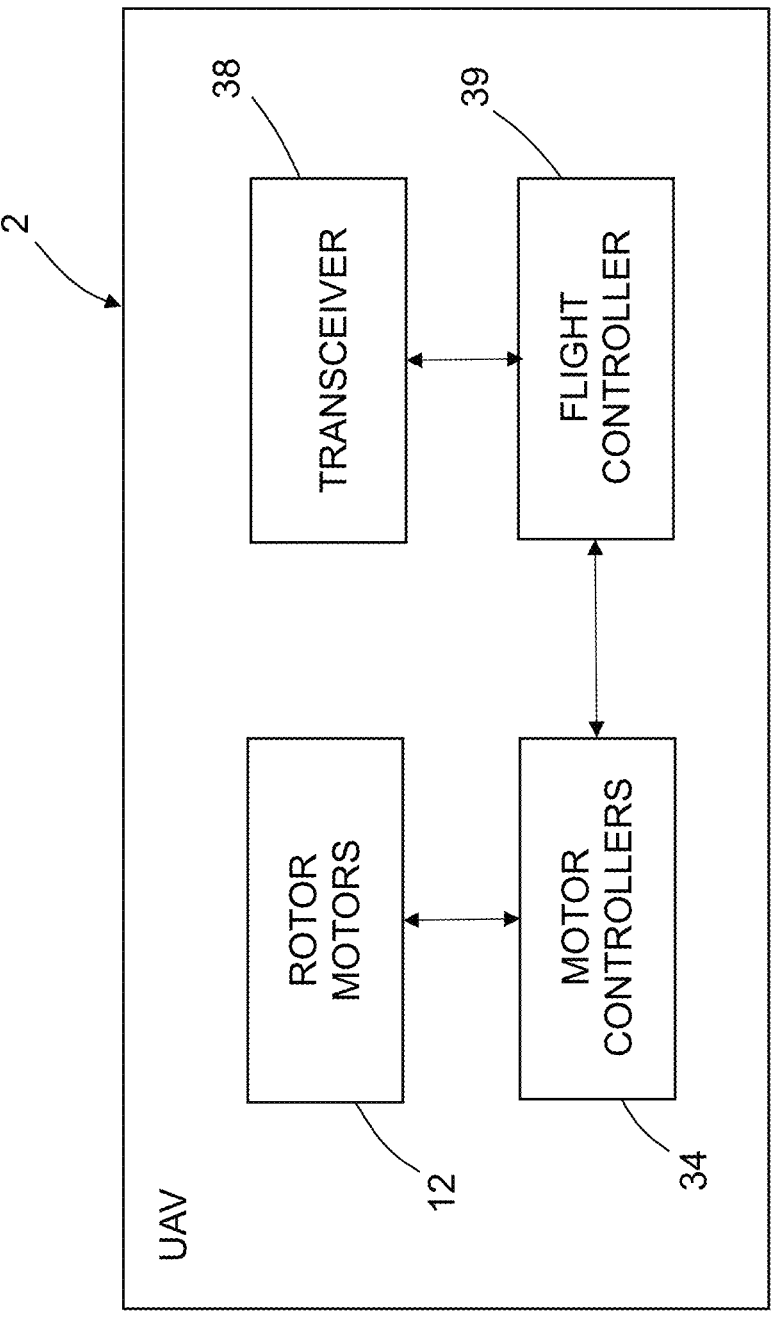
FIG. 23 is a block diagram identifying some components of an unmanned aerial vehicle.

In accordance with one embodiment, a remotely controlled tape-laying apparatus includes a UAV 2 and a roller tape applicator 70c coupled to the UAV 2. FIG. 23 is a block diagram identifying some components of a tape-applicator-equipped UAV 2, including a plurality of rotor motors 12 which are controlled by respective motor controllers 34. The motor controllers 34 control the speed and direction of rotation of the rotors 10 (see FIG. 2) based on control signals received from a flight controller 39. The flight controller 39 is a computer configured to send control signals to the motor controllers 34 in accordance with commands received from a control station 40 (see FIG. 4A) via a transceiver 38.

In accordance with one embodiment, the UAV 2 further includes a UAV body frame 4 and an arm 3 as depicted in FIG. 3A. The arm 3 has one end coupled to the UAV body frame 4 and another end coupled to the applicator head 64 depicted in FIG. 7. In addition, the flight controller 39 of the UAV 2 is configured to control operation of the rotor motors 12 so that the UAV 2 flies along a linear path that is parallel to the surface 9 of a structure and, more specifically, parallel to the intended path of the applicator roller 78 for laying down tape 11, while maintaining the pressure exerted on the surface 9 by the applicator roller 78 within a specified range. Optionally, the UAV 2 may be provided with standoff members having skis at the ends for enabling the UAV 2 to skim along the surface 9 while rolling the applicator roller 78 indicated by the arrow in FIG. 7. In alternative embodiments, the tape may have either a paste adhesive backing or a gel-type adhesive that hardens, in which cases the UAV 2 (via the applicator roller 78) need not exert a specified pressure on the surface 9.

Each of the roller tape applicators 70a-70c (depicted in FIGS. 5-7 respectively) may be equipped with a mechanical cutter having a movable blade which may be actuated to cut the tape 11 when a specified length has been laid on the surface 9. In alternative embodiments, the length of tape 11 is predetermined (pre-cut) and the tape-laying operation is complete when the entire length of tape 11 has been laid.

In accordance with one embodiment, the portion of tape 11 which has passed through the nip 79 may be held against the outer surface of the applicator roller 78 by applying a vacuum pressure through small holes on the outer surface of the applicator roller 78. If tape 11 is cut after (downstream) of the tape/release liner separation point (nip 79), then separation is started only once at the beginning (and the loose edge of release liner 21 is wound on the take-up spool 80), which may be done manually when the UAV 2 is on the ground. This eliminates the need for a complicated mechanism onboard the UAV 2 to get the separation started.

Figure 8:
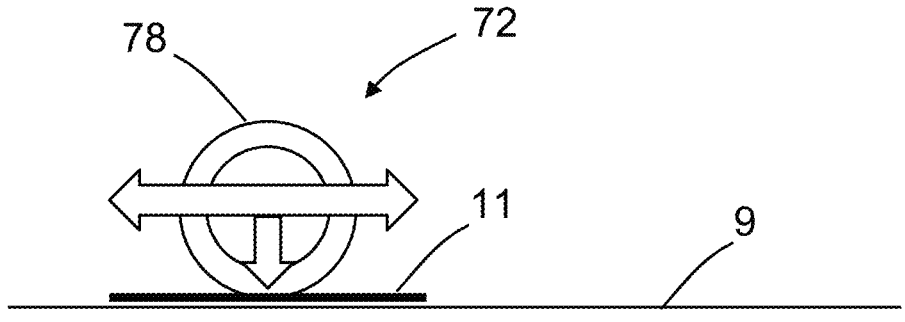
FIG. 8 is a diagram representing a side view of one component of a rocking tape applicator in accordance with one embodiment.

An alternative to the roller application mechanism is a blotter or roller with pre-attached (via vacuum or adhesive) tape/applique that makes pressure contact at the center of the damaged area and then is rocked back and forth at growing angles until the entire patch is attached to the surface. A rocking tape applicator would work well when the needed repair size is small and extended roll-out of tape is not needed. FIG. 8 is a diagram representing a side view of a rocking tape applicator 72 in accordance with one embodiment. The rocking tape applicator 72 includes an applicator roller 78 which rolls back and forth (as indicated by the horizontal double-headed arrow in FIG. 8) on a surface 9, while applying a pressure indicated by the downward-pointing arrow (perpendicular to the double-headed arrow).

The tape applicator-equipped UAV described above may be used to practice a method for repairing a surface area of a difficult-to-access structure. In accordance with one embodiment, the method comprises the following steps: (a) coupling an applicator head comprising an applicator roller to an unmanned aerial vehicle; (b) adhering a portion of a tape having pressure-sensitive adhesive on one side to an outer surface of the applicator roller; (c) flying the unmanned aerial vehicle to a location where the pressure-sensitive adhesive on the portion of tape adhered to the outer surface of the applicator roller contacts a surface of a structure; and (d) moving the applicator head so that the applicator roller rolls and presses incremental portions of the tape against the surface of the structure with sufficient pressure to cause the pressure-sensitive adhesive on the incremental portions of tape to adhere to the surface. In accordance with some embodiments, the method further comprises: (e) separating a release liner from the tape at a nip between the applicator roller and a take-up spool of the applicator head; and (f) wrapping the separated portion of the release liner around the take-up spool as the applicator head moves. For each incremental length of tape that is adhered to the surface, an equal length of release liner will be wound onto the take-up spool. In accordance with one embodiment, the applicator head remains coupled to the unmanned aerial vehicle during step (d). In accordance with another embodiment the method further comprises de-coupling the applicator head from the unmanned aerial vehicle subsequent to step (c) and prior to step (d). In accordance with one embodiment, the applicator head travels along a rail during step (d).

Typically, bubbles are acceptable for repairs involving the application of tape or appliqué. If not, an inspection of the in-place appliqué for bubbles or tears is optionally done using the onboard visual camera 30 or IR camera 22 and a heating or cooling method (flash lamp, heat lamp, warm air spray, etc.) for checking the heat transfer across the appliqué.

A separate rolling pass over the appliqué can optionally be done at the same or increased roller pressure. This can be done by reversing the roller direction, or picking up the roller frame, arm, or UAV, and returning it to the starting point and then re-rolling in the same direction.

If the appliqué has been correctly applied, the repair is complete. If not, the appliqué can be re-rolled using the UAV and one of the above-described rolling tape applicators 70a-70c. Also, an additional appliqué layer of slightly larger size could be applied over the first layer.

As previously disclosed, a UAV may be equipped with additive repair tools of different types for applying a sealant or other coating material to a damaged area on a surface of a structure or object. In accordance with a further embodiment, the additive repair tool may be configured to apply liquid sealant or coating material by launching liquid-filled capsules directed toward the surface. An aerial system will now be described which deposits paint, adhesive, sealant, or other liquid in capsule-delivered droplets onto a surface with minimal overspray, for the purpose of making a repair. The system described hereinafter solves the problem of delivering paint, sealant or other liquid/gel-like substances to a hard-to-reach area on a target object (such as an aircraft) using a UAV platform for aerial delivery. No ladders, scaffolding, or other support equipment is needed to reach the target area.

The aerial system includes a projectile launcher mounted on a UAV platform to propel liquid-filled capsules from an on-board reservoir of capsules. Each capsule is designed to break open upon impact, thereby depositing its liquid payload on the surface. The system has an automated vision-based targeting system and repetitive capsule launching process, to control the launcher and vehicle to provide full coverage of an area on the target object.

When repairing the surface of an aircraft, a wind turbine blade, or other large structure, it is often necessary to cover an area with liquid or gel-like materials, such as paint, adhesive, or sealant. For example, a seal of surface damage from moisture ingression is all that is needed to enable an aircraft's rapid return to service. While it may be possible to use a standard spray gun if the conditions are right, the conditions for repairing an aircraft are often not ideal for spray gun usage. Use of a spray gun typically requires that the nozzle be within about a foot of the surface and that it be used in calm winds. Achieving those operating conditions may not be possible, and providing this type of material application is especially challenging when using a UAV as the delivery platform for making repairs.

This disclosure proposes a system for launching liquid-filled capsules which addresses non-ideal operation environmental conditions, as well as providing the ability to mount the system to a UAV for making repairs. More specifically, the system solves the problem of delivering paint, sealant or other liquid/gel-like substances to a hard-to-reach area on a target object, such as an aircraft, using a launcher-equipped UAV platform for aerial delivery. The ability to launch liquid-filled capsules from longer offset distances means that the UAV can be several feet away from the target object while performing the task. This increase in offset range will decrease the chances of the UAV running into or being blown by wind gusts into the target object. The delivery of the liquid or gel-like materials by means of a capsule that breaks open on impact with the surface also results in less material consumed and less overspray. Cleanup and reloading are also simpler than a traditional spraying system.

As disclosed in more detail below, the material delivery system utilizes a liquid-filled capsule launcher module that is mounted to a UAV. The module includes a material reservoir hopper, a material feeder, a compressed-gas launching mechanism, a launcher barrel, a trigger switch, a rotating ring subsystem (including an inner ring which is rotatable relative to an outer ring which is fixed to the UAV), and control actuators for orienting (aiming) the launcher barrel. The rotors of the UAV may be controlled to enable desired roll, pitch, yaw and lateral movements of the UAV—but the UAV pitch and roll angles are difficult to maintain at any arbitrary value for long periods of time, since those degrees-of-freedom are used to maintain flight stability of the UAV. For this reason the system is provided with a separate pitch control that is independent of the UAV flight control motion. Control of the pitch of the launcher is achieved by providing a control actuator in the form of a launcher pitch control motor (mounted to the rotatable outer ring) that drives a pinion gear to travel on a ring gear attached to the inner ring. The launcher pitch control motor also serves (along with the battery) as the counterweight to the launcher components on the other side of the rotatable ring mount. The launcher module is mounted in such a way as to allow the launcher to pivot about the pitch axis while counterbalanced so as to not disturb the UAV center-of-mass.

In accordance with one embodiment, the automated capsule launching process is controlled by a vision-based targeting system that rotates the launcher barrel along the pitch axis and moves the UAV along the yaw axis or in a strafing pattern to provide full coverage of an area. When a region perimeter (such as a rectangular area) is defined, the capsule-launching system uses path planning and image processing software to determine where additional material is needed and send targeting instructions to the barrel aiming system in order to complete the task. In addition, the flight control system compensates for weight reduction and recoil as capsules are launched from the UAV. In one proposed implementation, the repetitive firing rate is based on flight stability analysis.

In accordance with one embodiment, the launcher module is configured to enable mounting on existing UAVs for the purpose of delivering liquid- or gel-filled capsules to a surface. One of the core aspects of the concept is that the launcher is a modular unit that can be easily attached and removed from the UAV body. In one proposed implementation, path-based and image-based feedback methods for automated control of a UAV are employed to provide coverage of a damaged area of a surface. In addition, various UAV control system modifications are proposed herein to address changes in vehicle dynamics due to consumable material and reaction control disturbances. Each of these features will be described in more detail below.

Figure 9:
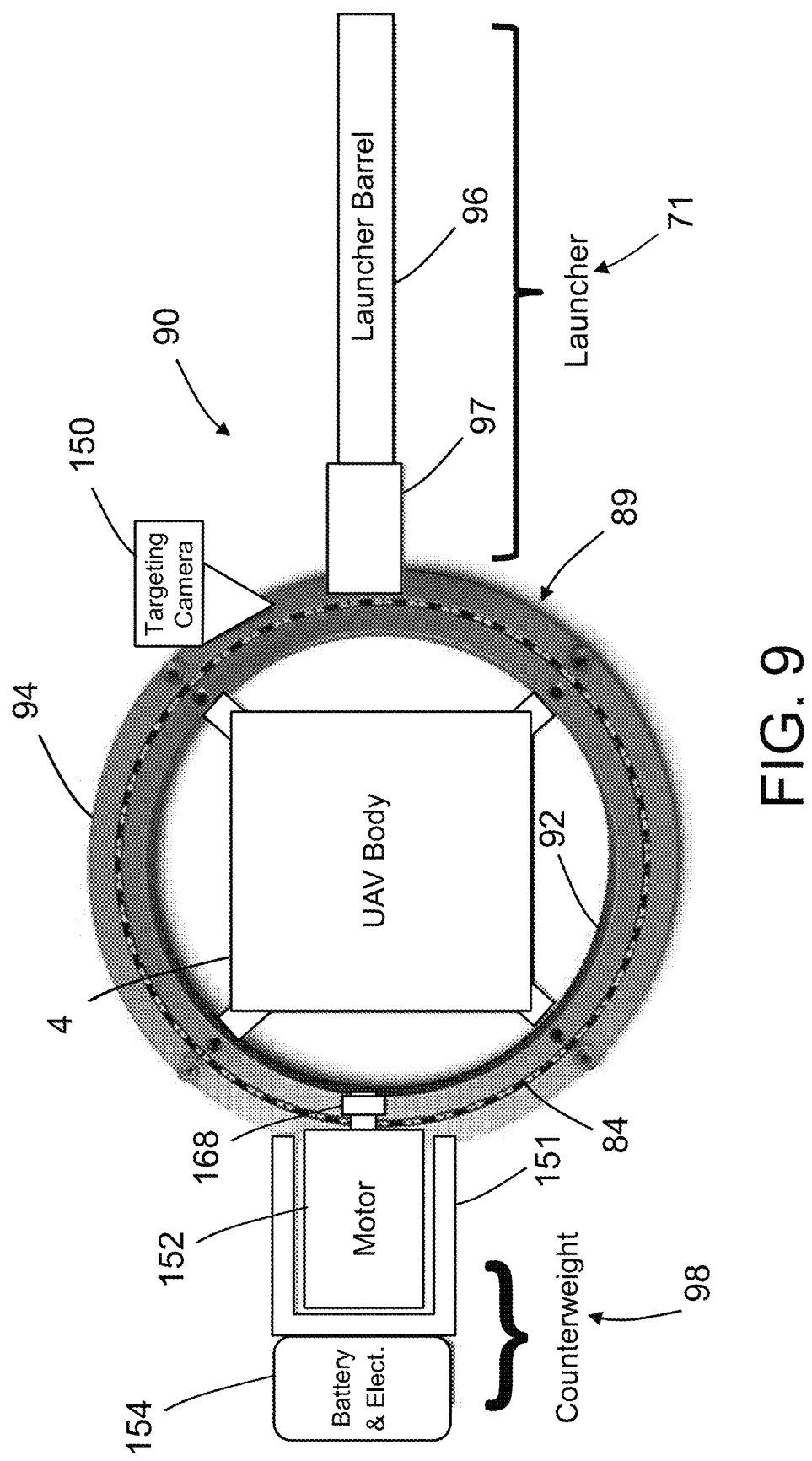
FIG. 9 is a diagram representing a side view of some components of a modular liquid-filled capsule launcher system in accordance with one embodiment. The module is shown mounted to a UAV body frame (other components of the UAV are not shown).

FIG. 9 is a diagram representing a side view of some components of a modular liquid-filled capsule launcher system (hereinafter "launcher module 90") in accordance with one embodiment. The launcher module 90 is shown mounted to a UAV body frame 4 (other components of the UAV 2 are not shown). The launcher module 90 includes a rotating ring mount 89 that enables a launcher 71 to be rotated. The rotating ring mount includes an inner ring 92 mounted to the UAV body frame 4 and an outer ring 94 that is rotatably coupled to the inner ring 92 by means of a multiplicity of rolling elements 84 (e.g., ball bearings).

The outer ring 94 is also part of a subassembly (hereinafter "rotatable launcher subassembly") that is rotatable about a center of the inner ring 92. The rotatable launcher subassembly further includes a launcher 71 and a counterweight 98 that are mounted (fixedly coupled) to the outer ring 94 at diametrically opposed angular positions. In addition, the rotatable launcher subassembly includes a targeting camera 150, which is coupled to the outer ring 94. The targeting camera 150 (e.g., a video camera) may be used to capture images of the damaged area on the surface to be repaired. The rotating ring mount 89, launcher 71, counterweight 98, and targeting camera 150 are designed to provide a balanced rotational system that allows the launcher 71 to rotate about the center of the inner ring 92 without changing the location of the center-of-mass of the module-equipped UAV.

The launcher 71 includes a launcher barrel 96 (see FIG. 9) and a launching mechanism positioned and configured to impel a liquid-filled capsule through the launcher barrel 96. In one proposed implementation, the launching mechanism includes a pressure chamber 97 and an electronically controlled valve (see valve 170 in FIG. 22). The pressure chamber 97 may be selectively connected to a source of compressed gas by changing the state of valve 170. In one proposed implementation, the internal trigger for opening the valve is in the form of an electronic switch 42 (see FIG. 22).

Referring again to FIG. 9, the counterweight 98 includes a platform 151 which is attached to or integrally formed with and extending outward from the outer ring 94. The counterweight 98 further includes a launcher pitch control motor 152 and an electric power system 154, both of which are mounted to platform 151. The launcher pitch control motor 152 drives rotation of the outer ring 94 relative to the inner ring 92. The electric power system 154 includes a battery (or battery pack) and associated electronics for providing electric power to the launcher pitch control motor 152 and other electrically powered components. The counterweight 98 further includes means for mechanically coupling the outer ring 94 to the launcher pitch control motor 152 to enable the latter to drive rotation of outer ring 94 relative to inner ring 92. In accordance with the embodiment depicted in FIG. 9, the mechanical coupling that drives rotation includes a pinion gear 168 mounted to an output shaft of the launcher pitch control motor 152 and a ring gear 85 (not shown in FIG. 9, but see FIG. 16) which is mounted to or integrally formed with the outer ring 94 and is engaged by the pinion gear 168. The teeth of the pinion gear 168 are meshed with the teeth of the ring gear 85, so that outer ring 94 rotates about the UAV pitch axis in response to operation of launcher pitch control motor 152.

The rotating ring mount 89 enables the pitch angle of the launcher barrel 96 to be adjusted during aiming. In addition, the yaw angle of the launcher barrel 96 may be adjusted by controlling the yaw angle of the UAV 2. Likewise the distance separating the end of the launcher barrel 96 and the surface to be covered may be adjusted by flying the UAV to a position that achieves that separation distance and then hovering. The launching mechanism may then be triggered to launch a liquid-filled capsule toward the surface.

In accordance with an alternative embodiment, the launcher-equipped UAV may be designed to compensate for the effects of recoil during launching of capsules. Recoil is the backward movement of a gun when it is discharged. The law of conservation of momentum dictates that the recoil momentum exactly balances the forward momentum of the projectile and exhaust gases. In the case of a launcher-equipped UAV, recoil momentum is transferred to the body frame of the UAV. A design is disclosed below which distributes the recoil force exerted to the UAV over a period of time after the capsule exits the launcher barrel 96.

To distribute the recoil force, the launcher module 90 in accordance with one embodiment is designed with a recoil compensation sub-system 156 (see FIG. 10) that spreads out the impulse produced by a capsule launch over time. This reduces peak force delivered to the UAV, which reduces stress on the system components. An example of this is a hydro-pneumatic system that uses gas-charged shock absorbers attached to a launcher barrel which is mounted on linear rails.

Figure 10:
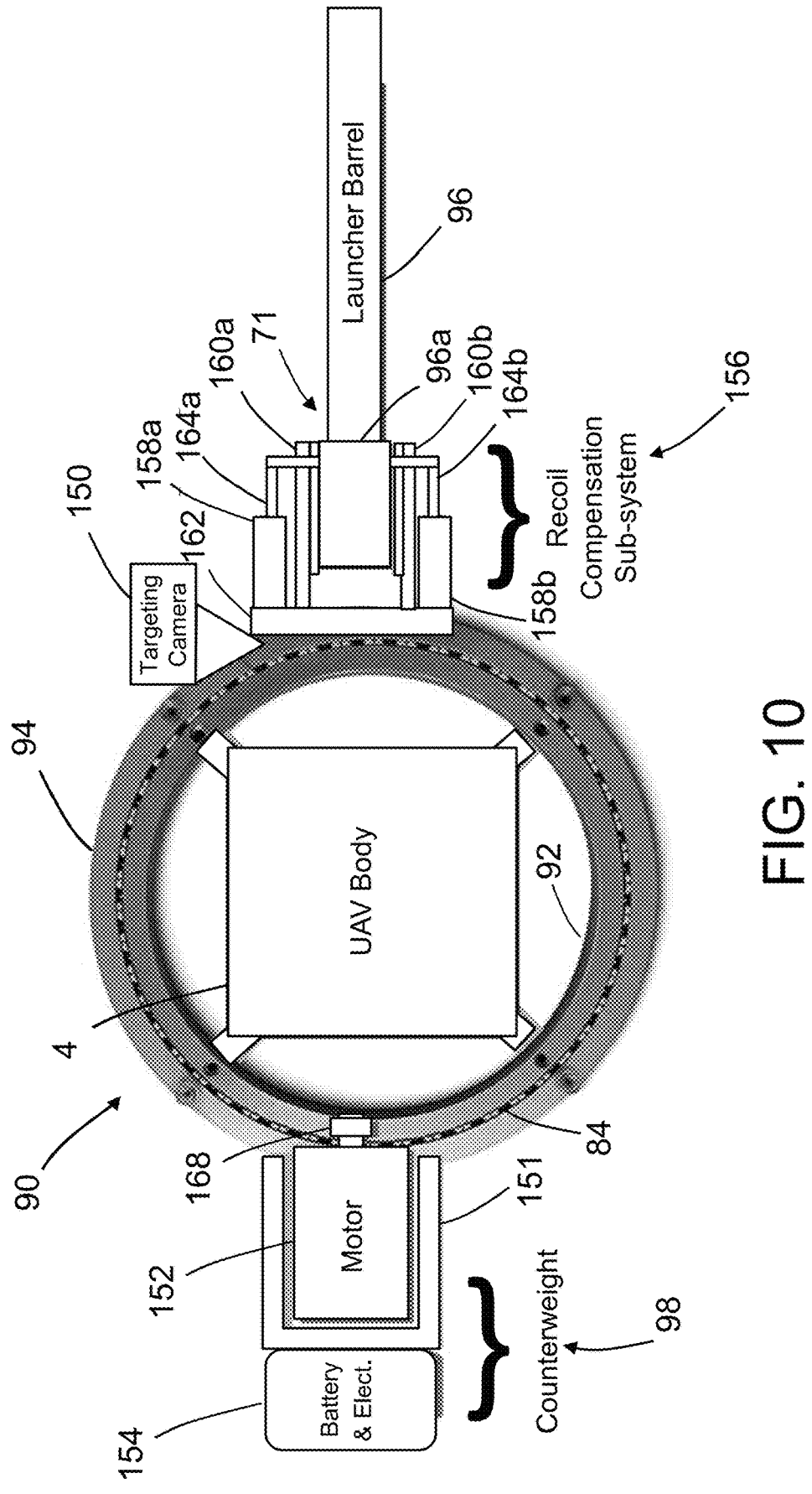
FIG. 10 is a diagram representing a side view of some components of a modular liquid-filled capsule launcher system with recoil compensation subsystem in accordance with another embodiment. The module is shown mounted to a UAV body frame (other components of the UAV are not shown).

FIG. 10 is a diagram representing a side view of some components of a launcher module 90 that includes a recoil compensation subsystem 156 in accordance with one embodiment. The launcher module 90 is shown mounted to a UAV body frame 4 (other components of the UAV are not shown). The recoil compensation subsystem 156 is fixedly coupled to the outer ring 94 and operatively coupled to the launcher 71. In accordance with one proposed implementation, the recoil compensation subsystem 156 includes a base 162 fixedly coupled to the outer ring 94, a pair of linear rails 160a and 160b connected to the base 162, and a pair of gas-charged shock absorbers 164a and 164b connected to the base 162. In effect, the linear rails 160a, 160b and shock absorbers 164a, 164b are fixedly coupled to the outer ring 94. At the same time, the launcher barrel 96 is slidably coupled to the linear rails 160a, 160b and operatively coupled to the shock absorbers 164a, 164b in a configuration whereby the shock absorbers 164a, 164b distribute any recoil force of the launcher 71 due to the firing impulse applied to the UAV over time.

Figures 11A, 11B, 11C:
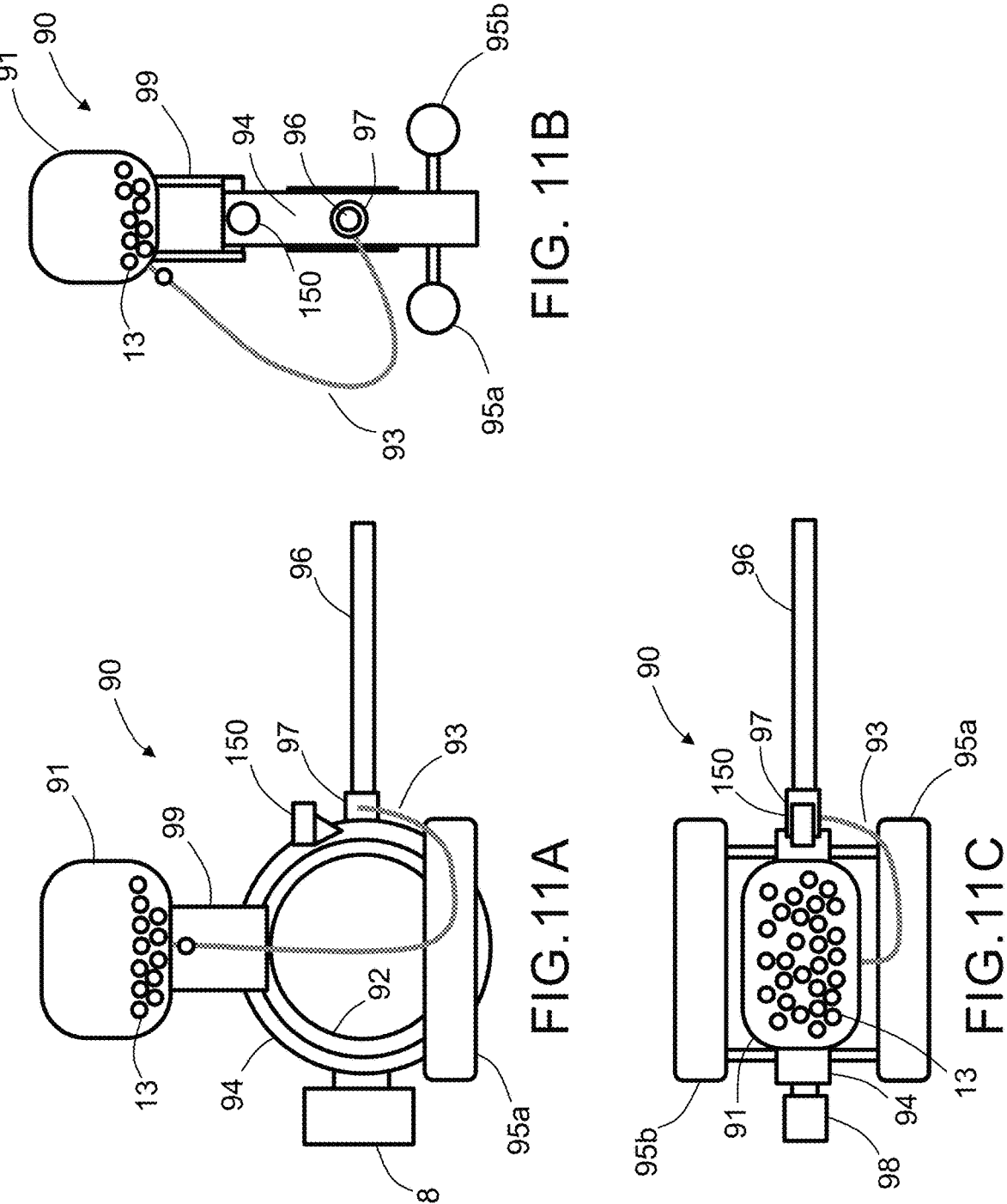
FIGS. 11A-11C are diagrams representing side, front, and top views respectively of a modular liquid-filled capsule launcher system having a single barrel and a single capsule reservoir.

FIGS. 11A-11C are diagrams representing side, front, and top views respectively of a launcher module 90 having a single launcher barrel 96 and a single reservoir hopper 91 containing liquid-filled capsules 13. The reservoir hopper 91 is fixedly coupled to the inner ring 92 by means of a hopper support 99, whereas the launcher barrel 96 is fixedly coupled to the outer ring 94. Thus, the reservoir hopper 91 does not move relative to UAV body frame 4 of the UAV as the launcher barrel 96 moves relative to UAV body frame 4. The launcher module 90 further includes a capsule feeder tube 93, made of flexible material, which connects the reservoir hopper 91 to the launching mechanism.

The launcher module 90 depicted in FIGS. 11A-11C further includes a pair of canisters 95a and 95b disposed on opposites sides of and fixedly coupled to the inner ring 92. Each of canisters 95a and 95b contains compressed gas (e.g., air or $CO_2$) which is released to provide pressure to the launcher barrel 96 of sufficient magnitude to launch a capsule 13. Each of canisters 95a and 95b is connected to the launching mechanism by a respective gas feeder tube (not shown in FIGS. 11A-11C, but see gas feeder tube 87 in FIG. 22).

Figure 22:
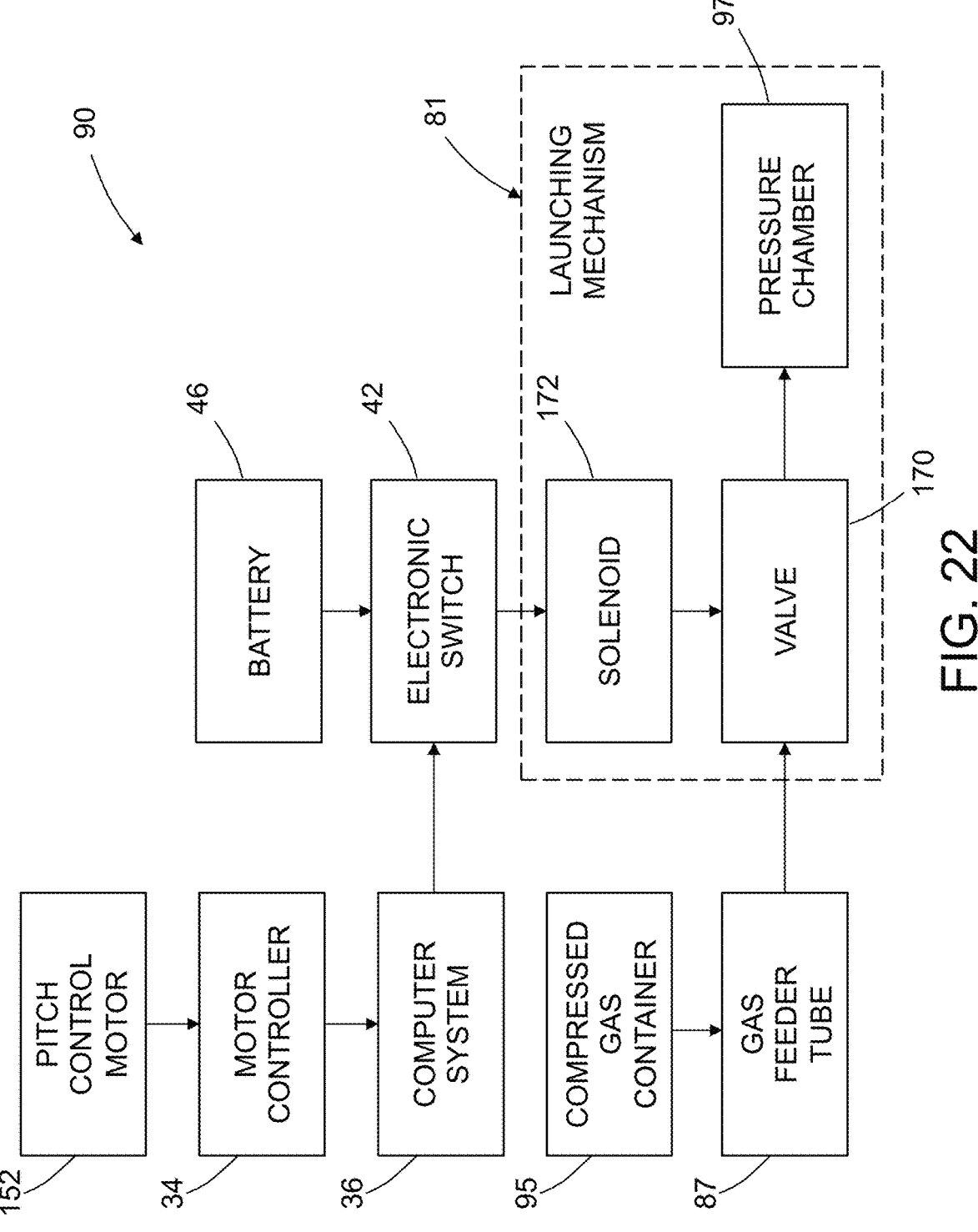
FIG. 22 is a block diagram identifying some components of a compressed gas launching system in accordance with one embodiment.

FIG. 22 is a block diagram identifying some components of a compressed-gas launching system in accordance with one embodiment. The launcher 71 (in addition to launcher barrel 96) further includes a launching mechanism 81 comprising a control valve 170 and a solenoid 172 for electronically changing the state of the control valve 170, and a pressure chamber 97 connected to the valve 170. A canister 95 containing compressed gas is connected to the valve by a gas feeder tube 87. When the valve 170 transitions from a closed state to an open state, a pulse of compressed gas enters the pressure chamber 97 via gas feeder tube 87 and open valve 170. The pressure differential provides sufficient force to eject a capsule out the barrel and toward a target.

In accordance with the implementation depicted in FIG. 22, the launcher module 90 includes a trigger mechanism in the form of an electronic switch 42 that controls the state of the solenoid 172. More specifically, when the electronic switch 42 is closed, the solenoid 172 receives electric power from a battery 46. The switching state of electronic switch 42 is controlled by a control signal from a computer system 36. The computer system 36 is also configured to send control signals to a motor controller 34 that controls operation of the launcher pitch control motor 152. The control valve 170 may be controlled to transition from a closed state, in which compressed gas is blocked from entering the pressure chamber 97, to an open state, in which a pulse of compressed gas enters the pressure chamber 97 for propelling a liquid-filled capsule through and out the launcher barrel 96.

Figure 12A:
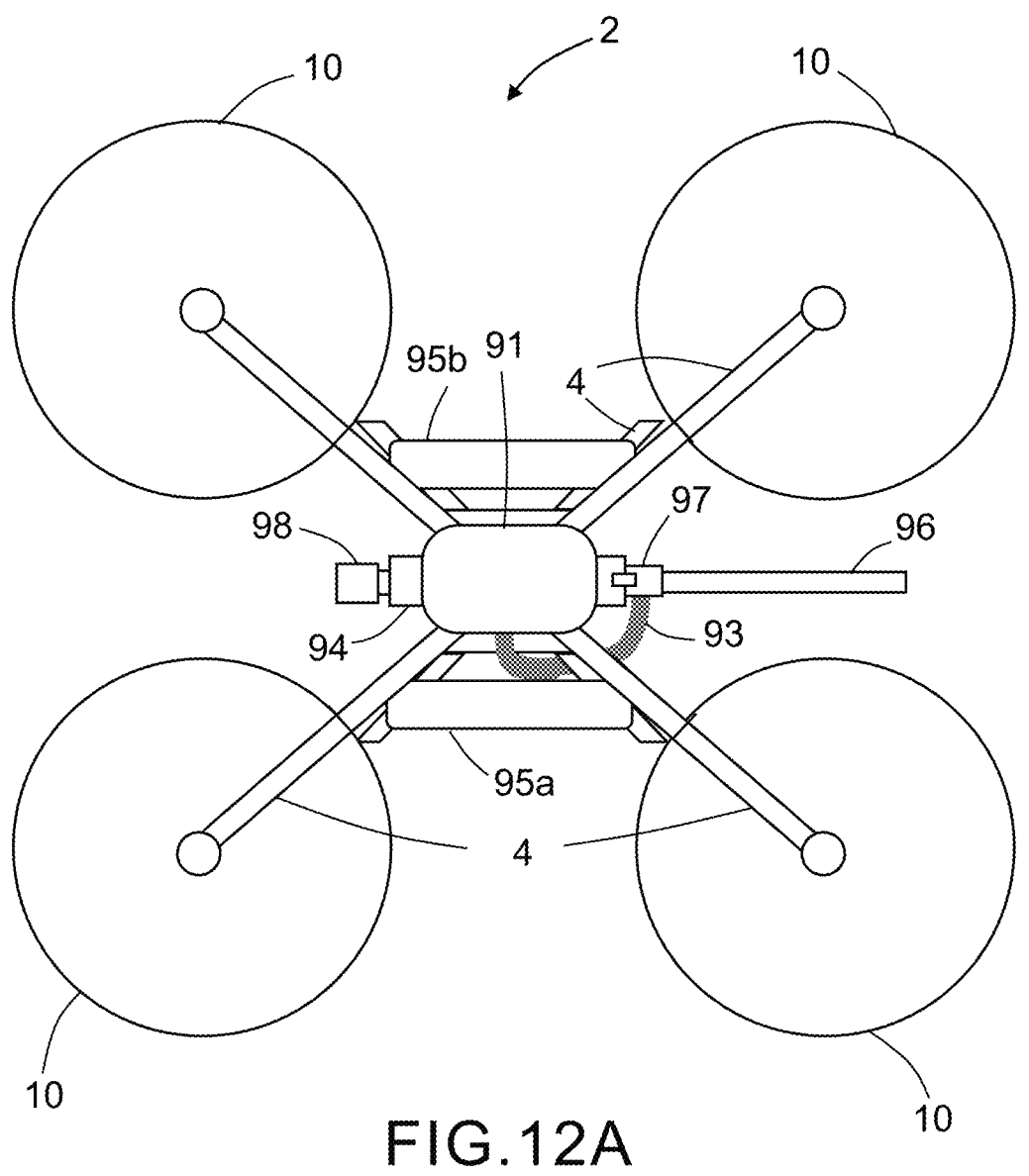
FIGS. 12A-12C are diagrams representing top, side, and front views respectively of a UAV having the modular liquid-filled capsule launcher system depicted in FIGS. 11A-11C mounted thereon.
Figure 12B:
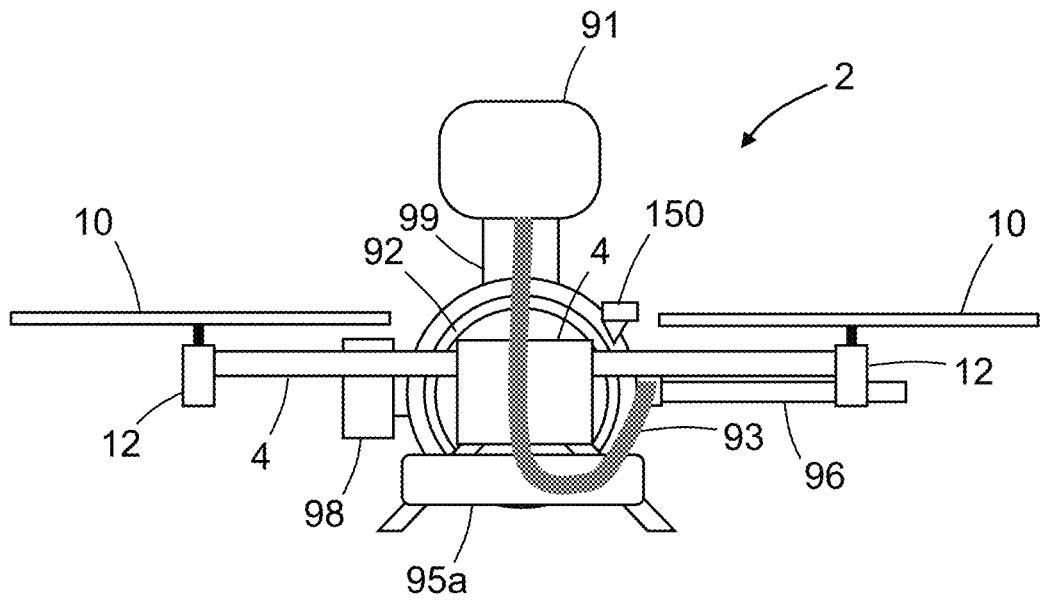
Figure 12C:
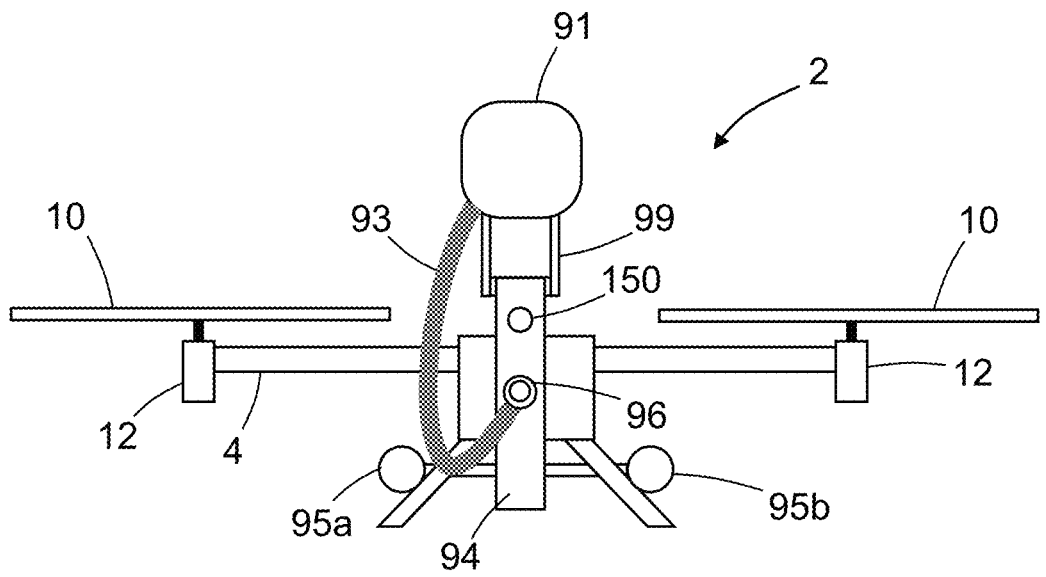

FIGS. 12A-12C are diagrams representing top, side, and front views respectively of a UAV 2 having the launcher module 90 depicted in FIGS. 11A-11C and 22 mounted thereon. The inner ring 92 (visible in FIG. 12B) is fixedly coupled to the UAV body frame 4 of the UAV 2. In this example, the UAV 2 has four rotors 10 rotatably coupled to the distal ends of respective arms of the UAV body frame 4. During level hovering, the axes of rotation of rotors 10 are vertical, while the launcher barrel 96 is free to swing up or down about a pitch axis. FIGS. 12A-12C show the launcher barrel 96 oriented perpendicular to the axes of rotation of rotors 10. As best seen in FIG. 12A, the rotors 10 are positioned to not obstruct the rotation of the launcher barrel 96 about the pitch axis.

Figure 13A:
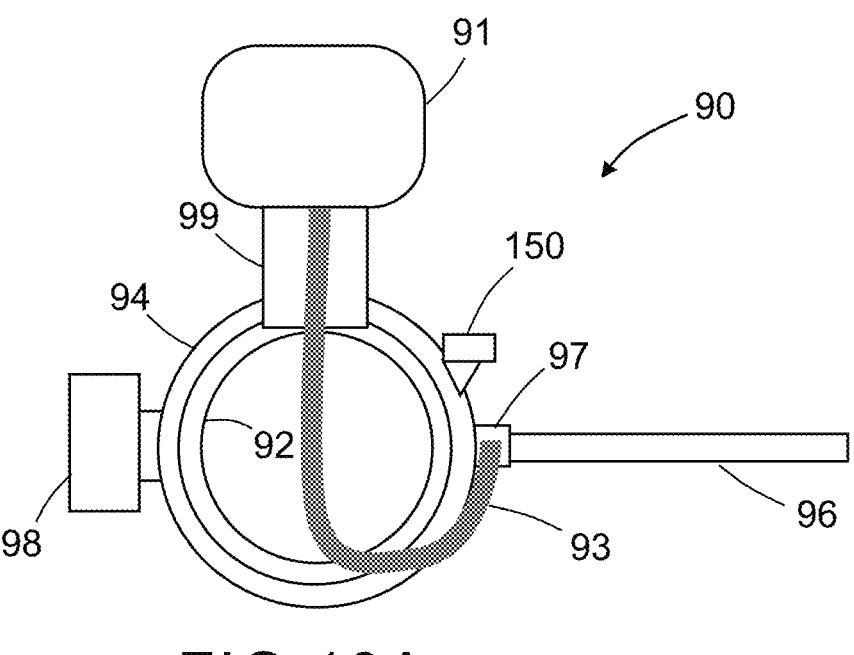
FIGS. 13A through 13D are diagrams representing respective side views of the modular liquid-filled capsule launcher system depicted in FIG. 11A (with the pressurized gas canister omitted) at successive stages during pivoting about the pitch axis of the launcher-equipped UAV.
Figure 13B:
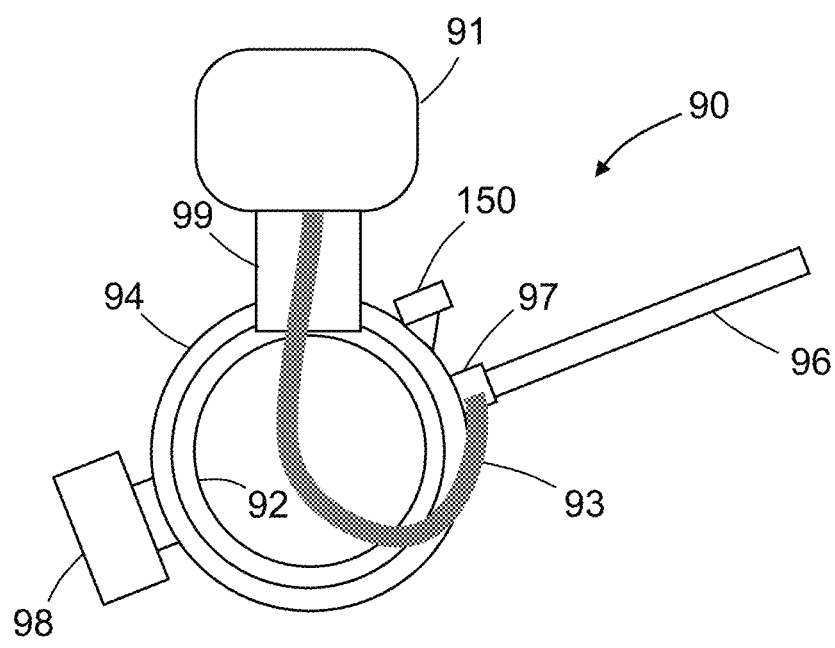
Figures 13C, 13D:
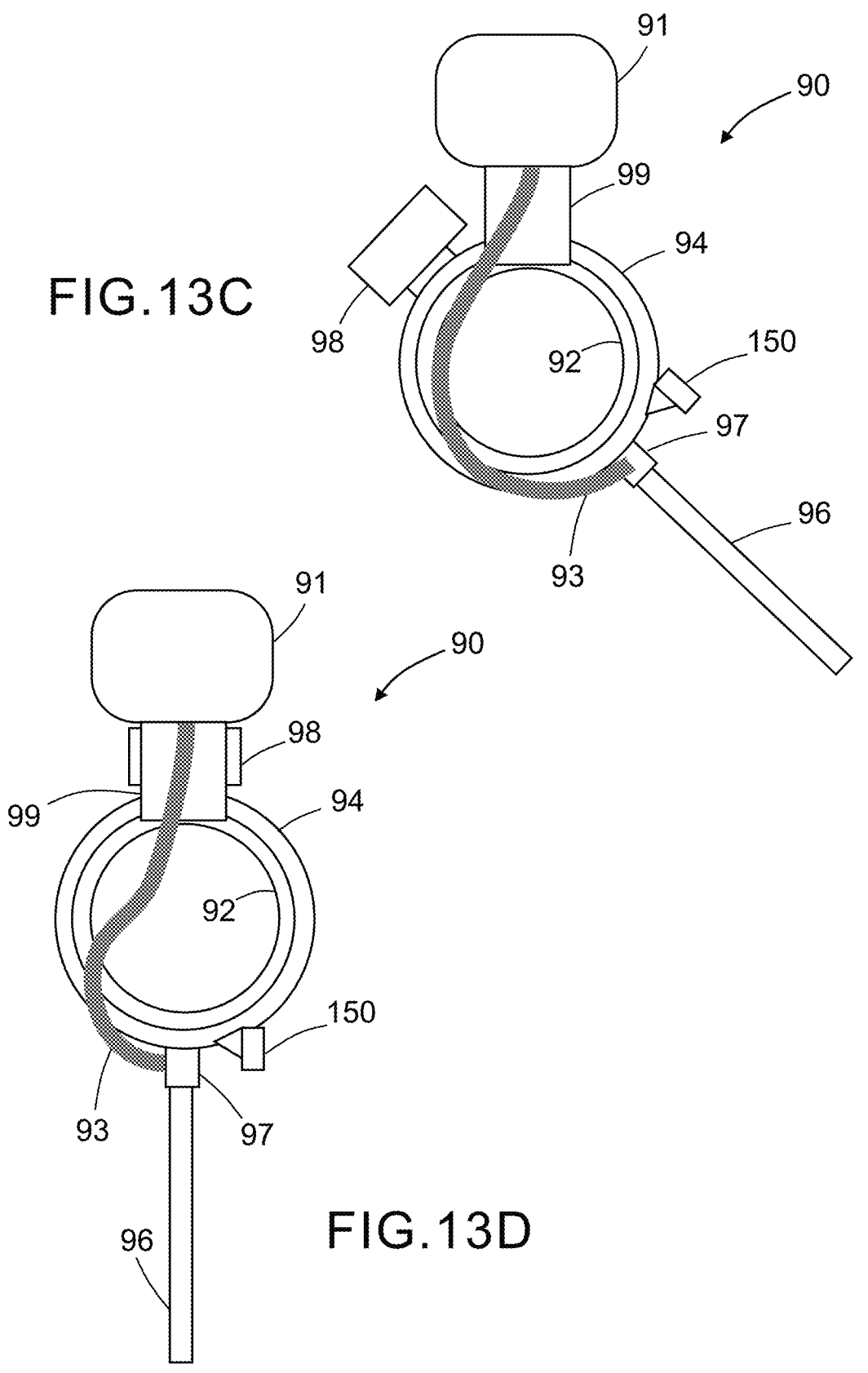

FIGS. 13A through 13D are diagrams representing respective side views of components of the launcher module 90 depicted in FIG. 11A (with the pressurized gas canisters omitted) at successive stages during pivoting of the launcher barrel 96 about the pitch axis. The launcher barrel 96, outer ring 94, counterweight 98, and targeting camera 150 all rotate in unison. In FIG. 13A, the launcher barrel 96 is oriented horizontally at a pitch angle of 0 degrees. FIG. 13B shows the launcher barrel 96 oriented at a pitch angle of about +30 degrees. FIG. 13C shows the launcher barrel 96 oriented at a pitch angle of about −45 degrees. FIG. 13C shows the launcher barrel 96 pointing downward at a pitch angle of about −90 degrees. One end of capsule feeder tube 93 is connected to the reservoir hopper 91, which does not rotate with the launcher barrel 96. The other end of capsule feeder tube 93 is connected to the pressure chamber 97. As the launcher barrel 96 rotates, the other end of capsule feeder tube 93 follows a circular path while the capsule feeder tube 93 flexes and moves without kinking.

Figure 14:
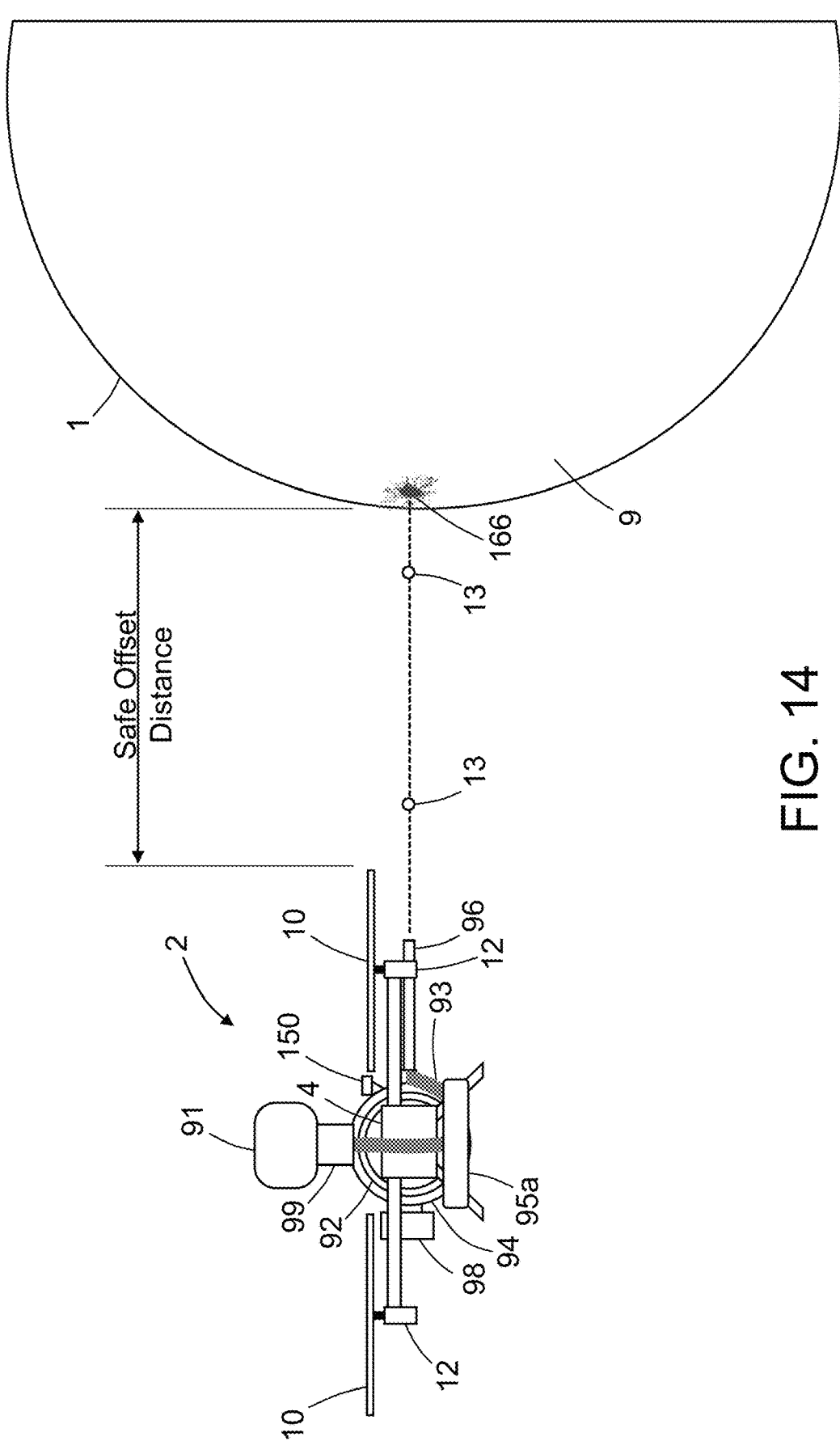
FIG. 14 is a diagram representing a side view of the launcher-equipped UAV depicted in FIGS. 12A-12C offset from a target object at a safe distance and at an instant in time following successive launches of capsules now approaching the surface of the target object.

FIG. 14 is a diagram representing a side view of the launcher-equipped UAV 2 depicted in FIGS. 12A-12C offset from a surface 9 of a target object 1 at a safe distance. The system enables variable offset distances for delivery, thereby decreasing the likelihood of unintended contact of UAV 2 with the target object 1. FIG. 14 also shows the respective positions of two successively launched capsules 13 in flight toward the surface 9 at an instant in time. FIG. 14 also shows liquid splattered (hereinafter "splatter 166") on the surface 9 in an area where previously launched capsules burst upon impact and released liquid. Damaged areas on the surface 9 may be covered by judiciously splattering liquid from impinging capsules 13 at a succession of target points.

Figure 15:
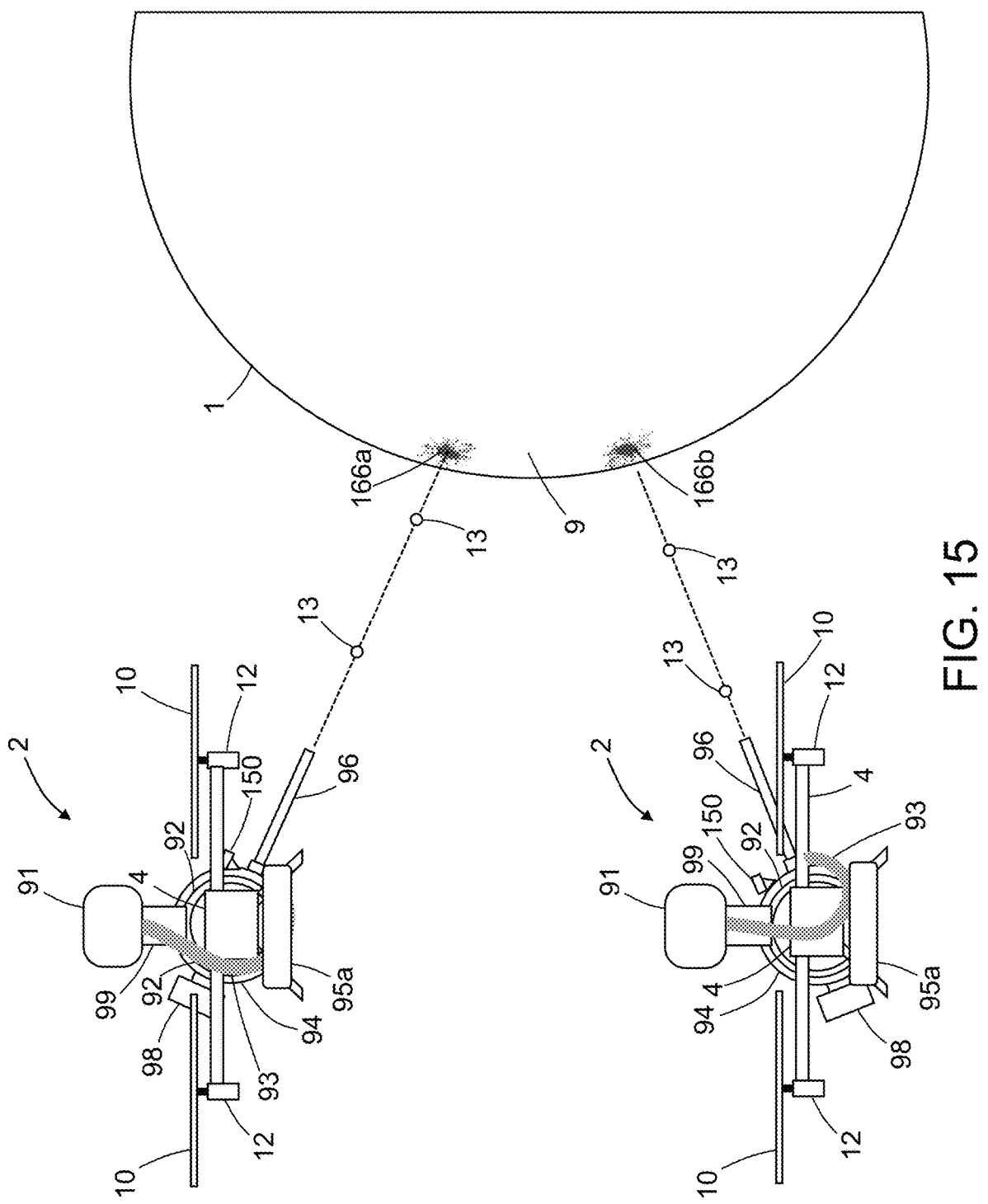
FIG. 15 is a diagram representing a side view of the launcher-equipped UAV depicted in FIGS. 12A-12C at different locations relative to a target object and with the barrel of the launcher oriented at different pitch angles while the orientation of the UAV is unchanged.

FIG. 15 is a diagram representing a side view of the launcher-equipped UAV 2 depicted in FIGS. 12A-12C at different locations relative to a target object 1. The UAV 2 at the upper location is hovering at a first position with a level orientation, while the launcher barrel 96 is oriented at a negative pitch angle. The UAV 2 at the lower location is hovering at a second position different than the first position (e.g., at a lower elevation) with the same level orientation, while the launcher barrel 96 is oriented at a positive pitch angle. This demonstrates that the pitch angle of the UAV 2 may be constant while the pitch angle of the launcher barrel 96 changes. For example, during a repair procedure, the UAV 2 may first be flown to the upper location and the launcher barrel 96 may be oriented at a pitch angle that launches capsules 13 at a first area indicated by splatter 166a on surface 9 of the target object 1. Then the UAV 2 may be flown to the lower location and the launcher barrel 96 may be oriented at a pitch angle that launches capsules 13 at a second area indicated by splatter 166b on surface 9.

Figure 16:
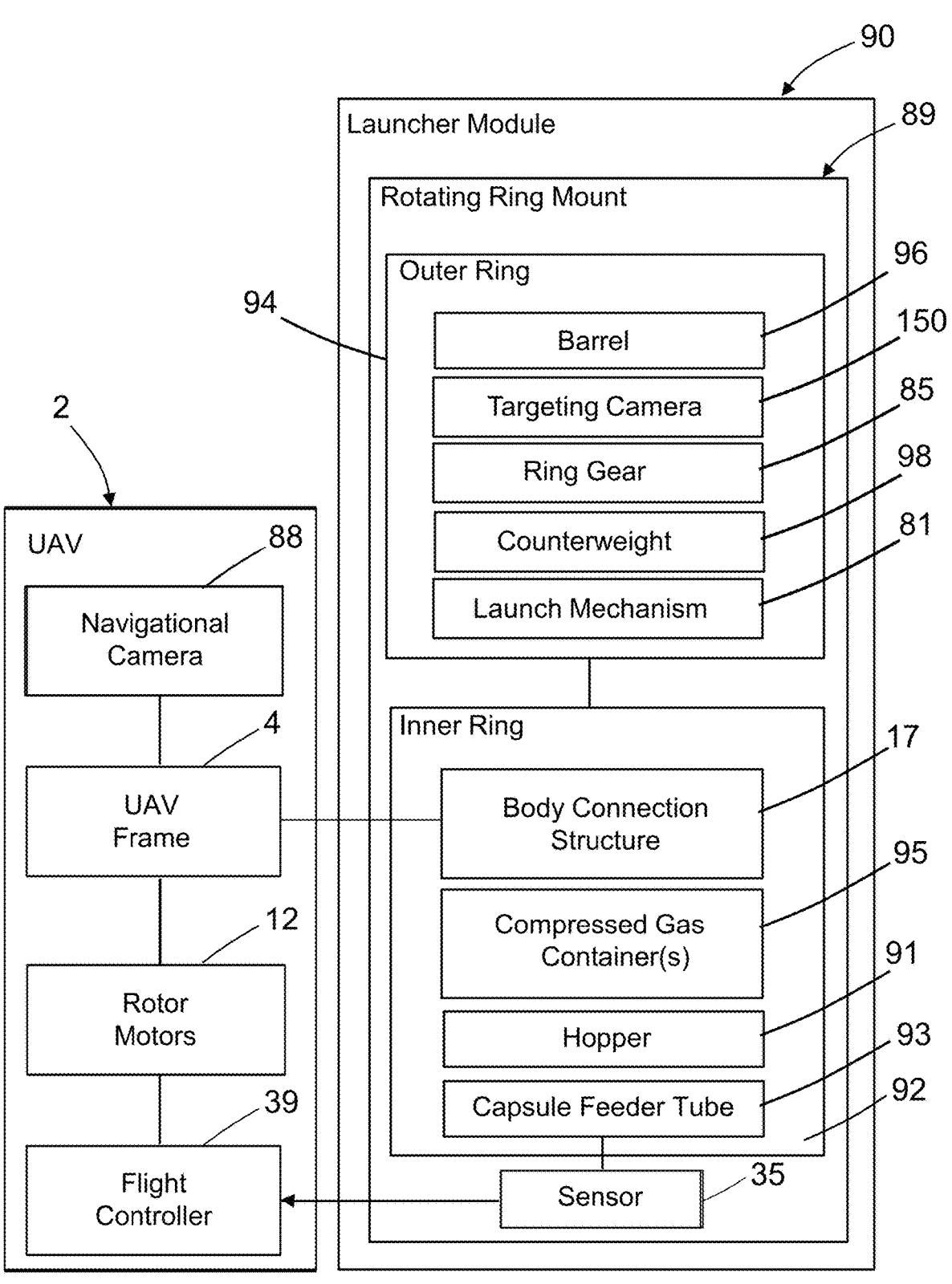
FIG. 16 is a block diagram identifying some components of a system for launching liquid- or gel-filled capsules toward a surface of a limited-access structure or object utilizing a UAV in accordance with one embodiment.

FIG. 16 is a block diagram identifying some components of a system for launching liquid-filled capsules toward a surface of a limited-access structure or object utilizing a UAV 2 in accordance with one embodiment. The UAV 2 includes a plurality of rotors 10 rotatably coupled to a UAV body frame 4. The UAV 2 further includes a flight controller 39 configured to control the operation of rotors 10. UAV also includes a navigational camera 88 mounted underneath UAV body frame 4.

The overall system further includes a launcher module 90 that may be coupled to the UAV body frame 4 in preparation for a repair mission and de-coupled following completion of that mission. The launcher module 90 includes rotating ring mount 89. The rotating ring mount 89 in turn consists of an inner ring 92 attached to UAV body frame 4 and an outer ring 94 rotatably coupled to inner ring 92. More specifically, the inner ring 92 includes a body connection structure which is coupled to the UAV body frame 4.

As previously described, the outer ring 94 supports launching mechanism 81, launcher barrel 96, ring gear 85, counterweight 98 (including launcher pitch control motor 152 and electric power system 154 depicted in FIG. 9), and targeting camera 150. At the same time, the inner ring 92 supports one or more compressed gas canisters 95 and a reservoir hopper 91 containing liquid-filled capsules 13. One end of a capsule feeder tube 93 is connected to reservoir hopper 91. The other end of capsule feeder tube 93 is connected to the launching mechanism 81.

When filling in an area with a liquid-like substance (e.g., paint, sealant, adhesive, etc.), the technician operating the launcher-equipped UAV should ensure that the target area is fully covered at the end of the process. In order to provide continuous area coverage, an open-loop motion plan may be adopted that aims at different locations in the target area using a raster scan-like approach to create a coverage plan. This coverage plan would involve computing the nominal region covered by a single capsule on the surface, along with a small amount of overlap, to set the desired offset between individual impacts. Manual or automated verification may be performed using image data from the targeting camera 150.

In cases where gaps in coverage are likely due to slight aiming errors and randomness in individual impact coverage, an image processing method may be used to detect gaps in coverage and then aim and launch additional capsules at those locations. In accordance with one embodiment, the launcher module 90 further comprises a vision-based targeting system (not shown in FIG. 16) that is configured to receive image data from the targeting camera 150, process the image data to determine an area where additional material should be deposited on a surface (described in some detail below with reference to FIGS. 20A, 20B, and 21), and send control signals to the launcher pitch control motor 152 and command signals to the flight controller 39 for aiming the launcher barrel 96 toward the area to be covered.

As seen in FIG. 16, the launcher module 90 further includes a sensor 35 that is configured for outputting sensor data indicating a number of liquid-filled capsules which have passed through the capsule feeder tube 93. For example, sensor 35 may be a through-beam optical sensor with counting hardware/software which counts passing capsules. The sensor data output by sensor 35 is received by the flight controller 39. In accordance with one embodiment, the flight controller 39 is further configured to control operation of the rotor motors 12 to adjust flight-related feedback gains as a function of the sensor data received from sensor 35. More specifically, the flight controller 39 is configured to control operation of the rotor motors 12 to produce an equilibrium thrust to offset reactions forces produced when capsules are launched, the equilibrium thrust being a function of at least a capsule launch velocity, a capsule launch rate calculated based on the sensor data, and a mass of a liquid-filled capsule.

Figure 17A:
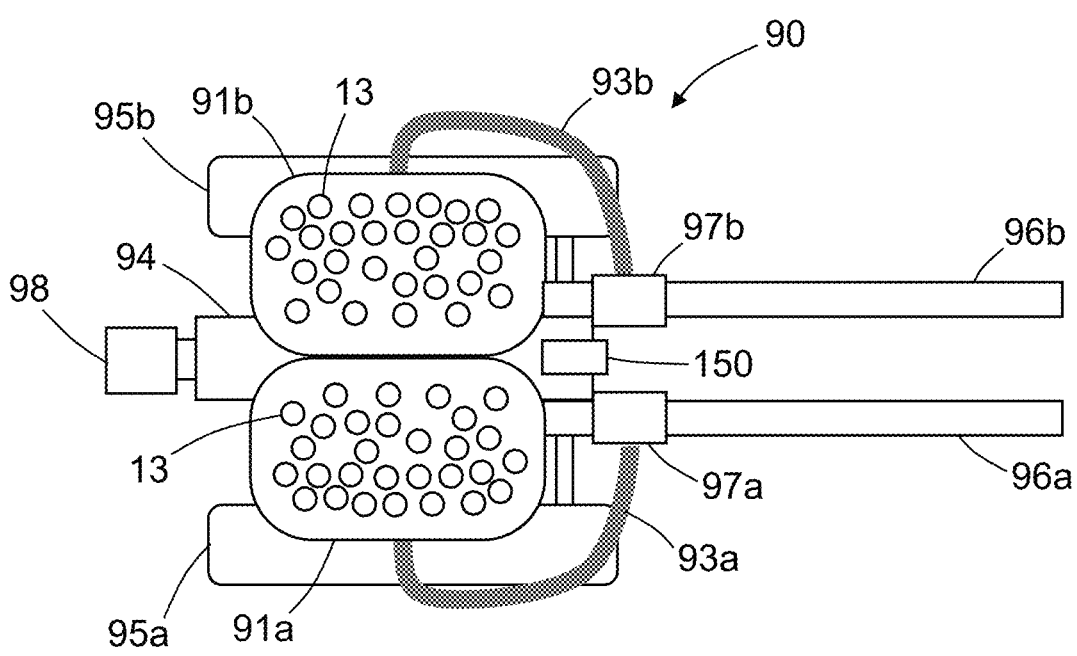
FIGS. 17A and 17B are diagrams representing top and front views respectively of a modular liquid-filled capsule launcher system having two barrels and two reservoirs.
Figure 17B:
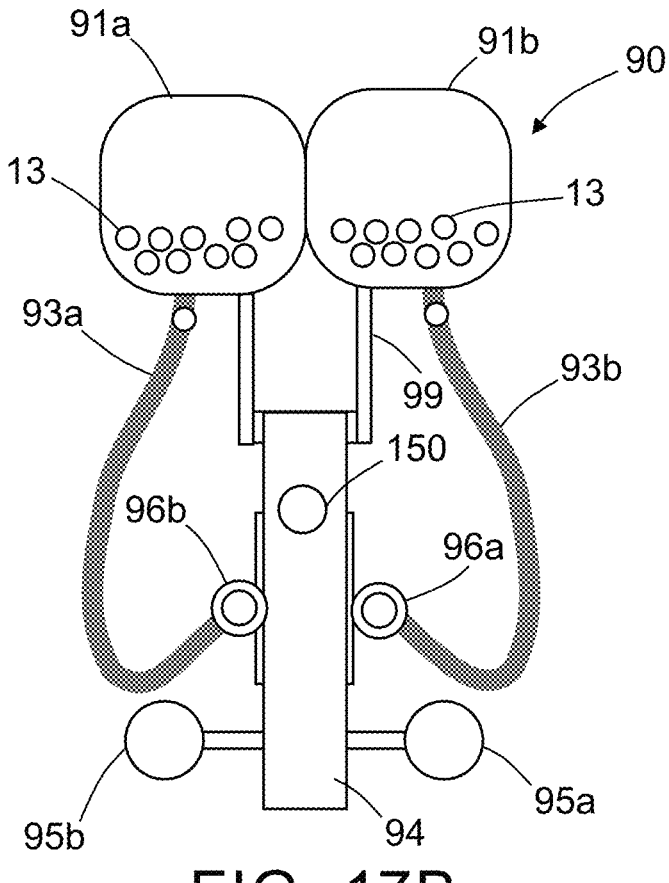

In accordance with an alternative embodiment, the launcher module 90 includes two launcher barrels respectively connected to two reservoir hoppers. FIGS. 17A and 17B are diagrams representing top and front views respectively of a launcher module 90 having two launcher barrels 96a, 96b and two reservoir hoppers 91a, 91b. The launcher module 90 depicted in FIGS. 17A and 17B further includes pressure chambers 97a, 97b respectively directly connected to launcher barrels 96a, 96b and respectively indirectly connected to reservoir hoppers 91a, 91b by way of capsule feeder tubes 93a, 93b. This configuration enables two different types of liquid material to be applied during a single repair mission by a single UAV, or faster coverage of an area with a single material type.

Various methods may be employed for automated control of a launcher-equipped UAV to ensure adequate material coverage of an area on a surface of a limited-access structure. For the purpose of illustration, two automated control methods will now be described, the first method with reference to FIGS. 18A, 18B, and 19, and the second method with reference to FIGS. 20A, 20B, and 21.

Figure 18A:
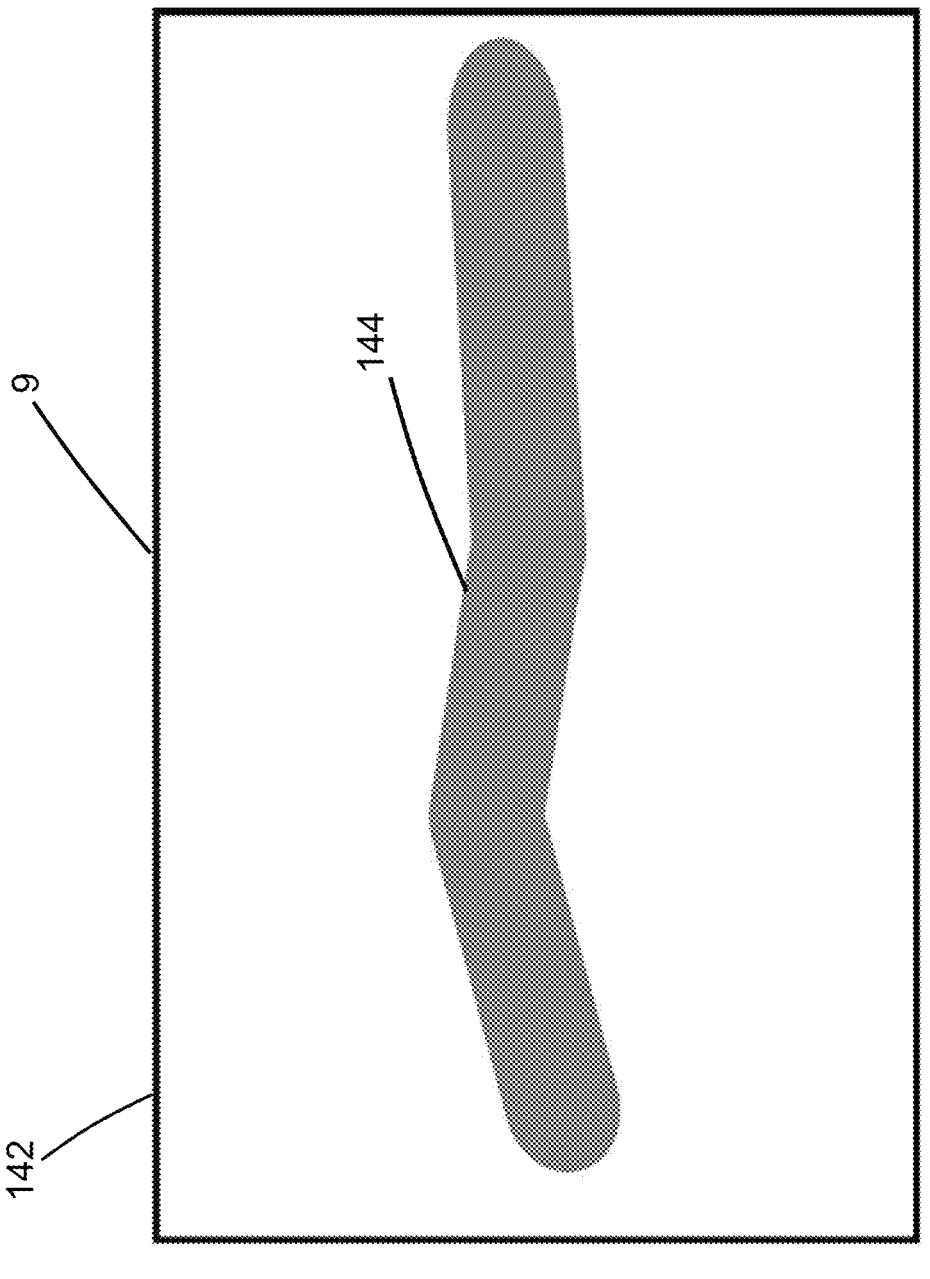
FIG. 18A is a diagram representing a simulated aerial view of simulated damage within a selected rectangular coverage area on a surface of a target object.
Figure 18B:
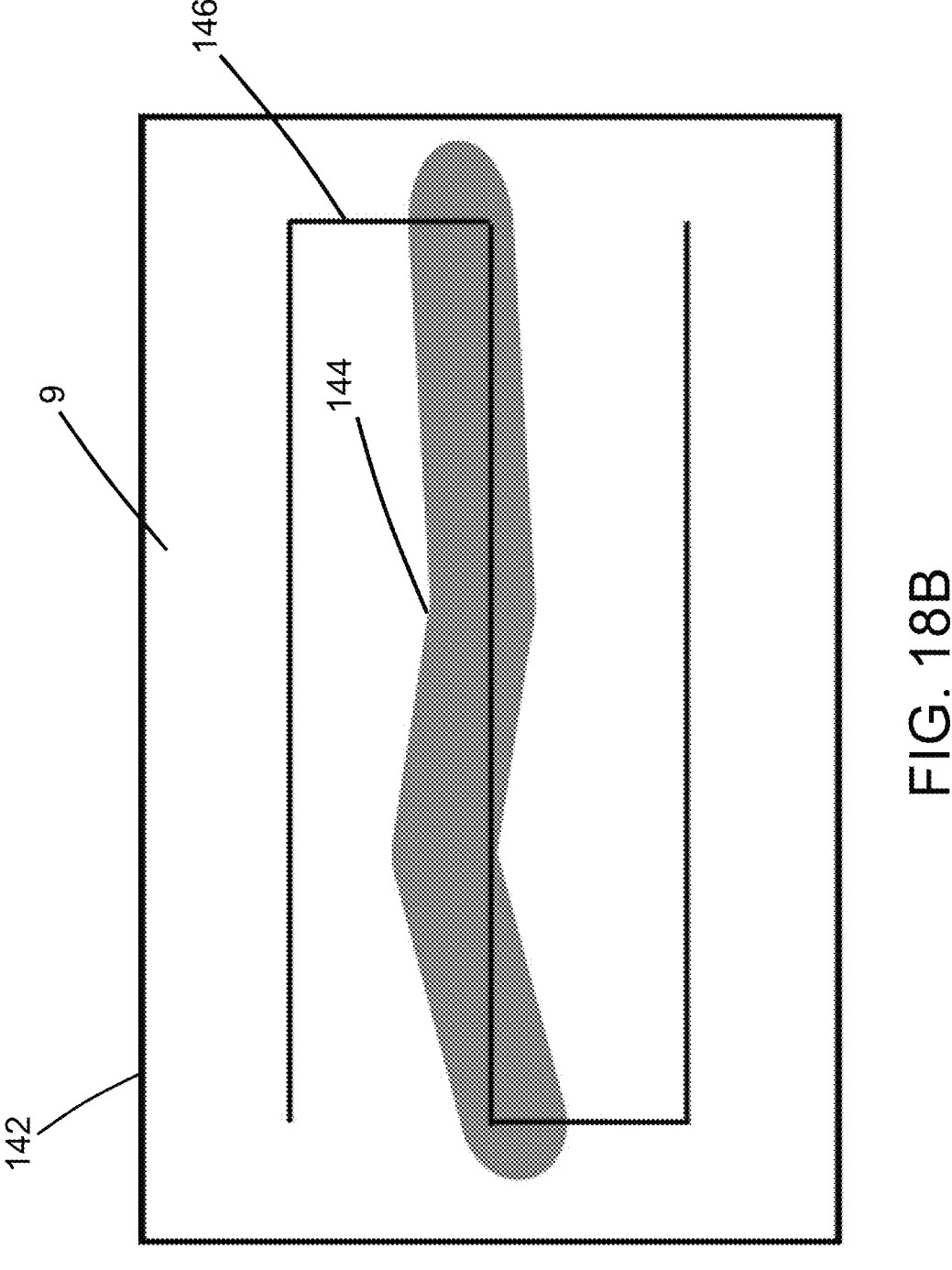
FIG. 18B is a diagram representing a simulated aerial view of the simulated damage depicted in FIG. 18A with a defined path for material coverage of the area in accordance with one embodiment indicated by a serpentine line.

In accordance with one embodiment, the onboard flight controller is configured to control aiming of the launcher barrel so that the barrel axis intersects the surface to be covered along a defined path. FIG. 18A is a diagram representing an aerial view of simulated damage 144 (e.g., a scratch or a scrape) within a selected rectangular coverage area (hereinafter "bounding box 142") on a surface 9 of a target object. FIG. 18B is a diagram representing an aerial view of the simulated damage 144 with a defined path 146 for full material coverage of the area indicated by a serpentine line. In accordance with one proposed actual implementation, the UAV is flown to a first location in the vicinity of a damaged area and then the pitch angle of the launcher is adjusted to aim at a first target point situated along the defined path. Then the launcher is actuated to launch a capsule directed at the first target point. Then the UAV is flown to a second location where the launcher is aimed at a second target point situated along the defined path, which second target point is separated from the first target point by a specified incremental distance. Then the launcher is actuated to launch another capsule directed at the second target point. The aim point of the launcher is moved incrementally along the defined path 146 by changing the position of the UAV. Following each incremental movement, another capsule is launched. As will be described in some detail below, in some cases the repetitive firing rate is based on flight stability analysis.

Figure 19:
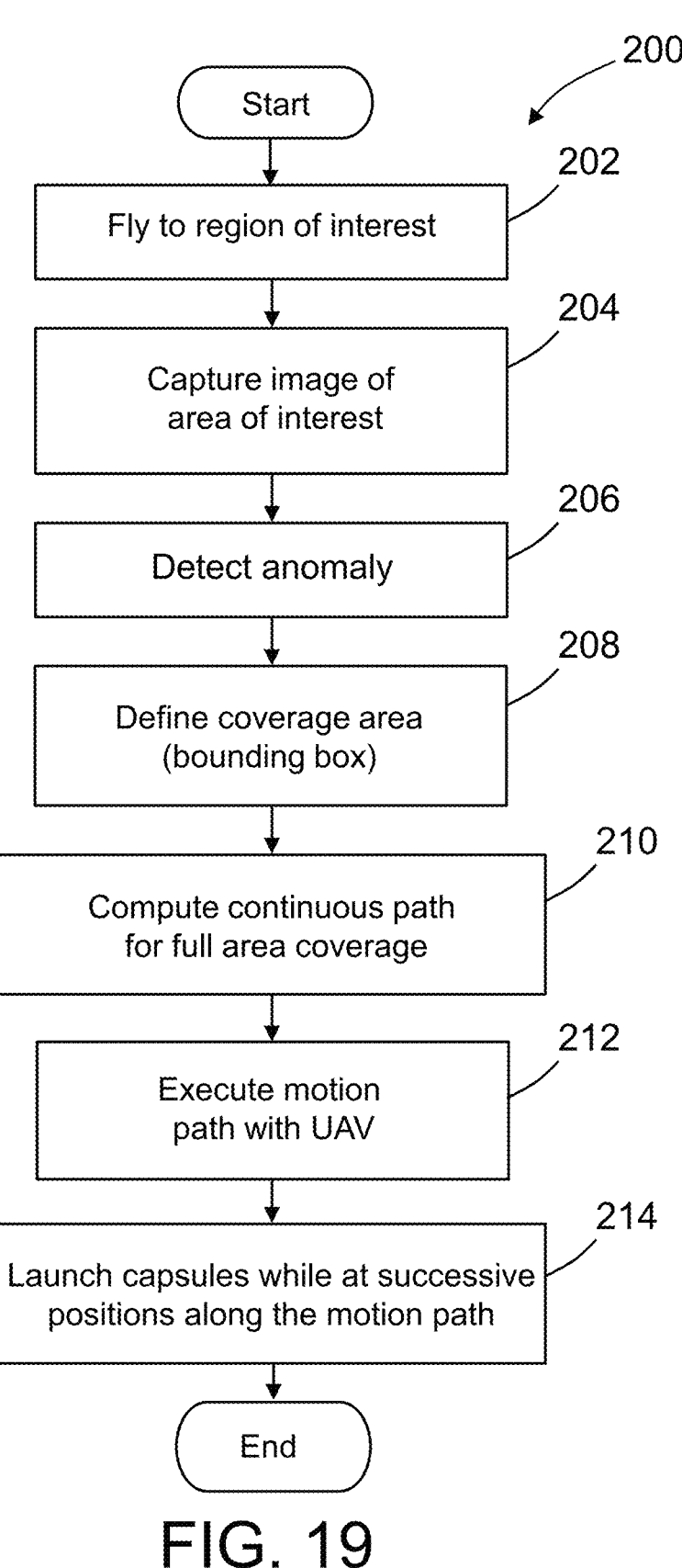
FIG. 19 is a flowchart identifying steps of a defined path method for automated control of capsule launching from a UAV to achieve material coverage of an area on a surface of a target object.

FIG. 19 is a flowchart identifying steps of a defined path method 200 for automated control of capsule launching from a UAV to achieve material coverage (liquid or gel) of an area on a surface of a target object. First, the launcher-equipped UAV flies to a location in the vicinity of the area of interest (e.g., an area that includes an anomaly) on a surface of a target object (step 202). Then the targeting camera is activated to capture an initial image of the area that includes the anomaly (step 204). The acquired image data is then processed to determine the size and shape of the anomaly (step 206) using object recognition techniques known in the field of computer vision. The image process is further configured to define a bounding box 142 representing a desired material coverage area (step 208). Then a continuous motion path for the UAV that will achieve full area coverage is computed (step 210). The flight controller onboard the UAV then receives instructions representing the planned continuous motion path. Those instructions may be defined by pitch and yaw angles of the UAV or pitch angle and lateral movements of the UAV. The flight controller then controls the rotor motors such that the UAV executes the planned motion path (step 212). As the UAV moves to successive positions along the motion path, capsules are launched in succession until full area coverage has been achieved (step 214). (This method works regardless of the level of color contrast between the material and the surface.)

Figure 20A:
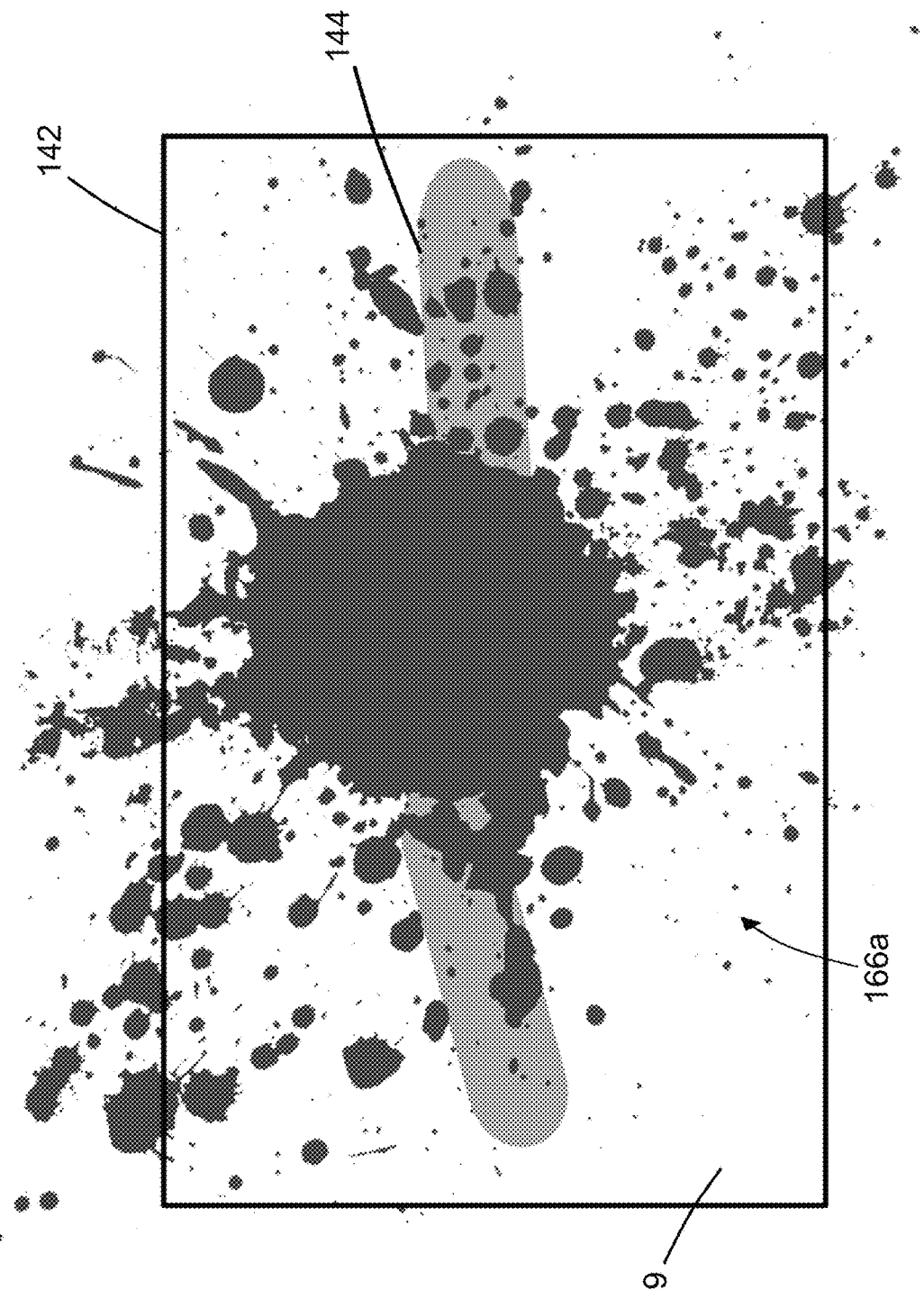
FIG. 20A is a diagram representing a simulated aerial view of an initial splatter of liquid on simulated damage within a selected rectangular coverage area on a surface of a target object in accordance with an adaptive targeting method.
Figure 20B:
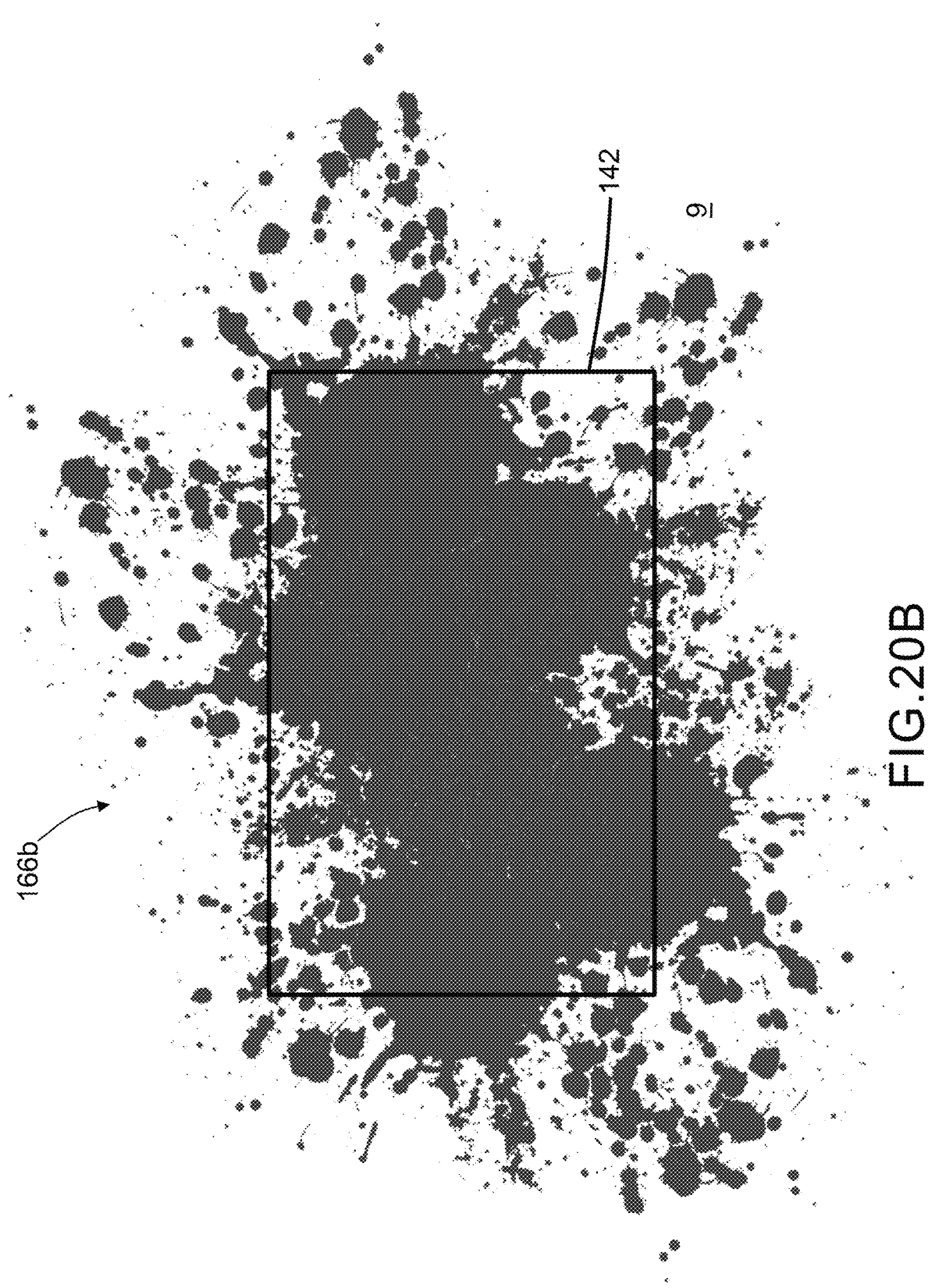
FIG. 20B is a diagram representing a simulated aerial view of the simulated damage depicted in FIG. 20A after the selected rectangular coverage area has been substantially fully covered using repeated capsule launches.

In accordance with another embodiment, the onboard flight controller is configured to control aiming of the launcher barrel using an adaptive targeting method. The adaptive targeting method uses image processing to analyze where on the surface the material was deposited and then feeds that data to the control system in real-time to aim the launcher at a portion of the surface area in need of additional coverage. In accordance with one embodiment, an initial splatter serves as an anchor point for the image and the reference position for the next shot. FIG. 20A is a diagram representing a simulated aerial view of an initial splatter 166a of liquid on simulated damage 144 within bounding box 142 on a surface 9 of a target object. A camera-based vision system provides the input for a feedback control system to enable the system to automatically cover a specific area using repeated capsule launches. The adaptive targeting method uses feedback from image analysis to determine aiming positions. FIG. 20B is a diagram representing a simulated aerial view of the simulated damage 144 after the selected rectangular coverage area indicated by bounding box 142 has been substantially fully covered by accumulated splatter 166b using repeated capsule launches.

Figure 21:
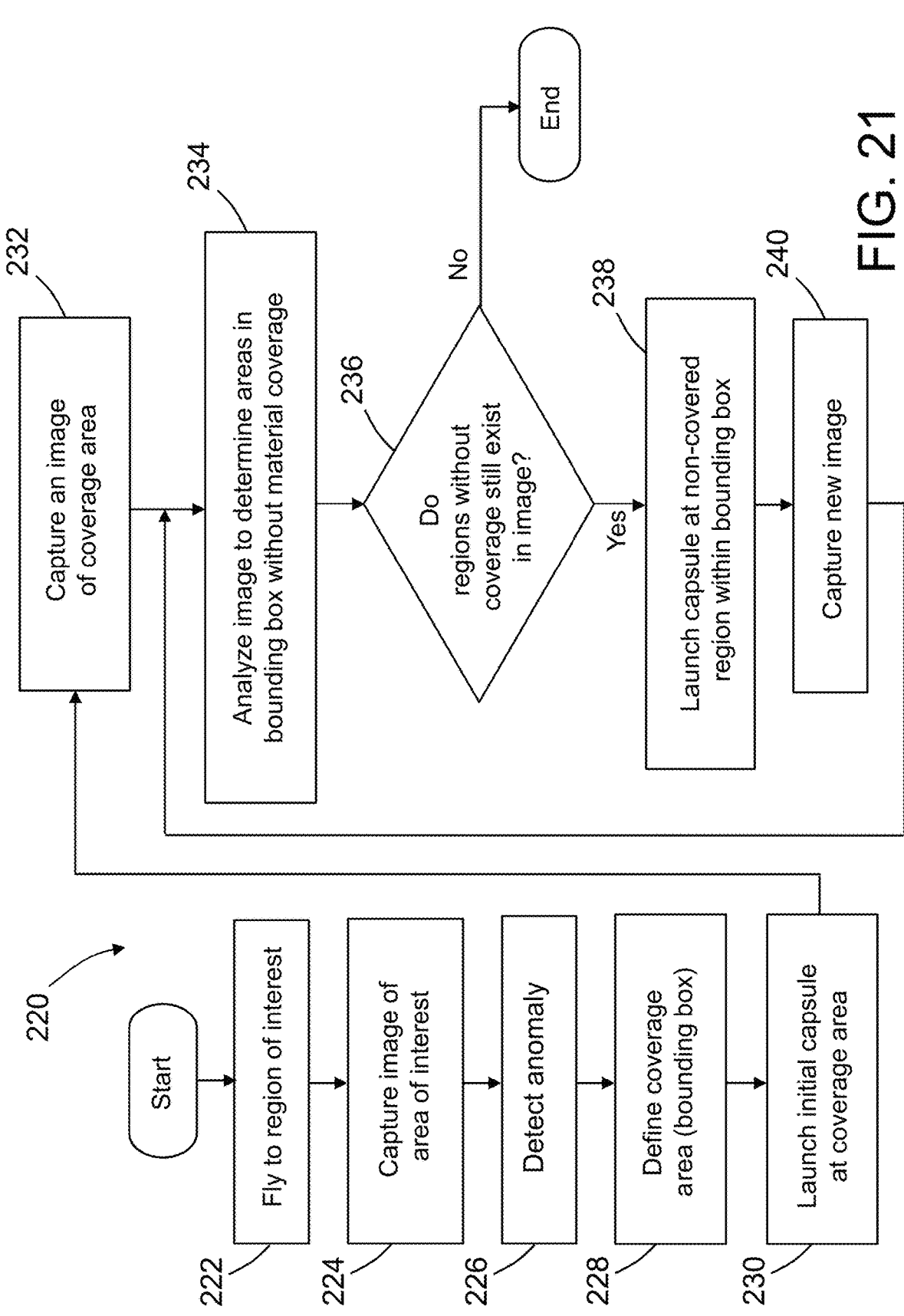
FIG. 21 is a flowchart identifying steps of an adaptive targeting method using image processing for automated control of capsule launching from a UAV to achieve material coverage of an area on a surface of a target object.

FIG. 21 is a flowchart identifying steps of an adaptive targeting method 220 using image processing for automated control of capsule launching from a UAV to achieve material coverage of an area on a surface of a target object. First, the launcher-equipped UAV flies to a location in the vicinity of the area of interest (e.g., an area that includes an anomaly) on a surface of a target object (step 222). Then the targeting camera is activated to capture an initial image of the area that includes the anomaly (step 224). The acquired image data is then processed to determine the size and shape of the anomaly (step 226) using object recognition techniques known in the field of computer vision. The image process is further configured to define a bounding box 142 representing a desired material coverage area (step 228). Then the launcher is actuated to launch an initial capsule at the coverage area (step 230). This initial capsule launch produces initial splatter 166a on the surface 9 (as seen in FIG. 20A). Then the targeting camera is activated to capture an image of the initial splatter (step 232). The image data from the captured image is then analyzed to determine areas within the bounding box 142 without material coverage (step 234). During this image processing, the centroid of the initial splatter 166a serves as an anchor reference position for the subsequent deposits of liquid material. Following this image analysis, a determination is made whether regions without material coverage still exist within the bounding box or not (step 236). If a determination is made in step 236 that there are no regions without coverage, the current capsule launching procedure is terminated. If a determination is made in step 236 that regions without coverage still exist, then the launcher is aimed at a non-covered region within the bounding box and another capsule is launched (step 238). Then the targeting camera is activated to capture another image of the splattered region (step 240). The method 220 then returns to step 234. The loop consisting of steps 234, 236, 238, and 240 is repeated until a determination is made in step 236 that there are no regions without coverage within the bounding box. The process continues filling non-covered areas until the specified area is fully covered. (This method works when level of color contrast between the material and the surface is detectable.)

In accordance with some embodiments, the image processing is performed at the ground station from image data sent wirelessly from the UAV; and the UAV motion control commands are computed there and sent back (through wireless communication) to the navigation system on-board the UAV. That navigation system may contain a separate processor, which processor may also send launch control signals to the launcher.

In accordance with other embodiments, the image processing is performed by an on-board image processor. The on-board image processor may communicate with an on-board navigation system for motion control. The image processing and navigation system/motion control/launcher control may be performed by a single processor or computer or by multiple processors or computers communicatively coupled via a network.

In summary, one innovative aspect of the remotely controlled capsule launching technology disclosed above is a method for sealing or coating a surface area of a structure using a UAV 2. The method includes the following steps: (a) coupling a launcher module 90 to the UAV 2, wherein the launcher module 90 is configured to launch liquid-filled capsules 13; (b) flying the UAV 2 to a vicinity of a surface 9 of a structure; and (c) launching a liquid-filled capsule 13 that impinges on the surface 9 of the structure. To ensure full area coverage, the proposed method further comprises: (d) acquiring image data representing an image of an area of interest on the surface of the structure; (e) processing the image data to locate an anomaly in the structure; and (f) defining a coverage area on the surface of the structure that covers at least the anomaly. Following steps (d) through (f), either of two methods for enabling full area coverage may be applied. In accordance with one embodiment that follows a defined path, the method further comprises: computing a motion path for full coverage of the coverage area; and controlling the unmanned aerial vehicle to fly along the motion path, wherein step (c) is performed at successive locations of the unmanned aerial vehicle along the motion path. In accordance with another embodiment that employs an adaptive targeting technique, the method further comprises: acquiring first image data representing a first image of an area of interest on the surface of the structure prior to step (c); acquiring second image data representing a second image of the area of interest on the surface of the structure subsequent to step (c); processing the second image data to calculate an anchor reference position based on a centroid of initial splatter of liquid from the liquid-filled capsule launched in step (c); and launching additional liquid-filled capsules which impinge on the surface of the structure at positions offset from said anchor reference position. The adaptive targeting method may further comprise: acquiring additional image data representing successive images of the area of interest on the surface of the structure subsequent to each launch of an additional liquid-filled capsule; processing the additional image data to determine that a defined coverage area on the surface of the structure has been fully covered by cumulative splatter of liquid from the additional liquid-filled capsules; and ceasing launching of additional liquid-filled capsules in response to a determination that the defined coverage area has been fully covered.

For a lightweight vehicle that is delivering material that could be a significant percentage of the vehicle total weight, it will likely be necessary to change the flight-related feedback gains of the UAV as the payload materials are leaving the vehicle (i.e., system mass reduction during flight). In accordance with one embodiment, one or more sensors count the number of capsules sent through the feeder subsystem, and then the flight controller (or separate computer) modifies the flight control feedback gains based, for example, on a pre-computed lookup table. The current mass estimate of the system is also used to compute an optimal capsule launching rate.

In accordance with one embodiment, the flight controller 39 (see FIG. 16) is configured to adjust the commanded thrust based on the reaction forces created by launching the capsules from the UAV. Based on system dynamics, including the current mass of the UAV, the launching rate of the capsules can also be adjusted to allow the proper amount of time between launches to recover from the reaction force disturbances, or in the case of rapid launching of capsules, compute an equilibrium rotator thrust to balance the launching forces. These run-time adjustments contribute to maintaining stability of the UAV. Without these compensations, the UAV would be unable to fly properly while delivering material to the surface of a target object.

Adjusting the commanded thrust involves modifying the flight control feedback gains as the reservoir hopper 91 (see FIG. 11A) is emptied. This adjustment is needed because the relative magnitude of the reaction force needed to produce a desired motion response as compared to the overall rotor thrust force (which includes the downward thrust needed to maintain a stable hover) increases with the decreasing number of capsules in the reservoir. Without control system compensation as material is consumed, the UAV may become increasingly unstable. One potential solution is to select a constant set of feedback control gains that have been tuned for a partially filled capsule reservoir, but this will give sluggish UAV performance to inputs with a full or nearly full reservoir, and the UAV will overreact to inputs when the reservoir is getting low. This leads to inconsistent flight control performance, which would be detrimental for even application of the capsule payload to a surface (and in some conditions the UAV may become unstable). An alternative solution is to use gain scheduling, in which case the control system feedback gains are adjusted based on the current mass (or current estimated mass) of the UAV. The basic idea is to tune the feedback gains for a variety of payloads and switch between them as the reservoir is emptied.

In order to adjust the capsule launching rate, the recoil velocity of the UAV after launching a capsule may be computed based on the law of conservation of momentum. Assuming that the mass of a single capsule is small relative to the total mass of the launcher-equipped UAV (plus remaining capsules), the recoil velocity of the UAV (V_uav) is a function of the total mass of the UAV and remaining capsules (M_uav), the mass of a single capsule (M_cap), and the launch velocity of the capsule (V_cap):

$$V\_uav=V\_cap*M\_cap/M\_uav$$

The overall mass of the UAV is intermittently reduced as successive capsules are launched, which means that the reaction force disturbance on the UAV has a bigger impact on flight control when the reservoir is getting low and less impact when the reservoir is full.

But the compensation algorithm must take into account more than simply conservation of momentum. In accordance with one embodiment, the compensation algorithm also computes the impulse applied to the UAV, which is the reaction force F applied to the UAV over the time (delta t) that the capsule is accelerated (delta v) in the launcher barrel:

$$impulse=F*delta\_t=M\_cap*delta\_v$$

The compensation algorithm is configured to calculate the average F and then treat that value as a disturbance. More specifically, the compensation algorithm generates a signal representing an adjusted capsule launching rate and sends that launch rate control signal to the launch control system.

The launch velocity of the capsule (V_cap) may be measured experimentally—such as using a high-speed camera to record video of the distal end of the launcher barrel as the capsule exits the barrel. and analyzing the video to acquire the distance that is traveled in a specified number of frames. One may correlate measured velocity to the measured pressure in the pneumatic system's pressure regulator valve (using a pressure measurement gauge or sensor) for different pressure settings and then use a table lookup or use a data fitting algorithm (such as a spline or polynomial fit) to create a pressure-to-velocity equation that provides an estimate of barrel exit velocity based on pressure measured by a pressure regulator gauge.

Another way to measure capsule launch velocity is to put proximity sensors at a pair of positions within the launcher barrel and measure the time between when each sensor detects passage of the capsule being launched. The capsule launch velocity may be computed by dividing the distance separating the sensors by the duration of the interval separating the respective instants in time when the sensors detected the capsule (delta_position divided by delta_time).

Another innovative aspect of the remotely controlled capsule launching technology disclosed above is a method for sealing or coating a surface area of a structure using a UAV 2. The method includes the following steps: (a) coupling a launcher module 90 to the UAV 2, wherein the launcher module 90 is configured to launch liquid-filled capsules 13; (b) flying the UAV 2 to a vicinity of a surface 9 of a structure; and (c) launching successive liquid-filled capsules 13 which impinge on respective target areas on the surface 9 of the structure. To provide control system compensation as material is consumed, the proposed method further comprises: (d) detecting each liquid-filled capsule launched at successive times; and (e) estimating a current total mass of the unmanned aerial vehicle and launcher module after each launch of a liquid-filled capsule by successively subtracting a unit weight of one liquid-filled capsule. In accordance with one embodiment, the method further comprises modifying flight control feedback gains after each launch of a liquid-filled capsule to account for successive losses of mass of the launcher module. In accordance with another embodiment, the method further comprises: measuring a launch velocity of each liquid-filled capsule launched; calculating respective reaction forces produced by launching successive liquid-filled capsules based on the launch velocities measured; adjusting a commanded thrust of the unmanned aerial vehicle based on the reaction forces calculated; and adjusting a rate at which the successive liquid-filled capsules are launched based on the reaction forces calculated.

Use of a spray gun typically requires that the nozzle be within about a foot of the surface and that it be used in calm winds. Achieving those operating conditions may not always be possible, and providing liquid/gel material application is especially challenging when using a UAV as the delivery platform for making repairs. With traditional sprayer systems, overspray can be a problem for the target object, environment, and the UAV itself since if overspray material gets onto the UAV, it may diminish the UAV's ability to fly properly. But with capsule-based delivery, overspray is less of an issue and more material can be delivered to the intended area. In addition, cleanup of a traditional spray gun system takes time, which can be especially problematic if the material gets onto or into the UAV. And swapping material types during the task usually requires a cleanup of the prior material before the different material can be inserted into the system.

In accordance with some embodiments, the UAV-enabled repair system proposed herein also includes an off-board tracking system for vehicle and repair tool localization, which system may be communicatively coupled to the aforementioned control station 40 on the ground. More specifically, the off-board tracking system is configured to provide three-dimensional (3-D) localization information for navigation and control of the UAV relative to the target object and for accurately locating the inspection or repair tool in the frame of reference of the target object and correlating the location data with a 3-D model of the target object. Accurate location tracking for UAV-based repair will enable the UAV to move a repair module to the proper location and record the 3-D coordinate data associated with that location. This 3-D information is important for documenting the repair, as well as enabling accounting for the results of a previously performed UAV-enabled inspection. Any one of various techniques may be used to provide the information necessary to record the 3-D location of the activity.

In accordance with one embodiment, the UAV includes an onboard tracking system that is able to navigate the UAV in accordance with a preprogrammed flight plan. The preprogrammed flight plan carried by UAV enables the UAV to follow a flight path around a portion of the target object. The system further includes an off-board tracking system having means for wireless communication with the UAV. The off-board tracking system is configured to send commands to or monitor various operating performance parameters of the UAV, such as fuel remaining, battery power remaining, etc. The off-board tracking system may also be used generate commands to alter the flight path of the UAV based on acquired localization data.

In accordance with some embodiments, the UAV-enabled repair system proposed herein also includes three-dimensional (3-D) localization for navigation and control of the UAV relative to the target object. Accurate location tracking for UAV-based repair will enable the system to move to the proper location. Any one of various techniques may be used to provide the information necessary to record the 3-D location of the activity.

In accordance with one embodiment, 3-D localization may be accomplished by placing optical targets (such a retro-reflective targets) on the UAV 2 and then using motion capture feedback control to calculate the location of the UAV 2. Closed-loop feedback control using motion capture systems is disclosed in detail in U.S. Pat. No. 7,643,893, the disclosure of which is incorporated by reference herein in its entirety. In accordance with one embodiment, the motion capture system is configured to measure one or more motion characteristics of the UAV 2 during a repair mission. A processor receives the measured motion characteristics from the motion capture system and determines a control signal based on the measured motion characteristics. A position control system receives the control signal and continuously adjusts at least one motion characteristic of the UAV 2 in order to maintain or achieve a desired motion state. The UAV 2 may be equipped with optical targets in the form of passive retro-reflective markers. The motion capture system, the processor, and the position control system comprise a complete closed-loop feedback control system.

In accordance with an alternative embodiment, location tracking of the UAV 2 may be implemented using a local positioning system (not shown in the drawings) mounted on or near the target object. The local positioning system may be controlled from the ground and used to track the location of a UAV 2 having three or more known visible features thereon. A typical local positioning system comprises: a pan-tilt mechanism; a camera mounted to the pan-tilt mechanism; and a laser range meter for projecting a laser beam along an aim direction vector onto each visible features. The pan-tilt mechanism comprises a pan unit and a tilt unit. The camera comprises a housing to which the laser range meter is mounted. The camera may comprise a still camera (color and/or black and white) to obtain still images, a video camera to obtain color and/or black and white video, or an infrared camera to obtain infrared still images or infrared video of the visible features. The local positioning system further comprises a computer system which is configured to measure coordinates of the visible features in the local coordinate system of the target object. In particular, this computer system is programmed to control motions of the pan—tilt mechanism to rotationally adjust the camera to selected angles around the vertical, azimuth (pan) axis and the horizontal, elevation (tilt) axis. The computer system is also programmed to control operation of the camera and receive image data therefrom for transmission to the control station 40. The computer system is further programmed to control operation of the laser range meter and receive range data therefrom for transmission to the control station 40. The local positioning system may further comprise a wireless transceiver and an antenna to enable bidirectional, wireless electromagnetic wave communications with a control station. The local positioning system preferably has the capabilities described in U.S. Pat. Nos. 7,859,655, 9,285,296, and 8,447,805 and U.S. Patent Application Pub. No. 2018/0120196, the disclosures of which are incorporated by reference herein in their entireties. The image data acquired by the video camera of the local positioning system may undergo image processing as disclosed in U.S. Pat. No. 8,744,133.

An alternative 3-D localization approach involves placing two or more UAV-placed visible targets, such as ink marks, adjacent to the repair area. The marks would be used by the UAV to accurately re-orient itself to the repair during each successive repair operation. Automated video localization equipment would be employed to re-orient the UAV to the repair area using the usable marks.

While methods and apparatus for repairing a structure or object using a tool-equipped UAV have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "controller" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit. For example, the term "controller" includes, but is not limited to, a small computer on an integrated circuit containing a processor core, memory and programmable input/output peripherals.

The invention claimed is:

1. An apparatus comprising an unmanned aerial vehicle and a launcher module coupled to the unmanned aerial vehicle, wherein the unmanned aerial vehicle comprises:
   a body frame;
   a plurality of rotor motors mounted to the body frame; and
   a plurality of rotors operatively coupled to respective rotor motors of the plurality of rotor motors, and wherein the launcher module comprises:
   an inner ring mounted to the body frame of the unmanned aerial vehicle; and
   a rotatable launcher subassembly comprising an outer ring that is rotatably coupled to the inner ring and a launcher that is mounted to the outer ring,
   wherein the launcher comprises a launcher barrel and a launching mechanism positioned and configured to impel a liquid-filled capsule through the launcher barrel.

2. The apparatus as recited in claim 1, wherein the launcher module further comprises:
   a launcher pitch control motor fixedly coupled to the outer ring; and
   means for mechanically coupling the outer ring to the launcher pitch control motor to enable the launcher pitch control motor to drive rotation of the outer ring relative to the inner ring,
   wherein the launcher and the launcher pitch control motor are disposed at diametrically opposed angular positions on the outer ring.

3. The apparatus as recited in claim 2, wherein the launcher module further comprises:
   a reservoir hopper coupled to the inner ring and containing liquid-filled capsules;
   a capsule feeder tube connecting the reservoir hopper to the launching mechanism;
   a canister coupled to the inner ring and containing compressed gas;
   a gas feeder tube connecting the canister to the launching mechanism; and
   a trigger mechanism comprising an electromechanical control valve capable of transitioning from a closed state in which the gas feeder tube does not provide gas from the canister to the launching mechanism to an open state in which the gas feeder tube provides gas from the canister to the launching mechanism for propelling a liquid-filled capsule through and out the launcher barrel.

4. The apparatus as recited in claim 1, wherein:
   the rotatable launcher subassembly further comprises a recoil compensation subsystem fixedly coupled to the outer ring and operatively coupled to the launcher barrel;
   the recoil compensation subsystem comprises first and second linear rails and first and second shock absorbers coupled to the outer ring; and
   the launcher barrel is slidably coupled to the first and second linear rails and operatively coupled to the first and second shock absorbers, which first and second shock absorbers are configured to distribute recoil momentum of the launcher barrel over time.

5. The apparatus as recited in claim 3, wherein:
   the launcher module further comprises a sensor configured for outputting sensor data indicating a number of liquid-filled capsules which have passed through the capsule feeder tube; and
   the unmanned aerial vehicle further comprises a flight controller configured to control operation of the rotor motors to adjust flight-related feedback gains as a function of the sensor data received from the sensor.

6. The apparatus as recited in claim 5, wherein the flight controller is further configured to control operation of the rotor motors to produce an equilibrium thrust to offset reaction forces produced when capsules are launched, the equilibrium thrust being a function of at least a capsule launch velocity, a capsule launch rate calculated based on the sensor data, and a mass of a liquid-filled capsule.

7. The apparatus as recited in claim 5, wherein:
   the rotatable launcher subassembly further comprises a camera coupled to the outer ring; and
   the launcher module further comprises a vision-based targeting system configured to receive image data from the camera, process the image data to determine an area where additional material should be deposited on a surface by the launcher, and send control signals to the launcher pitch control motor and command signals to the flight controller for aiming the launcher barrel toward the area.

8. The apparatus as recited in claim 2, wherein the means for mechanically coupling the outer ring to the launcher pitch control motor comprise a pinion gear which is mounted to an output shaft of the launcher pitch control motor and a ring gear which is mounted to or integrally formed with the outer ring and is engaged by the pinion gear.

9. An apparatus comprising an unmanned aerial vehicle and a launcher rotatably coupled to the unmanned aerial vehicle, wherein the unmanned aerial vehicle comprises:
   a body frame;
   at least one rotor motor mounted to the body frame; and
   at least one rotor operatively coupled to the at least one rotor motor;
   an inner ring mounted to the body frame; and
   an outer ring that is rotatably coupled to the inner ring, wherein the launcher is mounted to the outer ring,
   wherein the launcher is rotatable about a pitch axis, and comprises a launcher barrel and a launching mechanism positioned and configured to impel a liquid-filled capsule through the launcher barrel.

10. The apparatus as recited in claim 9, further comprising:
   a launcher pitch control motor fixedly coupled to the outer ring; and
   means for mechanically coupling the outer ring to the launcher pitch control motor to enable the launcher pitch control motor to drive rotation of the outer ring relative to the inner ring.

11. The apparatus as recited in claim 10, wherein the means for mechanically coupling the outer ring to the launcher pitch control motor comprise a pinion gear which is mounted to an output shaft of the launcher pitch control motor and a ring gear which is mounted to or integrally formed with the outer ring and is engaged by the pinion gear.

12. The apparatus as recited in claim 9, further comprising:
   a reservoir hopper coupled to the inner ring and containing liquid-filled capsules;
   a capsule feeder tube connecting the reservoir hopper to the launching mechanism;

a canister coupled to the inner ring and containing compressed gas;

a gas feeder tube connecting the canister to the launching mechanism; and a trigger mechanism comprising an electromechanical control valve capable of transitioning from a closed state in which the gas feeder tube does not provide gas from the canister to the launching mechanism to an open state in which the gas feeder tube provides gas from the canister to the launching mechanism for propelling a liquid-filled capsule through and out the launcher barrel.

13. The apparatus as recited in claim 9, further comprising a recoil compensation subsystem fixedly coupled to the outer ring and operatively coupled to the launcher barrel, wherein the recoil compensation subsystem comprises first and second linear rails and first and second shock absorbers coupled to the outer ring, and wherein the launcher barrel is slidably coupled to the first and second linear rails and operatively coupled to the first and second shock absorbers, which first and second shock absorbers are configured to distribute recoil momentum of the launcher barrel over time.

14. A System comprising:

an unmanned aerial vehicle; and a launcher module configured to be coupled to anthe unmanned aerial vehicle, the launcher module comprising:

an inner ring configured to be mounted to the unmanned aerial vehicle; and a rotatable launcher subassembly comprising:

an outer ring that is rotatably coupled to the inner ring; and a launcher that is mounted to the outer ring.

15. Thesystem as recited claim 14, wherein the launcher comprises a launcher barrel and a launching mechanism positioned and configured to impel a liquid-filled capsule through the launcher barrel.

16. The system as recited in claim 14, wherein the launcher module further comprises:

a launcher pitch control motor fixedly coupled to the outer ring; and means for mechanically coupling the outer ring to the launcher pitch control motor to enable the launcher pitch control motor to drive rotation of the outer ring relative to the inner ring, wherein the launcher and the launcher pitch control motor are disposed at diametrically opposed angular positions on the outer ring.

17. The system as recited in claim 15, wherein the launcher module further comprises:

a reservoir hopper coupled to the inner ring and containing liquid-filled capsules;

a capsule feeder tube connecting the reservoir hopper to the launching mechanism;

a canister coupled to the inner ring and containing compressed gas;

a gas feeder tube connecting the canister to the launching mechanism; and a trigger mechanism comprising an electromechanical control valve configured to transition from a closed state in which the gas feeder tube does not provide gas from the canister to the launching mechanism to an open state in which the gas feeder tube provides gas from the canister to the launching mechanism for propelling a liquid-filled capsule through and out the launcher barrel.

18. The system as recited in claim 15, wherein:

the rotatable launcher subassembly further comprises a recoil compensation subsystem fixedly coupled to the outer ring and operatively coupled to the launcher barrel;

the recoil compensation subsystem comprises first and second linear rails and first and second shock absorbers coupled to the outer ring; and the launcher barrel is slidably coupled to the first and second linear rails and operatively coupled to the first and second shock absorbers, which first and second shock absorbers are configured to distribute recoil momentum of the launcher barrel over time.

19. The system as recited in claim 17, wherein the launcher module further comprises a sensor configured for outputting sensor data indicating a number of liquid-filled capsules which have passed through the capsule feeder tube.

20. The system as recited in claim 16, wherein: the rotatable launcher subassembly further comprises a camera coupled to the outer ring; and the launcher module further comprises a vision-based targeting system configured to receive image data from the camera, process the image data to determine an area where additional material should be deposited on a surface by the launcher, and send control signals to the launcher pitch control motor and command signals to a flight controller for aiming the launcher barrel toward the area.

* * * * *